US012697545B2

(12) United States Patent
Nakamura et al.

(10) Patent No.: US 12,697,545 B2
(45) Date of Patent: Aug. 4, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Takatoshi Nakamura, Tokyo (JP); Takafumi Goto, Tokyo (JP); Toshihiro Kawasaki, Tokyo (JP); Yingnan Liu, Tokyo (JP); Hiroyuki Takahashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 260 days.

(21) Appl. No.: 18/590,389

(22) Filed: Feb. 28, 2024

(65) Prior Publication Data

US 2024/0198224 A1 Jun. 20, 2024

Related U.S. Application Data

(63) Continuation of application No. PCT/JP2022/031833, filed on Aug. 24, 2022.

(30) Foreign Application Priority Data

Sep. 3, 2021 (JP) ................................. 2021-144222

(51) Int. Cl.
*A63F 13/52* (2014.01)
*A63F 13/35* (2014.01)
(Continued)

(52) U.S. Cl.
CPC .............. *A63F 13/52* (2014.09); *A63F 13/35* (2014.09); *A63F 13/60* (2014.09); *A63F 13/79* (2014.09); *G06F 16/955* (2019.01)

(58) Field of Classification Search
None
See application file for complete search history.

(56) References Cited

U.S. PATENT DOCUMENTS

2007/0275782 A1* 11/2007 Kaji ...................... A63F 13/843
463/43
2014/0295973 A1* 10/2014 Inagawa ................. A63F 13/69
463/42
(Continued)

FOREIGN PATENT DOCUMENTS

JP 2017-191400 A 10/2017
JP 2018-000995 A 1/2018

OTHER PUBLICATIONS

International Search Report issued in PCT/JP2022/031833 on Oct. 25, 2022 (7 pages).
(Continued)

*Primary Examiner* — Jason T Yen
(74) *Attorney, Agent, or Firm* — Osha Bergman Watanabe & Burton LLP

(57) ABSTRACT

A non-transitory computer readable medium stores a program causing a computer to execute: generating a game medium group indicating a group of game media selected from among a plurality of game media; and generating and displaying identifying image information indicating image information that includes game medium identification information associated with each of the game media, the game medium identification information concerning an individual game media constituting the game medium group, and communication connection information for communicatively connecting to a particular communication destination in a communication network.

8 Claims, 35 Drawing Sheets

(51) Int. Cl.
    *A63F 13/60*         (2014.01)
    *A63F 13/79*         (2014.01)
    *G06F 16/955*      (2019.01)

(56)             References Cited

U.S. PATENT DOCUMENTS

2019/0050489 A1\*   2/2019   Kurabayashi ........... A63F 13/35
2021/0283510 A1\*   9/2021   Reeves  ................. A63F 13/795

OTHER PUBLICATIONS

Written Opinion of the International Searching Authority issued in
PCT/JP2022/031833 on Oct. 25, 2022 (3 pages).
Office Action issued in Japanese Patent Application No. 2021-
144222, mailed on Jan. 25, 2022 (6 pages).

\* cited by examiner

46 https://xxxxxx-portal.com /deck/1.5.

Figure 9:
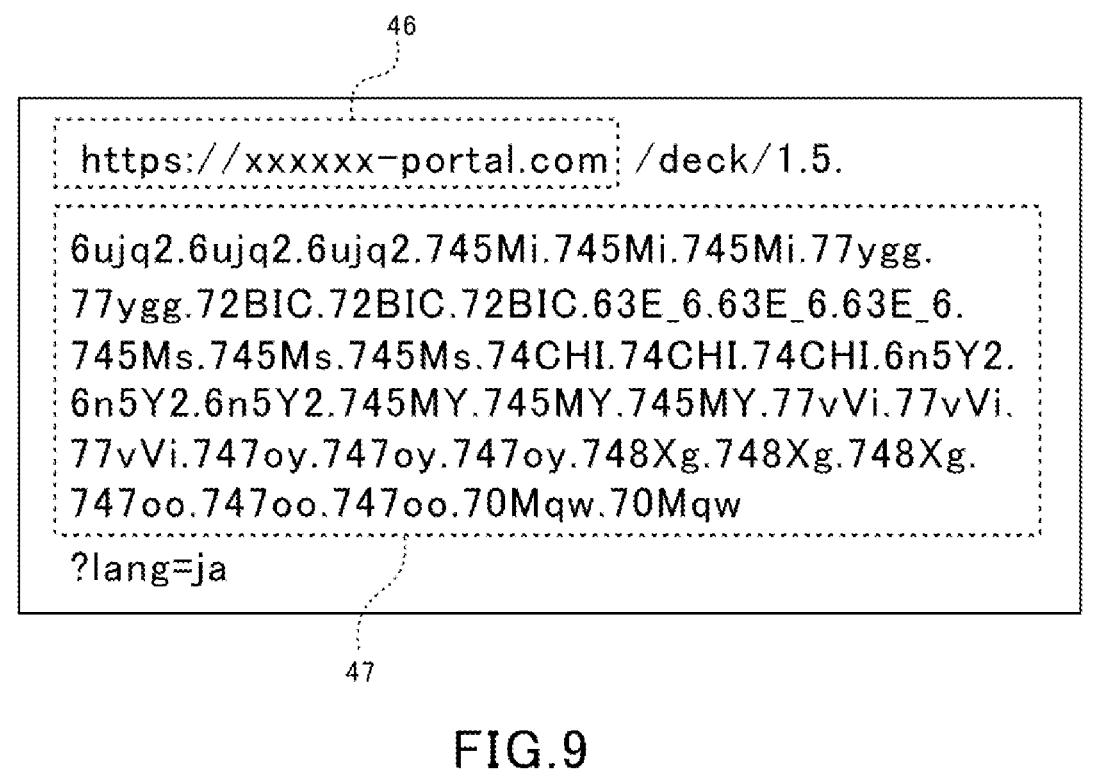

6ujq2.6ujq2.6ujq2.745Mi.745Mi.745Mi.77ygg.
77ygg.72BIC.72BIC.72BIC.63E_6.63E_6.63E_6.
745Ms.745Ms.745Ms.74CHI.74CHI.74CHI.6n5Y2.
6n5Y2.6n5Y2.745MY.745MY.745MY.77vVi.77vVi.
77vVi.747oy.747oy.747oy.748Xg.748Xg.748Xg.
747oo.747oo.747oo.70Mqw.70Mqw ?lang=ja

| HASH ID (GAME MEDIUM IDENTIFICATION INFORMATION) | CARD ID | PICTURE ID | PERFORMANCE ID |
|---|---|---|---|
| 6ujq2 | 00001 | img00001 | pfm00001 |
| 745Mi | 00002 | img00002 | pfm00002 |
| 77ygg | 00003 | img00003 | pfm00003 |
| ⋮ | ⋮ | ⋮ | ⋮ |

FIG.10

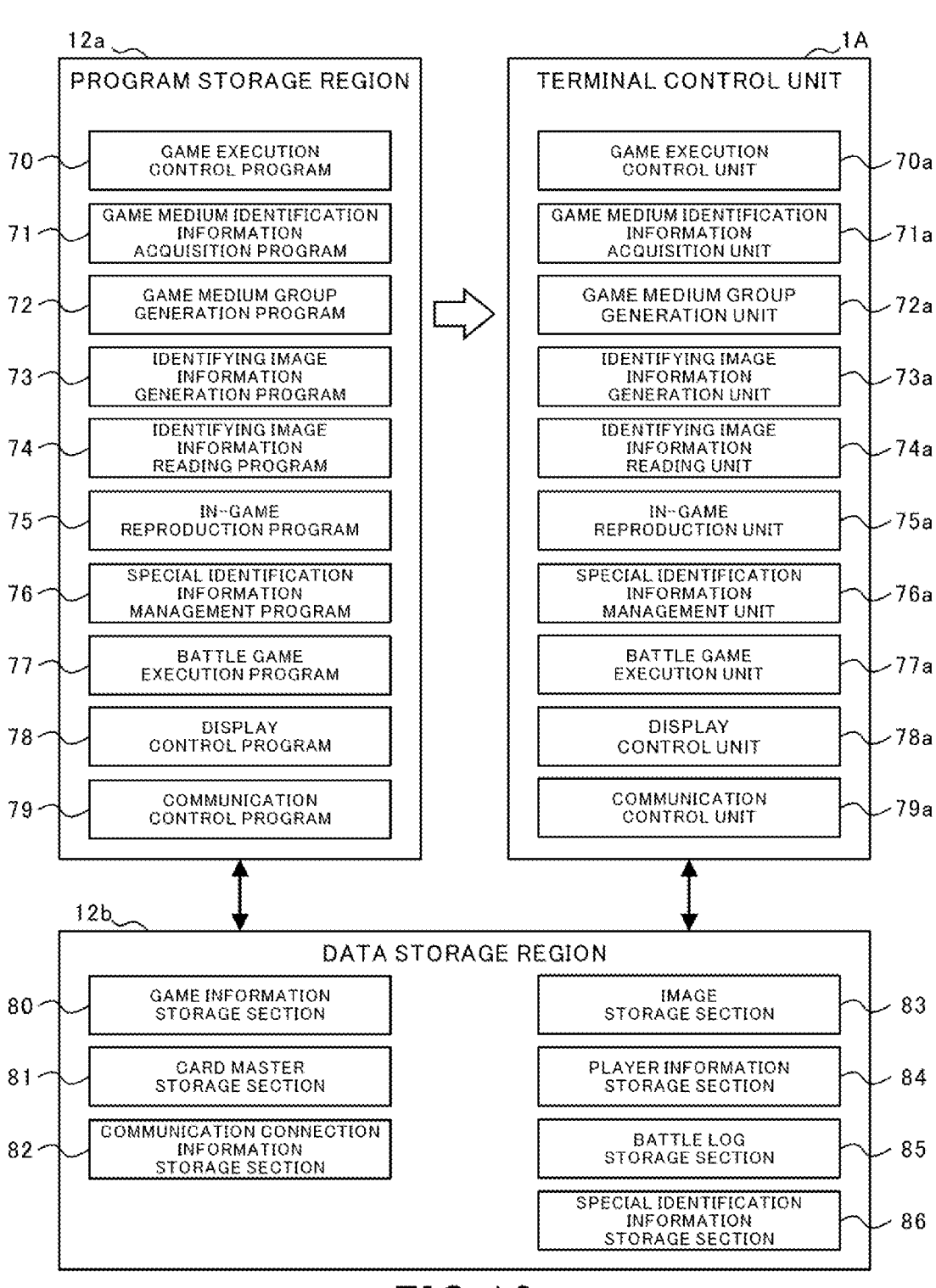

12a

PROGRAM STORAGE REGION

70 — GAME EXECUTION CONTROL PROGRAM

71 — GAME MEDIUM IDENTIFICATION INFORMATION ACQUISITION PROGRAM

72 — GAME MEDIUM GROUP GENERATION PROGRAM

73 — IDENTIFYING IMAGE INFORMATION GENERATION PROGRAM

74 — IDENTIFYING IMAGE INFORMATION READING PROGRAM

75 — IN-GAME REPRODUCTION PROGRAM

76 — SPECIAL IDENTIFICATION INFORMATION MANAGEMENT PROGRAM

77 — BATTLE GAME EXECUTION PROGRAM

78 — DISPLAY CONTROL PROGRAM

79 — COMMUNICATION CONTROL PROGRAM

1A

TERMINAL CONTROL UNIT

GAME EXECUTION CONTROL UNIT — 70a

GAME MEDIUM IDENTIFICATION INFORMATION ACQUISITION UNIT — 71a

GAME MEDIUM GROUP GENERATION UNIT — 72a

IDENTIFYING IMAGE INFORMATION GENERATION UNIT — 73a

IDENTIFYING IMAGE INFORMATION READING UNIT — 74a

IN-GAME REPRODUCTION UNIT — 75a

SPECIAL IDENTIFICATION INFORMATION MANAGEMENT UNIT — 76a

BATTLE GAME EXECUTION UNIT — 77a

DISPLAY CONTROL UNIT — 78a

COMMUNICATION CONTROL UNIT — 79a

12b

DATA STORAGE REGION

80 — GAME INFORMATION STORAGE SECTION

81 — CARD MASTER STORAGE SECTION

82 — COMMUNICATION CONNECTION INFORMATION STORAGE SECTION

IMAGE STORAGE SECTION — 83

PLAYER INFORMATION STORAGE SECTION — 84

BATTLE LOG STORAGE SECTION — 85

SPECIAL IDENTIFICATION INFORMATION STORAGE SECTION — 86

FIG.19

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/031833, filed on Aug. 24, 2022, which claims priority to Japanese Patent Application No. 2021-144222, filed on Sep. 3, 2021, the entire contents of which are incorporated by reference herein.

BACKGROUND ART

Technical Field

The present invention relates to an information processing program, an information processing method, and an information processing system.

For example, Patent Literature 1 proposes a digital card game that allows a battle between players via communication. In such a digital card game, players create decks, each of which is a group of cards selected from among a plurality of cards. The players then execute a game by using the decks.

CITATION LIST

Patent Literature

Patent Literature 1: JP 2018-995 A

SUMMARY OF INVENTION

Technical Problem

Such a digital card game is executed by tactically organizing a deck, which is a game medium group. Here, there are some players who wish to publish decks created by themselves to an unspecified number of other players, while there are other players who wish to execute a game by using the same deck as that created by another player, such as a strong player. For this reason, there is a demand for the capability to easily reproduce a game medium group, such as the capability to have a game medium group in the player terminal of a first player be reproduced in the player terminal of a second player.

An object of the present invention is to provide an information processing program, an information processing method, and an information processing system capable of easily reproducing a game medium group.

Solution to Problem

In order to solve the above-described problem, an information processing program causes a computer to function as: a game medium group generation unit for generating a game medium group indicating a group of game media selected from among a plurality of game media; and an identifying image information generation unit for generating and displaying identifying image information indicating image information that includes game medium identification information associated with each of the game media, said game medium identification information concerning the individual game media constituting the game medium group, and communication connection information for communicatively connecting to a particular communication destination in a communication network.

When displaying the game medium group, the identifying image information generation unit may generate and display the identifying image information corresponding to the game medium group to be displayed.

The information processing program may cause the computer to further function as: a game medium identification information acquisition unit for acquiring, from a device for managing the game medium identification information, the latest game medium identification information at a predetermined timing.

The information processing program may cause the computer to further function as: an identifying image information reading unit for reading the identifying image information; and an in-game reproduction unit that, in response to reading of the identifying image information, generates and displays the game medium group composed of the game media corresponding to the respective items of game medium identification information included in the identifying image information, without performing communicative connection based on the communication connection information included in the identifying image information.

In order to solve the above-described problem, an information processing method includes: a step for generating a game medium group indicating a group of game media selected from among a plurality of game media; and a step for generating and displaying identifying image information indicating image information that includes game medium identification information associated with each of the game media, said game medium identification information concerning the individual game media constituting the game medium group, and communication connection information for communicatively connecting to a particular communication destination in a communication network.

In order to solve the above-described problem, an information processing system includes: a game medium group generation unit for generating a game medium group indicating a group of game media selected from among a plurality of game media; and an identifying image information generation unit for generating and displaying identifying image information indicating image information that includes game medium identification information associated with each of the game media, said game medium identification information concerning the individual game media constituting the game medium group, and communication connection information for communicatively connecting to a particular communication destination in a communication network.

In order to solve the above-described problem, an information processing system includes: a game medium group generation unit for generating a game medium group indicating a group of game media selected from among a plurality of game media; an identifying image information generation unit for generating and displaying identifying image information indicating image information that includes game medium identification information associated with each of the game media, said game medium identification information concerning the individual game media constituting the game medium group, and communication connection information for communicatively connecting to a particular communication destination in a communication network; and an out-of-game reproduction unit that, in response to reading of the identifying image information by means other than a game application, communicatively connects to the particular communication destination on the basis of the communication connection information included in the identifying image information, and generates and displays, at the particular communication destination, the game medium group composed of the game media corresponding to the respective items of game medium identification information included in the identifying image information.

In order to solve the above-described problem, an information processing system includes: a first game medium group generation unit for generating a game medium group indicating a group of game media selected from among a plurality of game media in a game application; an identifying image information generation unit for generating and displaying identifying image information indicating image information that includes game medium identification information associated with each of the game media, said game medium identification information concerning the individual game media constituting the game medium group, and communication connection information for communicatively connecting to a particular communication destination in a communication network; a second game medium group generation unit for generating the game medium group at the particular communication destination, which differs from the game application; and a special identification information management unit for generating special identification information for reproducing, by means of the first game medium group generation unit, the game medium group generated by the second game medium group generation unit.

Effects of Disclosure

According to the present invention, it is possible to easily reproduce a game medium group.

BRIEF DESCRIPTION OF DRAWINGS

FIG. 9 is a drawing for illustrating identifying image information.

FIG. 10 is a drawing for illustrating a card master including hash IDs.

FIG. 19 is a functional block diagram of the player terminal.

DESCRIPTION OF EMBODIMENTS

An aspect of an embodiment of the present invention will be described below in detail with reference to the accompanying drawings. The numerical values, etc. given in this embodiment are merely examples for facilitating understanding and do not limit the present invention unless otherwise specifically mentioned. In the present description and drawings, elements having substantially the same functions and configurations have the same reference signs attached thereto and are not described repeatedly, and elements that are not directly relevant to the present invention are not shown.

Overall Configuration of Information Processing System S

Figure 1:
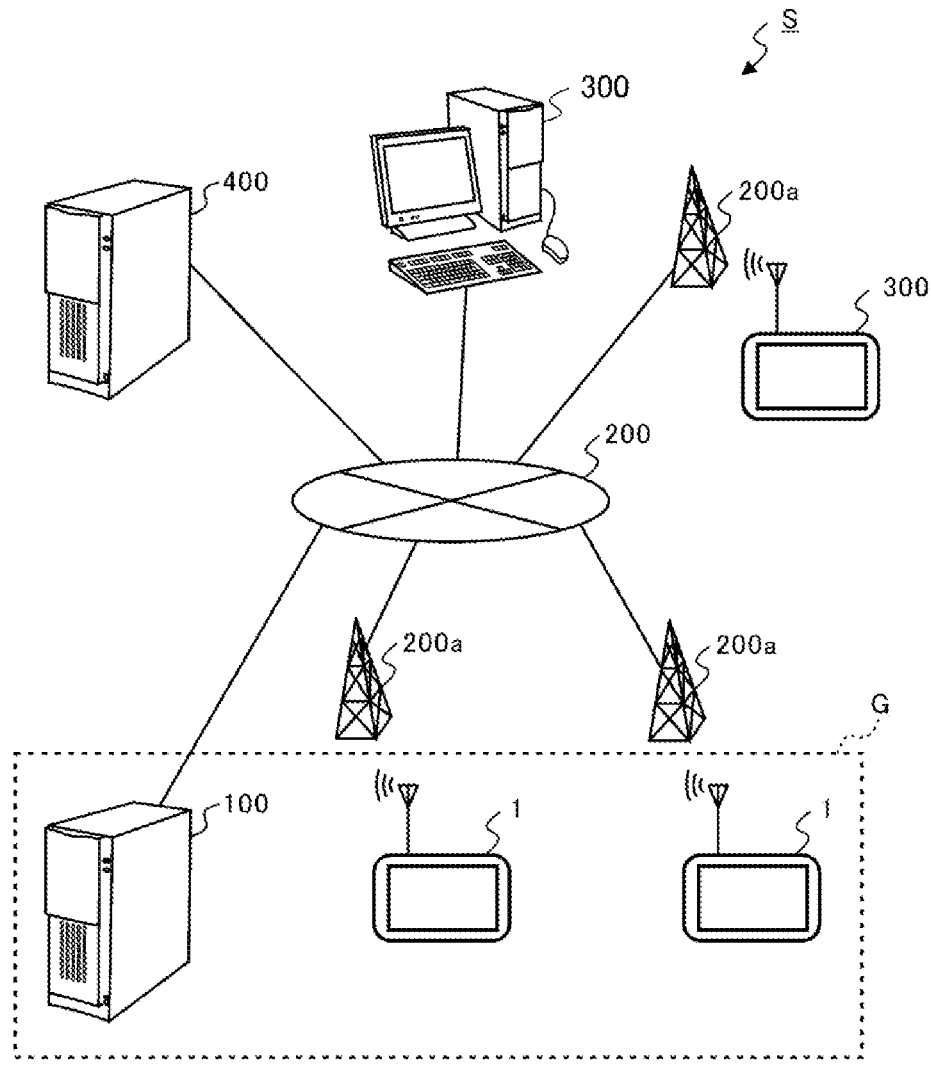
FIG. 1 is an illustration showing a schematic configuration of an information processing system.

FIG. 1 is an illustration showing a schematic configuration of an information processing system S. The information processing system S is what is called a client-server system, including player terminals 1, a server 100, a communication network 200 having communication base stations 200*a*, client terminals 300, and a site server 400. Information processing programs are various kinds of programs executed by the information processing system S.

Each of the player terminals 1 can establish communication with the server 100 via the communication network 200. The player terminals 1 widely include electronic appliances that can be communicatively connected to the server 100 by wire or wirelessly. Examples of the player terminals 1 include smartphones, mobile phones, tablet devices, personal computers, game devices, etc. This embodiment will be described in the context of the case where smartphones are used as the player terminals 1.

The server 100 is communicatively connected to the plurality of player terminals 1. The server 100 manages a game and accumulates various kinds of information (player information) for each player who plays the game. Furthermore, the server 100 updates the accumulated information and controls the progress of the game on the basis of operations input from the player terminals 1.

The communication base stations 200*a* are connected to the communication network 200, and send information to and receive information from the player terminals 1 and the client terminals 300 wirelessly. The communication network 200 is configured of a mobile phone network, the Internet, a local area network (LAN), a dedicated line, etc. The communication network 200 realizes wired or wireless communicative connection between the player terminals 1 and the server 100. In addition, the communication network 200 realizes wired or wireless communicative connection between the client terminals 300 and the site server 400. Furthermore, the communication network 200 may realize communicative connection between the server 100 and the site server 400. Note that, in the communication network 200, a configuration for realizing communicative connection between the player terminals 1 and the server 100 and a configuration for realizing communicative connection between the client terminals 300 and the site server 400 may be provided separately or may be provided integrally.

In the information processing system S according to this embodiment, each of the player terminals 1 and the server 100 function as a game device G. The player terminal 1 and the server 100 individually have assigned thereto roles for controlling the progress of the game such that it is possible to proceed with the game through cooperation between the player terminal 1 and the server 100.

Each of the client terminals 300 can establish communication with the site server 400 via the communication network 200. The client terminals 300 widely include electronic appliances that are capable of wired or wireless communication connection to the site server 400. Examples of the client terminals 300 include smartphones, mobile phones, tablet devices, personal computers, game devices, etc. As described below, in this embodiment, a client terminal 300 will be described by way of an example where it is realized by a smartphone and also by way of an example where it is realized by a personal computer.

The site server 400 is communicatively connected to the plurality of client terminals 300. The site server 400 manages a particular site on the Internet. The particular site is, for example, a game portal site where information concerning the game provided by a game device G is placed. The site server 400 does not control the progress of the game itself. The site server 400 stores information concerning game media used for the game. The site server 400 transmits information concerning game media to a client terminal 300 in response to a request from the client terminal 300 and displays the information on the display of the client terminal 300.

In this embodiment, the player terminal 1 corresponds to a terminal device in which the game application is executed, and the client terminal 300 corresponds to a terminal device in which the game application is not executed. That is, the player terminal 1 and the client terminal 300 are discriminated merely for the sake of convenience depending on whether or not the game application is executed. In the information processing system S, one terminal device (hardware) may be made to function as a player terminal 1 in some cases and may be made to function as a client terminal 300 in other cases. In addition, the player terminal 1 and the client terminal 300 may be configured from separate terminal devices (hardware).

Hardware Configurations of Player Terminal 1 and Server 100

Figure 2A:
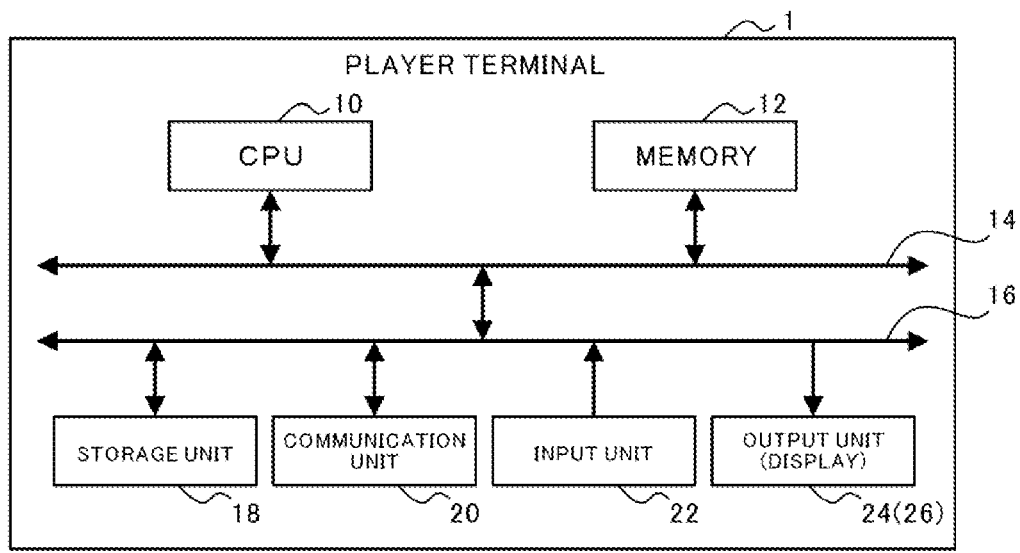
FIG. 2A is a drawing for illustrating the hardware configuration of a player terminal.
Figure 2B:
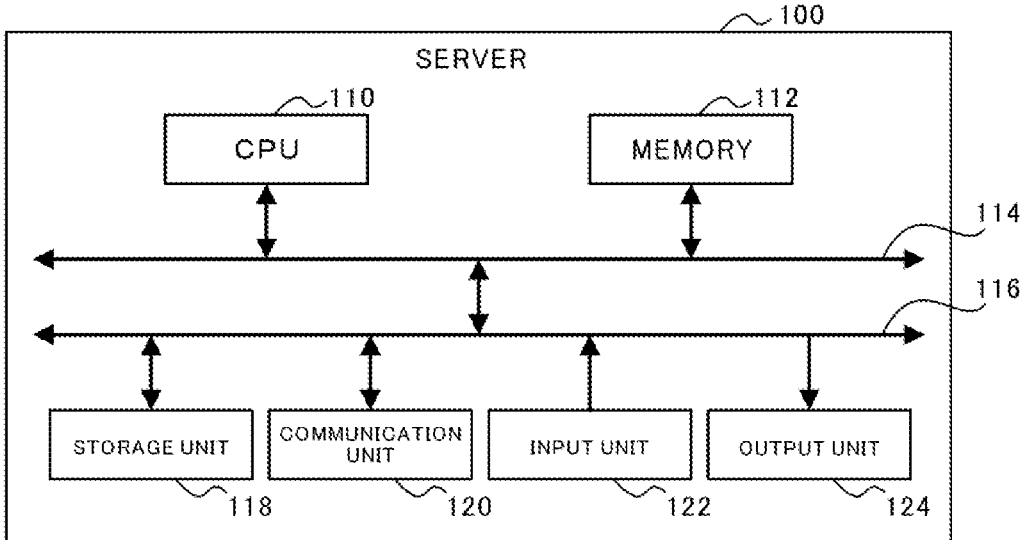
FIG. 2B is a drawing for illustrating the hardware configuration of a server.

FIG. 2A is a drawing for illustrating the hardware configuration of the player terminal 1. In addition, FIG. 2B is a drawing for illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the server 100 will be omitted.

The CPU 10 runs programs stored in the memory 12 to control the progress of the game. The memory 12 is configured of a read only memory (ROM) or a random access memory (RAM), and stores the programs, as well as various kinds of data, needed for controlling the progress of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs or data stored in the storage unit 18 are loaded into the memory 12 (RAM) by the CPU 10.

The communication unit 20 is communicatively connected to the communication base stations 200a wirelessly, and sends information to and receives information from the server 100 via the communication network 200, such as various kinds of data and programs. At the player terminal 1, the programs or data received from the server 100 are stored in the memory 12 or the storage unit 18.

The input unit 22 is configured of, for example, a touchscreen, buttons, a keyboard, a mouse, arrow keys, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects the player's speech. That is, the input unit 22 widely includes devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is laid over the display 26.

Hardware Configuration of Client Terminal 300 and Site Server 400

Figure 3A:
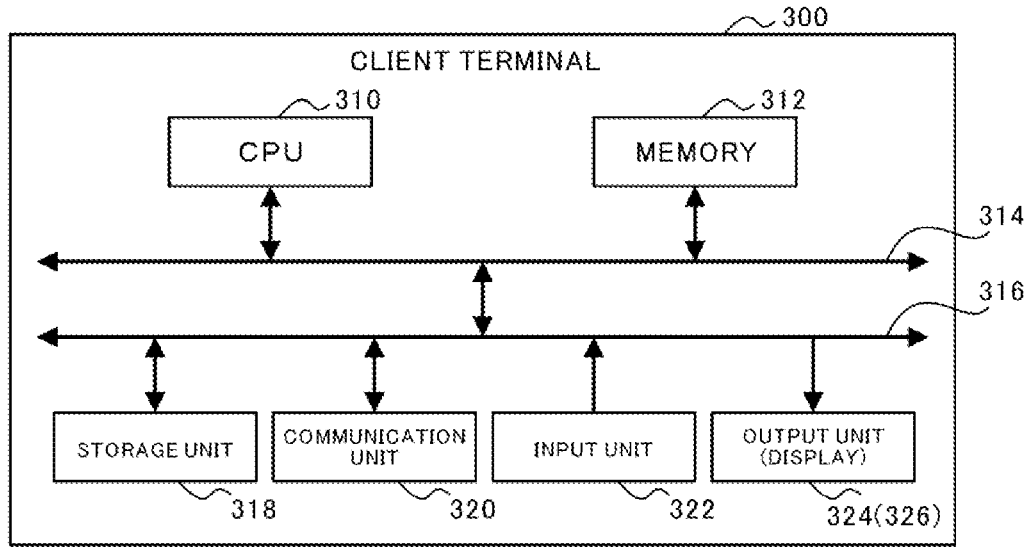
FIG. 3A is a drawing for illustrating the hardware configuration of a client terminal.
Figure 3B:
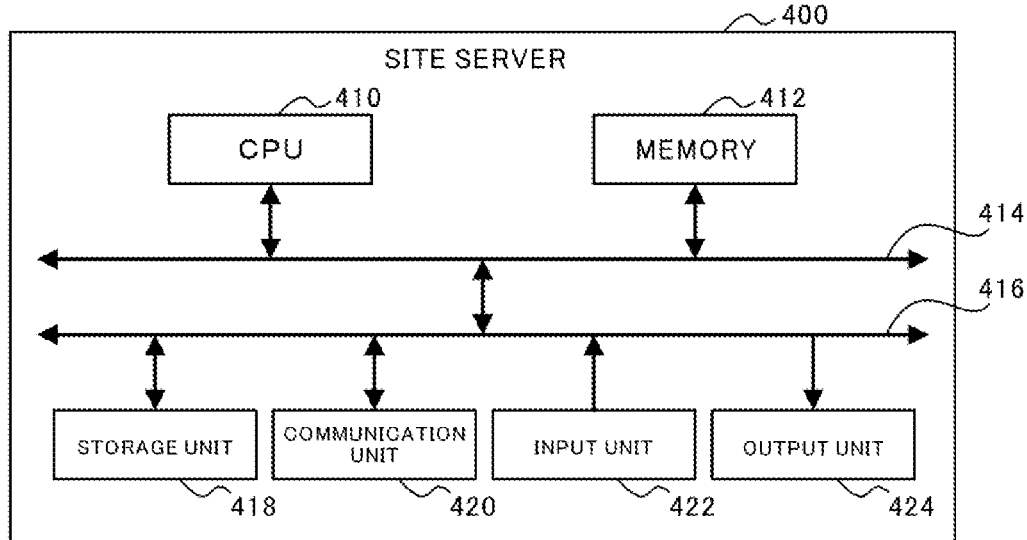
FIG. 3B is a drawing for illustrating the hardware configuration of a site server.

FIG. 3A is a drawing for illustrating the hardware configuration of the client terminal 300. FIG. 3B is a drawing for illustrating the hardware configuration of the site server 400. As shown in FIG. 3A, the client terminal 300 is configured to include a central processing unit (CPU) 310, a memory 312, a bus 314, an input/output interface 316, a storage unit 318, a communication unit 320, an input unit 322, and an output unit 324.

Furthermore, as shown in FIG. 3B, the site server 400 is configured to include a CPU 410, a memory 412, a bus 414, an input/output interface 416, a storage unit 418, a communication unit 420, an input unit 422, and an output unit 424.

The configurations and functions of the CPU 410, the memory 412, the bus 414, the input/output interface 416, the storage unit 418, the communication unit 420, the input unit 422, and the output unit 424 of the site server 400 are substantially the same as those of the CPU 310, the memory 312, the bus 314, the input/output interface 316, the storage unit 318, the communication unit 320, the input unit 322, and the output unit 324, respectively, of the client terminal 300. Thus, a description of the hardware configuration of the client terminal 300 will be given below, and a description of the site server 400 will be omitted.

The CPU 310 runs programs stored in the memory 312 and controls the entire client terminal 300, such as transmission/reception of data to/from the site server 400. The memory 312 is configured of a read only memory (ROM) or a random access memory (RAM), and stores various kinds of programs and data. The memory 312 is connected to the CPU 310 via the bus 314.

The input/output interface 316 is connected to the bus 314. The storage unit 318, the communication unit 320, the input unit 322, and the output unit 324 are connected to the input/output interface 316.

The storage unit 318 is configured of a semiconductor memory, such as a dynamic random access memory (DRAM), and stores various kinds of programs and data. At the client terminal 300, the programs or data stored in the storage unit 318 are loaded into the memory 312 (RAM) by the CPU 310.

The communication unit 320 is communicatively connected to the communication base stations 200a wirelessly, and sends information to and receives information from the site server 400 via the communication network 200, such as various kinds of data and programs. The communication unit 320 may be connected to the communication network 200 by wire. At the client terminal 300, the programs or data received from the site server 400 are stored in the memory 312 or the storage unit 318.

The input unit 322 is configured of, for example, a touchscreen, buttons, a keyboard, a mouse, arrow keys, or an analog controller for accepting user operations. Alternatively, the input unit 322 may be a special controller provided in the client terminal 300 or connected (externally attached) to the client terminal 300. Alternatively, the input unit 322 may be configured of an acceleration sensor that detects tilting or movement of the client terminal 300 or a microphone that detects the user's speech. That is, the input unit 322 widely includes devices that enable the user to input his or her intents in distinguishable manners.

The output unit 324 is configured to include a display device and a speaker. The output unit 324 may be a device connected (externally attached) to the client terminal 300. In this embodiment, the client terminal 300 is provided with a display 326 as the output unit 324 and is provided with a touchscreen as the input unit 322, wherein the touchscreen is laid over the display 326.

Game Specifics

Next, specifics of the game provided by the information processing system S (game device G) according to this embodiment will be described by using an example. The game in this embodiment is a so-called digital card game. A player earns and possesses, by lottery, etc., a plurality of kinds of digital cards (game media, referred to simply as cards hereinafter) provided by a game administrator. The player can play a card battle game in which the player fights a battle against a computer or another player by using his/her possessed cards. Specifics of the game in this embodiment will be described below in detail.

Figures 4A, 4B, 4C:
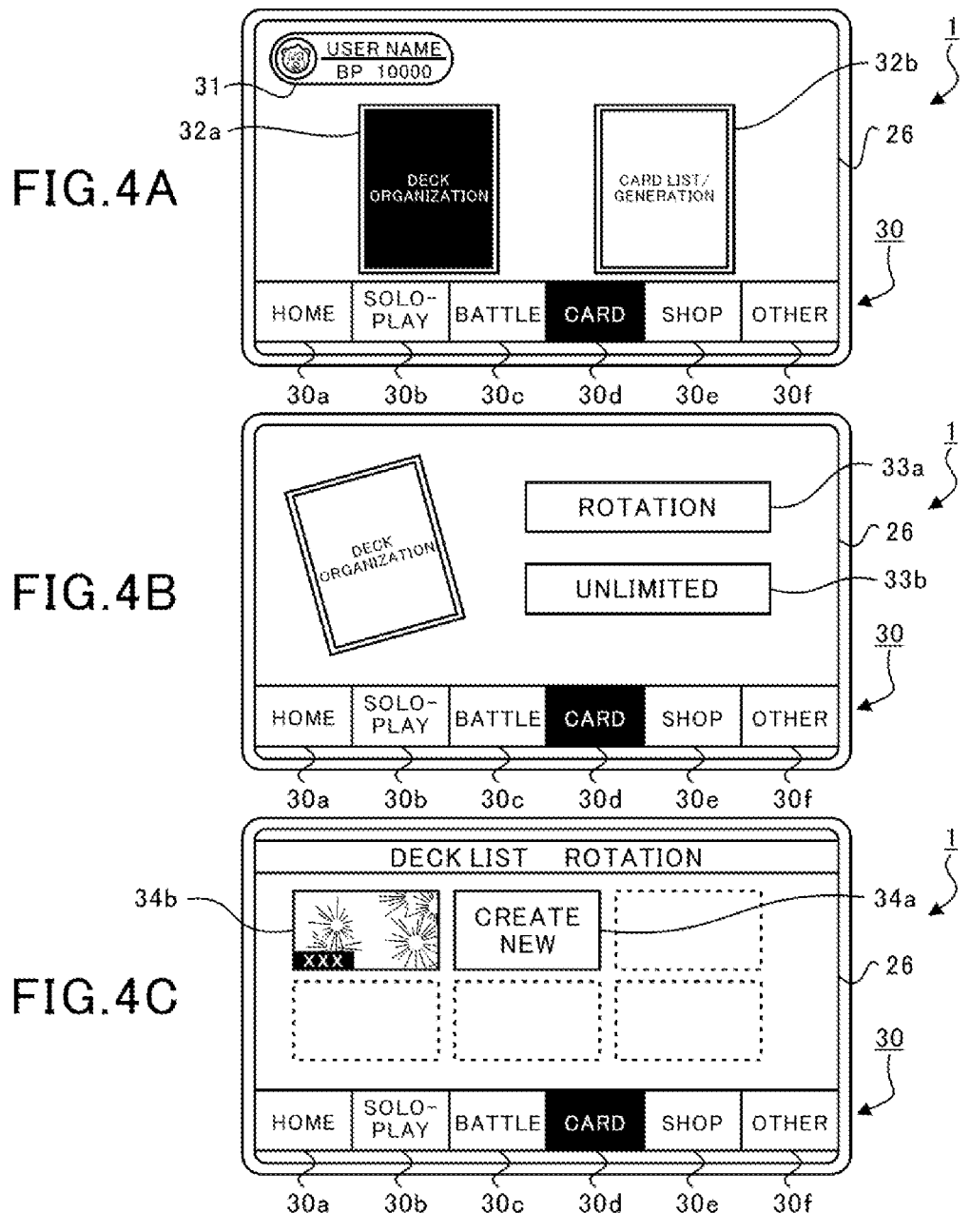
FIG. 4A is a diagram showing an example of a card setting screen.
FIG. 4B is a diagram showing an example of a format selection screen.
FIG. 4C is a diagram showing an example of a deck selection screen.

FIG. 4A is a diagram showing an example of a card setting screen. FIG. 4B is a diagram showing an example of a format selection screen. FIG. 4C is a diagram showing an example of a deck selection screen.

When the application for the present game (game application) is started at a player terminal 1, communication between the player terminal 1 and the server 100 starts, a login state is entered, and the game is started. When the game is started, various game screens are displayed on the display 26 of the player terminal 1. In this embodiment, the game screens are roughly classified into normal screens and a battle screen.

The normal screens are screens on which the player mainly performs various kinds of settings and confirms information. On the other hand, the battle screen is a screen displayed on the display 26 from the start to the end of the card battle game. Here, all screens other than the battle screen are normal screens. The normal screens include a plurality of screens, such as a home screen (not shown in the figure), the card setting screen shown in FIG. 4A, a shop screen (not shown in the figure), and a menu screen (not shown in the figure).

On the card setting screen, a menu bar 30 is displayed at the bottom of the display 26, as shown in FIG. 4A. A plurality of operation sections that can be operated (tapped) by the player are provided in the menu bar 30. A home-screen selection operation section 30a captioned "Home", a solo-play selection operation section 30b captioned "Solo-play", a multi-play selection operation section 30c captioned "Battle", a card setting screen selection operation section 30d captioned "Card", a shop screen selection operation section 30e captioned "Shop", and a menu screen selection operation section 30f captioned "Other" are provided in the menu bar 30.

When the home-screen selection operation section 30a is tapped, a predetermined home screen is displayed on the display 26. In addition, when the solo-play selection operation section 30b is tapped, various kinds of setting screens are displayed. When the player makes settings on the setting screens, a card battle game in the form of a battle against the computer is started. When the multi-play selection operation section 30c is tapped, various kinds of setting screens are displayed. When the player makes settings on the setting screens, a card battle game in the form of a battle against another player through communication is started. When the card setting screen selection operation section 30d is tapped, the card setting screen shown in FIG. 4A is displayed on the display 26. The player can organize a deck, list cards, destroy/generate a card, etc., as described below. In addition, when the shop screen selection operation section 30e is tapped, the shop screen is displayed on the display 26. The player can earn cards by lottery by consuming in-game currency or items. In addition, when the menu screen selection operation section 30f is tapped, the menu screen is displayed on the display 26. The player can confirm game settings and various kinds of information. Note that in the menu bar 30, the operation section corresponding to each screen is highlighted so that the screen being displayed on the display 26 can be identified. In FIG. 4A, for example, the background of the card setting screen selection operation section 30d is highlighted, indicating that the card setting screen is currently displayed on the display 26.

As shown in FIG. 4A, a header display region 31 is provided in the upper left section of the card setting screen. A player name (user name), a player icon, and battle points (BP) associated with a player ID are displayed in the header display region 31. Battle points can be earned when the player wins a card battle game played against another player through communication. Battle points are decreased when the player loses a card battle game played against another player through communication.

As shown in FIG. 4A, a deck organization tab 32a and a card list/generation tab 32b are displayed on the card setting screen. A deck refers to a card group (i.e., game medium group) indicating a group (or set) of cards selected from among a plurality of cards. A deck may be organized on the basis of a selection made by the player (user) or may be automatically organized by the player terminal 1.

When the deck organization tab 32a is tapped, the format selection screen shown in FIG. 4B is displayed. A format specifies card classifications, i.e., cards, that are available in a card battle game, and it can be said that a format constitutes a game condition in the card battle game. When playing a card battle game, the player organizes a deck by using only the cards corresponding to the selected format. In this embodiment, there are two kinds of formats: rotation and unlimited.

Here, in this embodiment, the player is provided with cards that differ from one game distribution period to another. In this embodiment, game conditions, namely available cards, in the card battle game differ for each of the game distribution periods. For example, one distribution period is composed of four months, and the distribution period is updated every four months. Cards are provided by the game administrator, and each time the distribution period is updated, cards belonging to a new card classification are provided by the game administrator. The rotation format is a format for allowing the use of only cards belonging to the most recent five kinds of card classifications among the provided card classifications. On the other hand, the unlimited format is a format in which the player can use not only the most recent five kinds of card classifications, as in the rotation format in the same term, but also all of the possessed cards among the cards belonging to all card classifications provided therebefore.

As shown in FIG. 4B, a rotation format selection tab 33a and an unlimited format selection tab 33b are displayed on the format selection screen. When the rotation format selection tab 33a is tapped, a deck selection screen for the rotation format shown in FIG. 4C is displayed. In addition, when the unlimited format selection tab 33b is tapped, a deck selection screen for the unlimited format (not shown in the figure) is displayed. Note that the deck selection screen for the unlimited format is substantially identical to the deck selection screen for the rotation format. Therefore, the deck selection screen for the rotation format will be described below, and descriptions of the deck selection screen for the unlimited format will be omitted. In addition, the deck selection screen for the rotation format or the unlimited format will be referred to just as the deck selection screen hereinafter.

As shown in FIG. 4C, a list of decks organized by the player is displayed on the deck selection screen. A deck can be organized so as to correspond to one of the formats. Only the decks corresponding to the format selected on the format selection screen are displayed on the deck selection screen.

On the deck selection screen, a deck creation tab 34a captioned "Create new" is displayed. When the player taps the deck creation tab 34a, a new deck can be created as described below. In addition, a created-deck tab 34b, which is an icon indicating a created deck, is displayed on the deck selection screen. When the player taps the created-deck tab 34b, the organization of a created deck can be changed as described below. In addition, when organizing a deck, the player can organize a deck name. On the deck selection screen, a deck name is displayed on the icon corresponding to each of the decks.

Figures 5A, 5B, 5C:
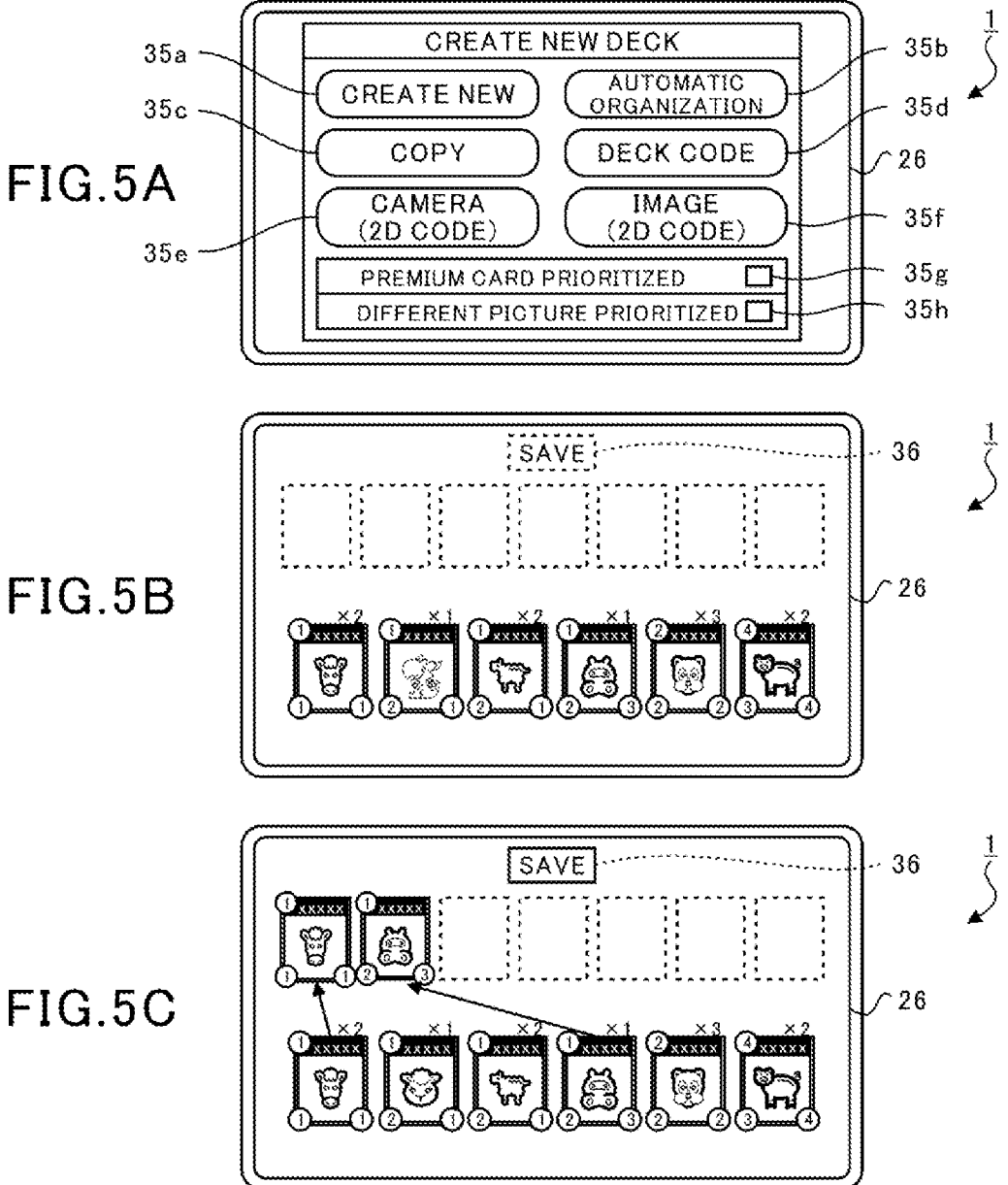
FIG. 5A is a diagram showing an example of an organization method selection screen.
FIG. 5B is a diagram showing an example of a deck organization screen in an initial state.
FIG. 5C is a diagram showing an example of a deck organization screen during organization.

FIG. 5A is a diagram showing an example of an organization method selection screen. FIG. 5B is a diagram showing an example of a deck organization screen in an initial state. FIG. 5C is a diagram showing an example of the deck organization screen during organization.

When the deck creation tab 34a in FIG. 4C is tapped, the organization method selection screen shown in FIG. 5A is displayed. On the organization method selection screen, a new creation tab 35a captioned "Create new", an automatic organization tab 35b captioned "Automatic organization", a copy tab 35c captioned "Copy", a deck code tab 35d captioned "Deck code", a camera tab 35e captioned "Camera (2D code)", and an image tab 35f captioned "Image (2D code)" are displayed.

When the new creation tab 35a in FIG. 5A is tapped, the deck organization screen in an initial-state shown in FIG. 5B is displayed on the display 26, and a deck can be newly organized. As shown in FIG. 5B, on this deck organization screen, a plurality of blank spaces are displayed in the upper row, and cards possessed by the player (hereinafter, referred to as possessed cards) are displayed in the lower row. Also, on the deck organization screen, the player slides a possessed card displayed in the lower row to the upper row as shown in FIG. 5C, whereby the possessed card that has been slid is placed in a blank space in the upper row. By doing so, the possessed card placed in the upper row on the deck organization screen is temporarily registered. Also, when a save tab 36, captioned "Save", provided on the deck organization screen is tapped, the deck information is stored. This deck information is assigned a deck ID, and card group information capable of identifying all possessed cards that are temporarily registered is stored in association with the deck ID. Although not shown in the figure, when the save tab 36 is tapped, a screen for organizing a deck name is displayed. When organization of a deck name is completed, the deck name and the icon displayed on the deck selection screen, etc., as well as the card group information, are stored in association with the deck ID.

Note that a specified number of cards (e.g., 40 cards) are used in the card battle game. In general, therefore, on the deck organization screen, when the save tab 36 is tapped after a specified number of cards have been temporarily registered through player operations, deck information including card group information concerning the specified number of cards is stored. However, regardless of whether the number of temporarily registered cards is less than the specified number or exceeds the specified number, deck information can be stored. In this case, that deck information cannot be used in the card battle game.

When the automatic organization tab 35b in FIG. 5A is tapped, the player terminal 1 organizes a deck by automatically selecting cards from among the possessed cards, thus displaying the deck organization screen in the same manner as shown in FIG. 5C. In this case, the cards constituting the deck that has been automatically organized are displayed in the upper row, and the possessed cards are displayed in the lower row. The player can organize a new deck on the basis of the automatically organized deck. With such an automatic deck organization function, for example, even beginners who are not accustomed to organizing a deck can easily organize a deck.

When the copy tab 35c in FIG. 5A is tapped, a copy source selection screen (not shown in the figure) is displayed on the display 26. Decks that can be selected as a copy source are displayed in the form of icons on the copy source selection screen. When an icon is tapped on the copy source selection screen, the deck organization screen is displayed in the same manner as shown in FIG. 5C. In this case, the cards constituting the deck selected on the copy source selection screen are displayed in the upper row, and possessed cards are displayed in the lower row. The player can organize a new deck on the basis of the copy source deck. With such a deck copy function, a deck with only some cards replaced with different cards can be easily organized.

When the deck code tab 35d in FIG. 5A is tapped, a screen for accepting an input of a deck code is displayed. The player can organize a new deck by using a deck code. A deck code and deck organization by using the deck code will be described below in detail.

When the camera tab 35e in FIG. 5A is tapped, the camera installed in the player terminal 1 is activated, causing the player terminal 1 to be ready to read image information such as a two-dimensional code. Then, when reading of the two-dimensional code is completed, a new deck can be organized by using the read two-dimensional code. For, example, the two-dimensional code includes, but is not limited to, a QR Code®, and may be a bar code or other identifiable image information. Hereinafter, image information (e.g., two-dimensional code) used to organize a deck is referred to as identifying image information. The content of identifying image information, the reading of identifying image information, and the organization of a deck by using the read identifying image information will be described in detail below.

When the image tab 35f in FIG. 5A is tapped, the player terminal 1 can read identifying image information pre-stored in the storage unit 18 and organize a new deck by using the identifying image information. The reading of identifying image information and the organization of a deck by using the read identifying image information will be described in detail below.

In addition, a premium card prioritized checkbox 35g corresponding to an item captioned "Premium card prioritized" and a different picture prioritized checkbox 35h corresponding to an item captioned "Different picture prioritized" are displayed on the organization method selection screen. Cards include premium cards and different picture cards in addition to normal cards. Note that all cards other than the premium card and the different picture card are normal cards. Here, a card has two factors: a performance factor related to the strategy of a card battle game and a picture factor related to the appearance of the card. A premium card is a card that has the same performance as the normal card, but, unlike the normal card, the character, etc. of the picture of the premium card is animated with a particular motion. A different picture card is a card that has the same performance as the normal card but has a different picture from that of the normal card. The picture of the different picture card is not animated with a particular motion.

When the premium card prioritized checkbox 35g is tapped, the premium card prioritized checkbox 35g can be checked or unchecked. When the premium card prioritized checkbox 35g is checked, a deck can be organized with the premium card prioritized over the normal card in organizing the deck by using identifying image information, as described below. When the different picture prioritized checkbox 35h is tapped, the different picture prioritized checkbox 35h can be checked or unchecked. When the different picture prioritized checkbox 35h is checked, a deck can be organized with the different picture card prioritized over the normal card in organizing the deck by using identifying image information, as described below.

Figures 6A, 6B, 6C:
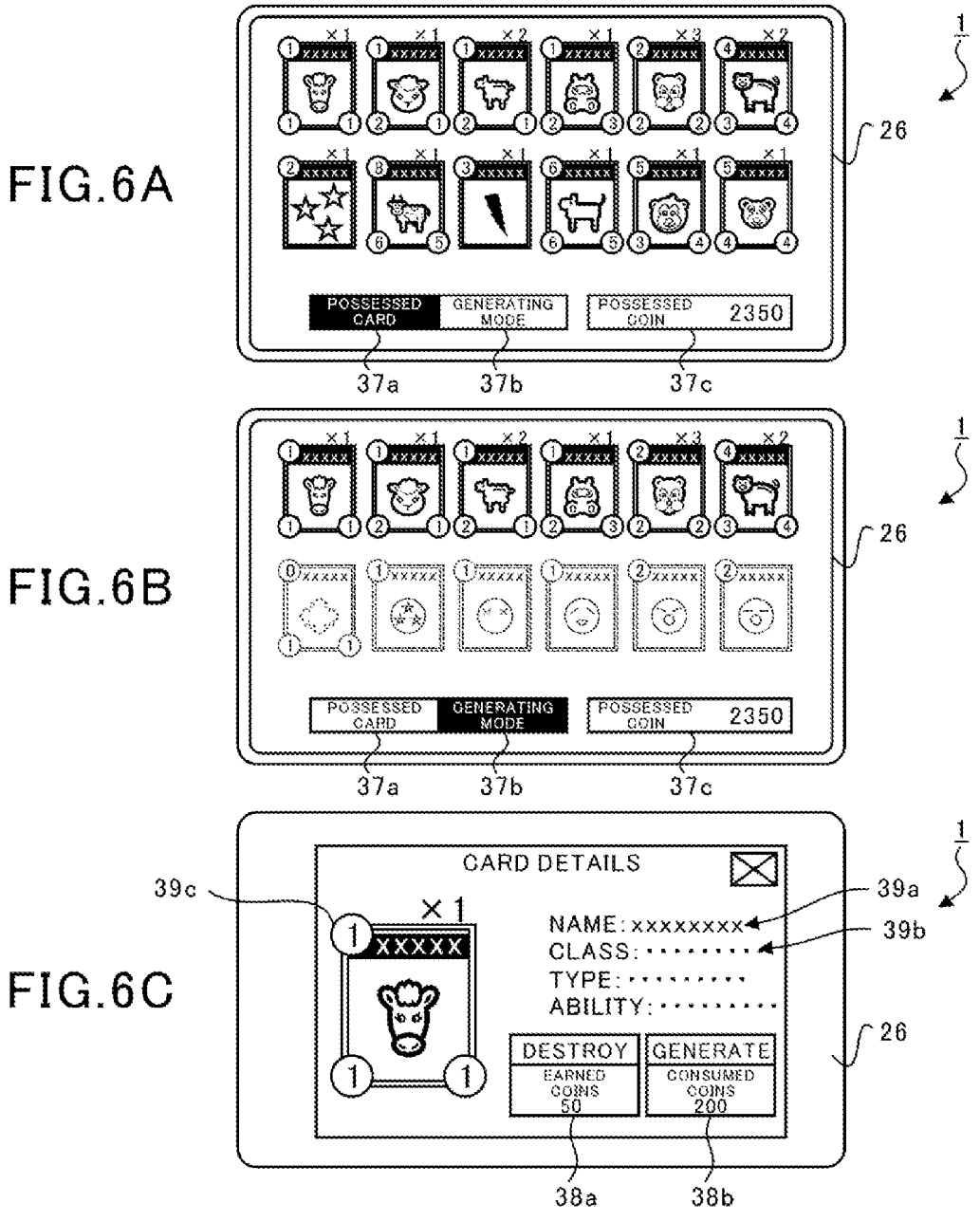
FIG. 6A is a diagram showing an example of a card list screen.
FIG. 6B is a diagram showing an example of a card generation screen.
FIG. 6C is a diagram showing an example of a card details screen.

FIG. 6A is a diagram showing an example of a card list screen. FIG. 6B is a diagram showing an example of a card generation screen. FIG. 6C is a diagram showing an example of a card details screen.

When the card list/generation tab 32b is tapped on the card setting screen shown in FIG. 4A, the card list screen shown in FIG. 6A is displayed on the display 26. On this card list screen, a possessed card tab 37a, a generating mode tab 37b, and a possessed coin display field 37c are provided in the lower section of the display 26. The possessed card tab 37a and the generating mode tab 37b are configured so as to be capable of accepting a tap operation performed by the player. The possessed card tab 37a and the generating mode tab 37b are also displayed on the card generation screen shown in FIG. 6B. When the possessed card tab 37a is tapped, the card list screen shown in FIG. 6A is displayed. When the generating mode tab 37b is tapped, the card generation screen shown in FIG. 6B is displayed. On the other hand, the number of coins, which are in-game currency, possessed by the player (number of possessed coins) is displayed in the possessed coin display field 37c.

As shown in FIG. 6A, the cards possessed by the player and the number of possessed cards are displayed on the card list screen. Note that a card that is not possessed by the player may be displayed on the card list screen. In addition, on the card generation screen, all of the provided cards are displayed, as shown in FIG. 6B, regardless of whether or not the cards are possessed by the player. It should be noted, however, that the cards possessed by the player are displayed in color, whereas cards not possessed by the player are displayed in a greyed-out manner (indicated by broken lines in FIG. 6B). This enables the player to easily identify whether or not each of the displayed cards is possessed by the player himself/herself.

When each of the cards is tapped on the card list screen and the card generation screen, a card details screen is displayed, as shown in FIG. 6C. On the card details screen, various kinds of information concerning the tapped card are displayed, and a destroying tab 38a and a generating tab 38b are provided.

The number of earned coins is displayed on the destroying tab 38a. When the destroying tab 38a is tapped, the currently selected card is destroyed, and the player can earn the same number of coins as that indicated as the number of earned coins on the destroying tab 38a. Note that when a card is destroyed, the number of relevant possessed cards is reduced.

The number of consumed coins is displayed on the generating tab 38b. When the generating tab 38b is tapped, the selected card can be generated by consuming the same number of coins as that indicated as the number of consumed coins on the generating tab 38b. When a card is generated, the number of relevant possessed cards is increased. In other words, the player can exchange possessed coins for a card by tapping the generating tab 38b. Such a card generating function can be executed regardless of whether or not the card is possessed by the player. More specifically, the player can generate both a possessed card and a non-possessed card.

Note that the provided cards may include cards that can be generated and cards that cannot be generated, or alternatively, it is also acceptable that all cards can be generated. Furthermore, the provided cards may include a card in which a time during which the card can be generated and a time during which the card cannot be generated are set.

In addition, as shown in FIG. 6C, each card has set therefor a name 39a, a class 39b, and a cost 39c, regardless of the card type. The name 39a is set uniquely for each card. The class 39b includes a plurality of kinds of classes, and each card is categorized in one of the classes. The cost 39c indicates play points required to "play" a card in the card battle game. A card can be played by consuming play points equivalent to its cost. The card battle game is advanced by the player moving cards placed in the player's hand region to another region, as described below. "Play" means to move a card from the player's hand region to another region in the card battle game.

Figures 7A, 7B, 7C:
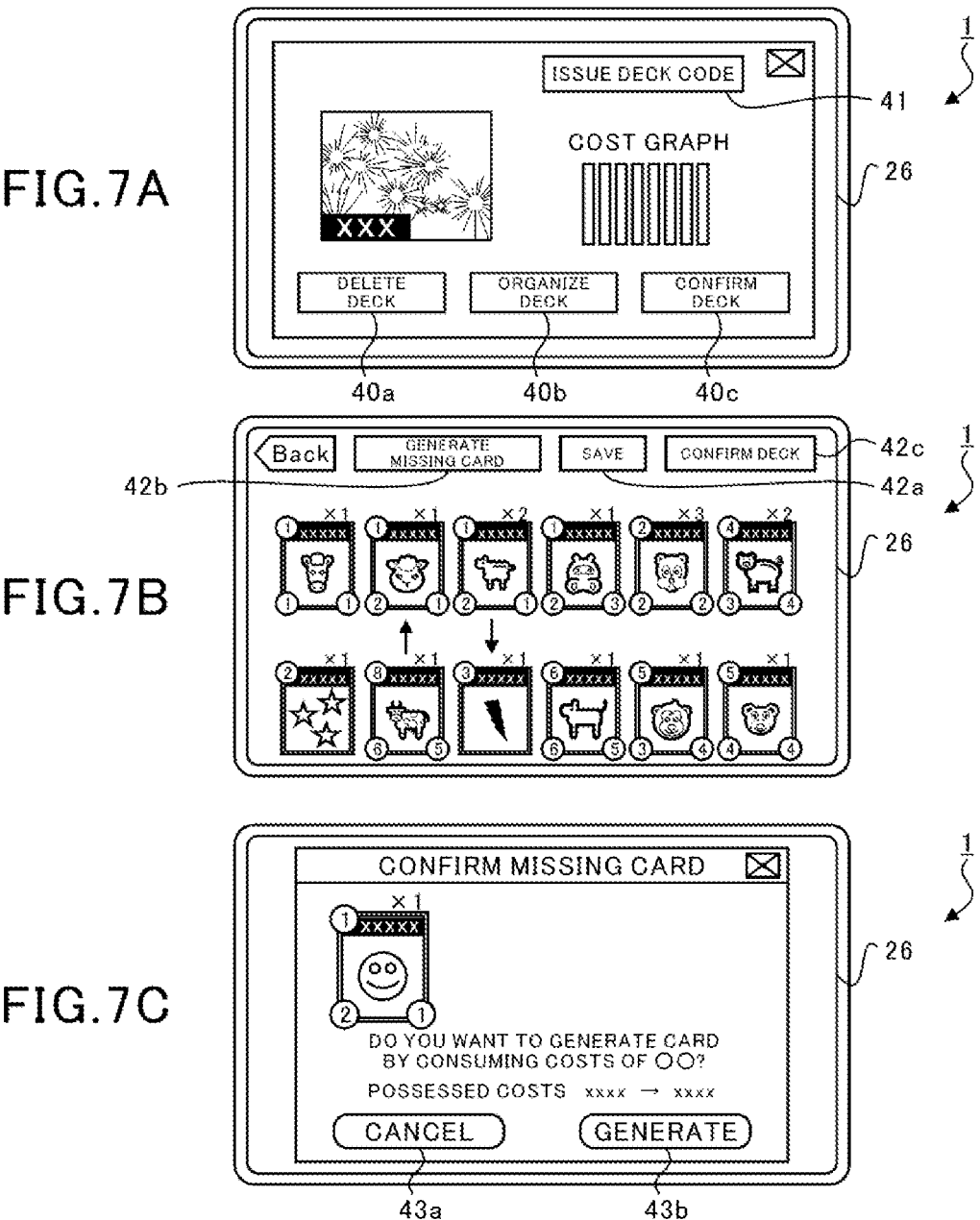
FIG. 7A is a diagram showing an example of a deck overview screen.
FIG. 7B is a diagram showing an example of the deck organization screen.
FIG. 7C is a diagram showing an example of a missing card confirmation screen.

FIG. 7A is a diagram showing an example of a deck overview screen. FIG. 7B is a diagram showing an example of the deck organization screen. FIG. 7C is a diagram showing an example of a missing card confirmation screen.

When the created-deck tab 34b, which is an icon indicating a created deck, is tapped on the deck selection screen in FIG. 4C, the deck overview screen shown in FIG. 7A is displayed. An icon, a deck name, and a cost graph corresponding to the currently selected deck are displayed on the deck overview screen. The cost graph shows the cost of each of the cards constituting the deck in the form of a graph indicating the number of cards corresponding to each of the costs.

In addition, a deck delete tab 40a captioned "Delete deck", a deck organization tab 40b captioned "Organize deck", a deck confirmation tab 40c captioned "Confirm deck", and a deck code issuing tab 41 captioned "Issue deck code" are displayed on the deck overview screen. When the deck code issuing tab 41 in FIG. 7A is tapped, a deck code for the currently selected deck can be issued, as described below.

When the deck delete tab 40a in FIG. 7A is tapped, the currently selected deck is deleted. When the deck organization tab 40b is tapped, the deck organization screen shown in FIG. 7B is displayed, and a deck can be reorganized on the basis of the currently selected deck.

As shown in FIG. 7B, a save tab 42a captioned "Save", a missing card generating tab 42b captioned "Generate missing card", and a deck confirmation tab 42c captioned "Confirm deck" are displayed on the deck organization screen. On the deck organization screen, the cards constituting the currently selected deck are displayed in the upper row, and the possessed cards are displayed in the lower row. On the deck organization screen, a card displayed in the upper row can be changed with a possessed card displayed in the lower row through a player operation. Then, when the save tab 42a is tapped, the content of the organization of the selected deck is updated and saved.

When the missing card generating tab 42b in FIG. 7B is tapped, the missing card confirmation screen shown in FIG. 7C is displayed. If there is a non-possessed card, i.e., a missing card, in the currently selected deck, the missing card is displayed on the missing card confirmation screen. In addition, a cancel tab 43a captioned "Cancel" and a missing card generation execution tab 43*b* captioned "Generate" are displayed on the missing card confirmation screen. When the cancel tab 43*a* is tapped, the screen returns to the deck organization screen shown in FIG. 7B without executing generation of the missing card. When the missing card generation execution tab 43*b* is tapped, the missing card is generated, and the screen returns to the deck organization screen, where cards are displayed such that the generated card is reflected in the upper row.

Figures 8A, 8B:
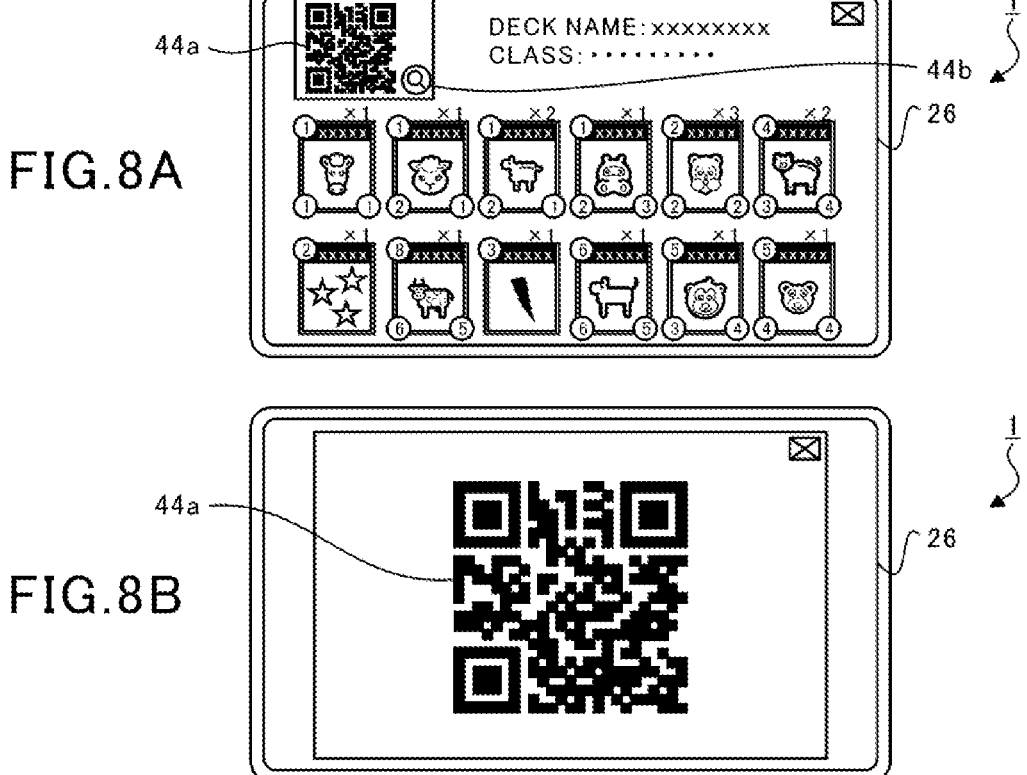
FIG. 8A is a diagram showing an example of a deck confirmation screen.
FIG. 8B is a diagram showing an example of an identifying image information magnification screen.

FIG. 8A is a diagram showing an example of a deck confirmation screen. FIG. 8B is a diagram showing an example of an identifying image information magnification screen.

When the deck confirmation tab 40*c* in FIG. 7A or the deck confirmation tab 42*c* in FIG. 7B is tapped, the deck confirmation screen shown in FIG. 8A is displayed. On the deck confirmation screen, cards constituting the currently selected deck are displayed.

In addition, as shown in FIG. 8A, identifying image information 44*a* corresponding to the currently selected deck and a magnification mark 44*b*, which is a magnifying glass icon, are displayed on the deck confirmation screen. The identifying image information 44*a* is, for example, a two-dimensional code and is displayed in the upper left corner of the display 26. Note that the display position of the identifying image information 44*a* is not limited to the position shown in the example, but may be any position. Thus, both cards belonging to the selected deck and the identifying image information are displayed on the deck confirmation screen. Although described below, for example, when the player of a different player terminal 1 from the player terminal 1 displaying the identifying image information 44*a* taps the camera tab 35*e* in FIG. 5A at that different player terminal 1, the player of the different player terminal 1 can read the identifying image information 44*a*. By doing so, a deck based on the identifying image information 44*a* can be reproduced at that different player terminal 1.

The magnification mark 44*b* in FIG. 8A is displayed, for example, in the lower right corner of the identifying image information 44*a*. Note that the display position of the magnification mark 44*b* is not limited to the position shown in the example, but may be any position. When the magnification mark 44*b* is tapped, the identifying image information magnification screen shown in FIG. 8B is displayed. On the identifying image information magnification screen, the identifying image information 44*a* is displayed in a magnified manner at the center of the display 26. Because the identifying image information 44*a* is displayed in a magnified manner, it becomes easier to read the identifying image information 44*a*.

FIG. 9 is a drawing for illustrating the identifying image information 44*a*. The identifying image information 44*a* is generated by converting a character string in a predetermined format into image information as shown in FIG. 9. Note that the character string is not limited to characters, but may include symbols or numbers. The character string in a predetermined format is, for example, a uniform resource locator (URL) that denotes the location of information resources, such as data or services, that exist on the communication network 200. Note that the specific character string shown in FIG. 9 is an example, and may be any character string without being limited to this example. In addition, information in the form of a predetermined character string converted from the identifying image information 44*a* may be referred to as character string information, hereinafter.

The identifying image information 44*a* (or character string information) includes communication connection information 46 and hash IDs 47, as shown in FIG. 9. The communication connection information 46 is information for communication connection to a particular communication destination on the communication network 200. The particular communication destination is, for example, the site server 400, or more particularly, a particular site managed by the site server 400. That is, the communication connection information 46 indicates the location of the site server 400 on the communication network 200. For this reason, when the identifying image information 44*a* is read, it is possible to establish a communication connection to the site server 400.

A hash ID 47 is game medium identification information that is individually associated with each card and can identify each individual card. A hash ID 47 is composed of, for example, a five-digit character string. Note that the character string is not limited to characters, but may also include symbols or numbers. In addition, the hash ID 47 is not limited to a five-digit character string, but may be a character string of any number of digits. In the example in FIG. 9, "6ujq2", "745Mi", "77ygg", "72BIC", "63E_6", "745Ms", "74CHI", "6n5Y2", "745MY", "77vVi", "747oy", "748Xg", "747oo", and "70Mqw" are each a hash ID 47 for one card.

The identifying image information 44*a* includes the hash IDs 47 of individual cards constituting the deck (game medium group) corresponding to that identifying image information 44*a*. In other words, the identifying image information 44*a* includes a specified number (e.g., 40) of hash IDs 47 that identify the specified number (e.g., 40) of respective cards constituting the deck (game medium group) corresponding to that identifying image information 44*a*. In the example shown in FIG. 9, 40 five-digit hash IDs 47 are described, each delimited by a "." (dot). Note that a deck can include up to a predetermined number of duplicate cards (e.g., three cards) of one type. For this reason, the same hash ID 47 may be included in the identifying image information 44*a* in duplicate up to a predetermined number (e.g., three).

FIG. 10 is a drawing for illustrating a card master including hash IDs 47. The card master shown in FIG. 10 is stored in the storage unit 118 of the server 100, and the server 100 manages the card master. When the game application is started on the player terminal 1, the player terminal 1 downloads the card master from the server 100 and stores it in the storage unit 18. In addition, the site server 400 may acquire the card master from the server 100 and store it in the storage unit 418.

In the card master, a hash ID 47 (game medium identification information), a card ID, a picture ID, and a performance ID are associated with one another for each of the card types, as shown in FIG. 10. The card ID is information that identifies the type of card while the game is advanced. The hash ID 47 is associated with the card ID on a one-to-one basis. Because of this, the hash ID 47 and the card ID can be converted interchangeably by means of the card master; for example, a card can be identified from the hash ID 47. In addition, the picture ID is information that identifies the picture displayed on the card. The performance ID is information that identifies the performance related to the strategy of the card battle game. The combination of the picture ID and the performance ID corresponds to one card ID. Thus, for example, a normal card and a different picture card have different card IDs. In addition, the card ID of a premium card or a different picture card is associated with the card ID of the normal card corresponding to that premium card or different picture card (e.g., card with the same performance ID but a different picture ID). For this reason, as described below, if a hash ID 47 in the identifying image information 44a indicates a normal card and a possessed card is a premium card or different picture card, then the normal card with that hash ID 47 can be converted into the premium card or different picture card corresponding to the normal card. In addition, if a hash ID 47 in the identifying image information 44a indicates a premium card or a different picture card and the player does not possess the premium card or different picture card, then the player can use the normal card corresponding to that premium card or different picture card instead.

In some cases, a player who differs from a particular player may wish to use a deck created by that particular player. In such a case, the particular player may publish the created deck on a social networking service (SNS), such as on a predetermined information sharing site.

Figure 11:
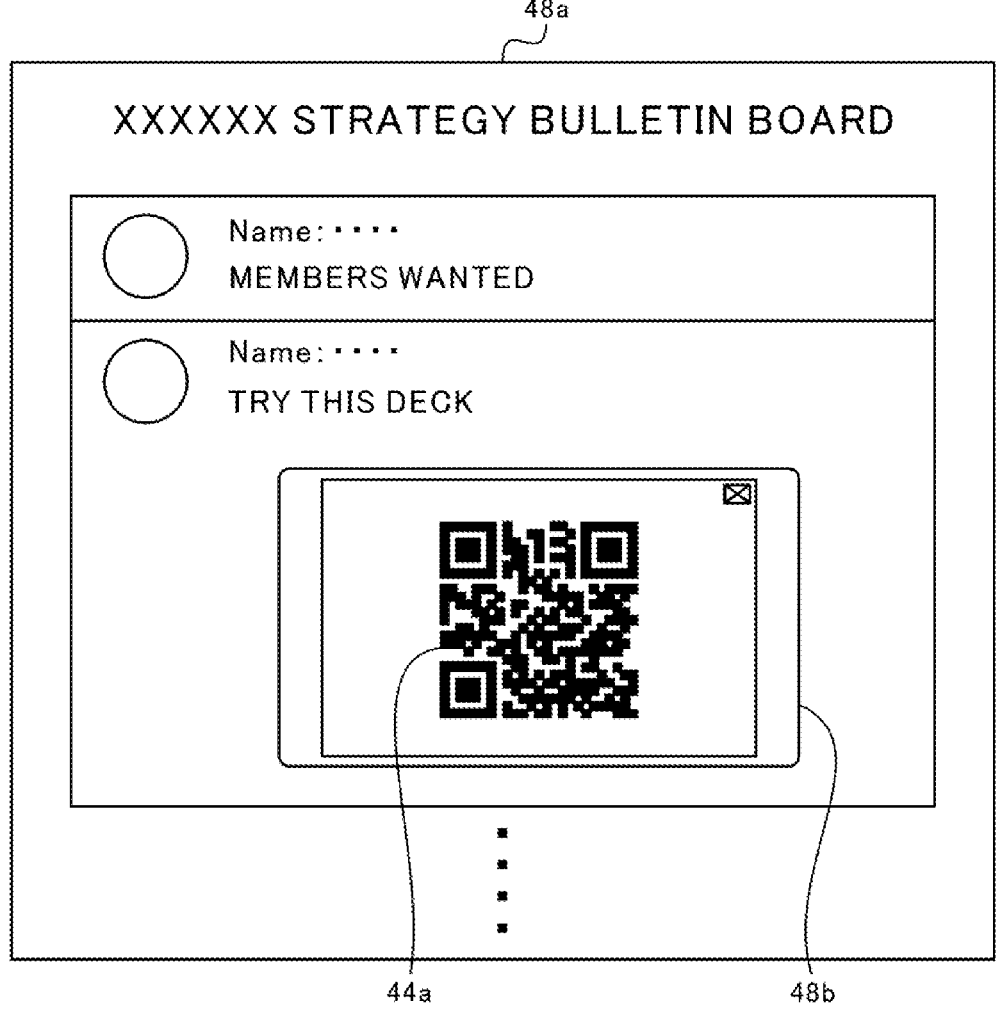
FIG. 11 is a diagram showing an example for publishing a deck at a predetermined information sharing site.

FIG. 11 is a diagram showing an example for publishing a deck at a predetermined information sharing site 48a. The predetermined information sharing site 48a is, for example, a strategy bulletin board for the present game but is not limited to this example and may be any website or the like.

A player who wishes to publish his/her deck (hereinafter, may be referred to as a "publisher player") captures (screenshots) the identifying image information magnification screen shown in, for example, FIG. 8B and saves it as an image file 48b in the storage unit 18. The publisher player then uploads, to the information sharing site 48a, the image file 48b of the identifying image information magnification screen saved in the storage unit 18, as shown in FIG. 11. With the image file 48b including the identifying image information 44a posted to the information sharing site 48a, any other player (hereinafter, may be referred to as a "reader player") can read the identifying image information 44a on the information sharing site 48a. By doing so, the reader player can easily reproduce, on his/her own player terminal 1, the deck published by the publisher player.

Note that the publisher player may capture the deck confirmation screen shown in FIG. 8A, save it as the image file 48b, and upload the image file 48b to the information sharing site 48a. Because the identifying image information 44a is also displayed on the deck confirmation screen, posting the image file 48b of the deck confirmation screen to the information sharing site 48a also allows the reader player to read the identifying image information 44a of the deck confirmation screen on that information sharing site 48a.

There are two kinds of methods for the reader player to read, with his/her player terminal 1, the identifying image information 44a posted on the information sharing site 48a in FIG. 11: by using a camera and by acquiring the image file 48b.

Figures 12A, 12B, 12C, 12D:
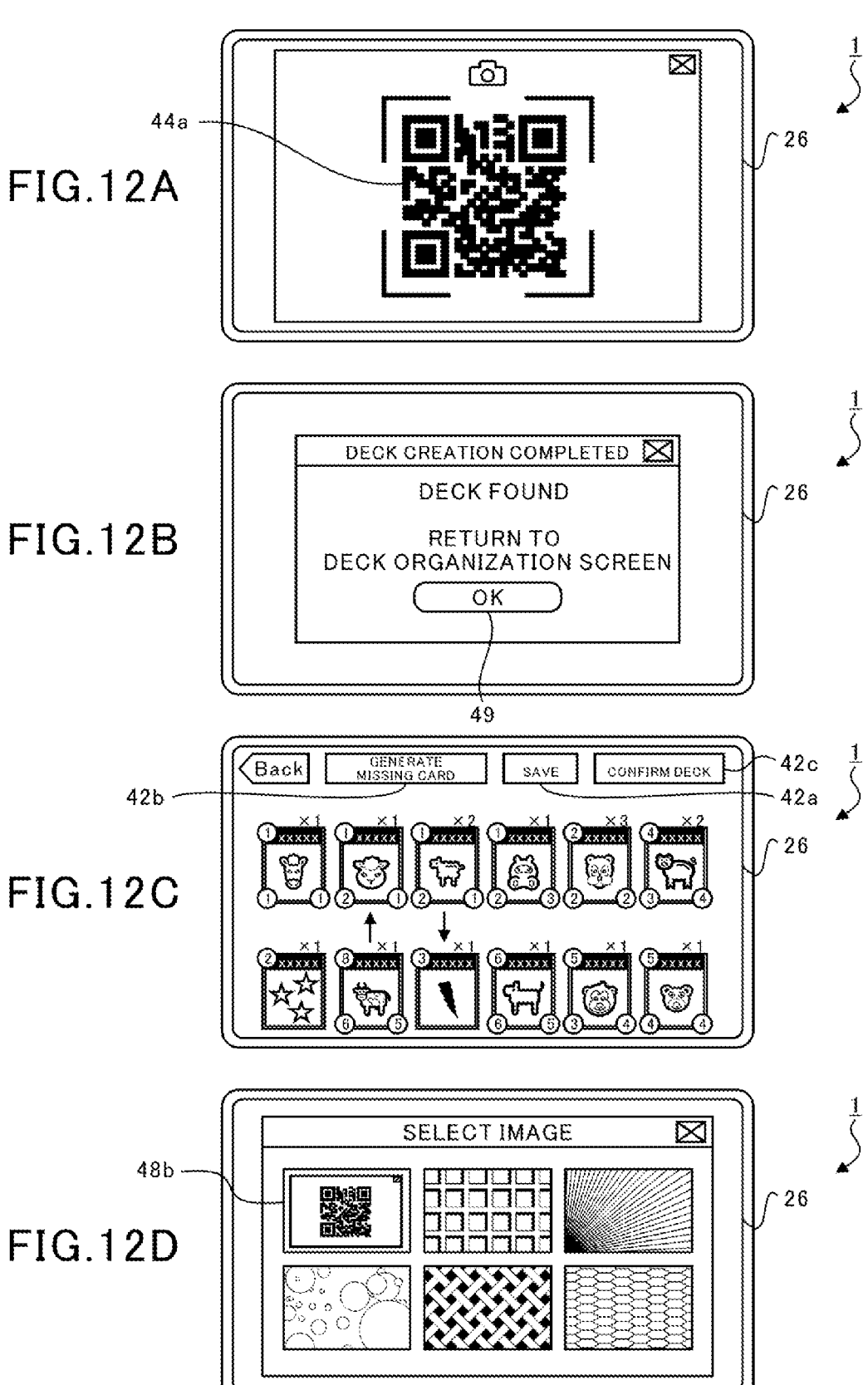
FIG. 12A is a diagram showing an example for reading identifying image information by means of a camera.
FIG. 12B is a diagram showing an example of a successful reading screen.
FIG. 12C is a diagram showing an example of a deck organization screen in a state in which a deck is reproduced in a game.
FIG. 12D is a diagram showing an example for reading identifying image information by means of an image file.

FIG. 12A is a diagram showing an example for reading the identifying image information 44a by means of a camera. FIG. 12B is a diagram showing an example of a successful reading screen. FIG. 12C is a diagram showing an example of the deck organization screen in a state in which a deck is reproduced in the game. FIG. 12D is a diagram showing an example for reading the identifying image information 44a by means of the image file 48b.

It is assumed, for example, that the information sharing site 48a shown in FIG. 11 is displayed on the display of different hardware (e.g., personal computer) from the player terminal 1 of the reader player. When the reader player taps the camera tab 35e on the organization method selection screen shown in FIG. 5A, the camera of the player terminal

1 of the reader player is activated, making the player terminal 1 of the reader player ready to read the image information, as shown in FIG. 12A. An object to be captured by the camera is then displayed on the display 26 of the player terminal 1. Also, when the imaging direction of the camera is directed to the image file 48b on the information sharing site 48a, the identifying image information 44a on the information sharing site 48a is displayed on the display 26 of the player terminal 1, as shown in FIG. 12A. The player terminal 1 then reads the identifying image information 44a captured by the camera and converts the read identifying image information 44a into character string information (e.g., URL) as shown in FIG. 9.

The player terminal 1 analyzes the acquired character string information and extracts hash IDs 47 from the character string information. The player terminal 1 reads the card master stored in the storage unit 18 and converts the extracted hash IDs 47 into card IDs using the card master. The player terminal 1 organizes a deck with the plurality of card IDs obtained by conversion.

Note that in the case where the premium card prioritized checkbox 35g is checked, the player terminal 1 converts, among the card IDs obtained by converting the hash IDs 47, a card ID that can be exchanged for a premium card into the card ID of the premium card. In the case where the different picture prioritized checkbox 35h is checked, the player terminal 1 converts, among the card IDs obtained by converting the hash IDs 47, a card ID that can be exchanged for a different picture card into the card ID of the different picture card. In addition, if the card ID obtained by converting a hash ID 47 indicates a premium card or a different picture card, then the player terminal 1 may confirm whether or not the player possesses a card with that card ID, and if the player does not possess a card with that card ID, the player terminal 1 may convert that card ID into the card ID of the normal card to organize a deck.

When a deck is successfully organized (in other words, reading is successful), the successful reading screen is displayed, as shown in FIG. 12B. Note that if no hash IDs 47 are included in the acquired character string information, or if some or all of the hash IDs 47 are incorrect, an error message indicating that the reading has failed may be displayed.

When an OK tab 49 captioned "OK" is tapped on the successful reading screen, the deck organization screen is displayed, as shown in FIG. 12C, such that the cards constituting the deck identified by the identifying image information 44a are reflected. This allows the deck published on the information sharing site 48a to be reproduced on the player terminal 1 of the reader player. The reader player can play a card battle game using the reproduced deck.

It is also assumed, for example, that the information sharing site 48a shown in FIG. 11 is displayed, by using a browser of the player terminal 1 of the reader player, on the display 26 of the same hardware (i.e., player terminal 1) as the player terminal 1 of the reader player. In this case, it is difficult to read the identifying image information 44a on the information sharing site 48a by means of the camera mounted on the player terminal 1 of the reader player. To overcome this problem, in such a case, the reader player saves, in the storage unit 18 of the player terminal 1, the image file 48b including the identifying image information 44a on the information sharing site 48a.

After saving the image file 48b, the reader player taps the image tab 35f on the organization method selection screen in FIG. 5A. The player terminal 1 then displays an image selection screen that lists various kinds of image files stored in the storage unit 18, as shown in FIG. 12D. On the image selection screen, thumbnails of the image files are displayed for each image file. When the reader player selects, on the image selection screen, the image file 48*b* that includes the identifying image information 44*a*, the player terminal 1 analyzes the selected image file 48*b* and reads the identifying image information 44*a* included in that image file 48*b*. The player terminal 1 converts the read identifying image information 44*a* into character string information (e.g., URL) as shown in FIG. 9.

Thereafter, as in the case of reading the identifying image information 44*a* with a camera, the player terminal 1 analyzes the acquired character string information and extracts the hash IDs 47 from that character string information. The player terminal 1 reads the card master stored in the storage unit 18 and converts the extracted hash IDs 47 into card IDs using the card master. The player terminal 1 organizes a deck by using the plurality of card IDs obtained by the conversion.

Note that in the case where the premium card prioritized checkbox 35*g* is checked, the player terminal 1 converts, among the card IDs obtained by converting the hash IDs 47, a card ID that can be exchanged for a premium card into the card ID of the premium card. In the case where the different picture prioritized checkbox 35*h* is checked, the player terminal 1 converts, among the card IDs obtained by converting the hash IDs 47, a card ID that can be exchanged for a different picture card into the card ID of the different picture card. In addition, if the card ID obtained by converting a hash ID 47 indicates a premium card or a different picture card, then the player terminal 1 may confirm whether or not the player possesses a card with that card ID, and if the player does not possess a card with that card ID, the player terminal 1 may convert that card ID into the card ID of the normal card to organize a deck.

When a deck is successfully organized, the successful reading screen is displayed, as shown in FIG. 12B. When the OK tab 49 on the successful reading screen is tapped, the deck organization screen is displayed, as shown in FIG. 12C, such that the cards constituting the deck identified by the identifying image information 44*a* are reflected. With the method of reading the identifying image information 44*a* from the image file 48*b*, the deck published on the information sharing site 48*a* can also be reproduced on the player terminal 1 of the reader player. The reader player can play a card battle game using the reproduced deck.

Figures 13A, 13B:
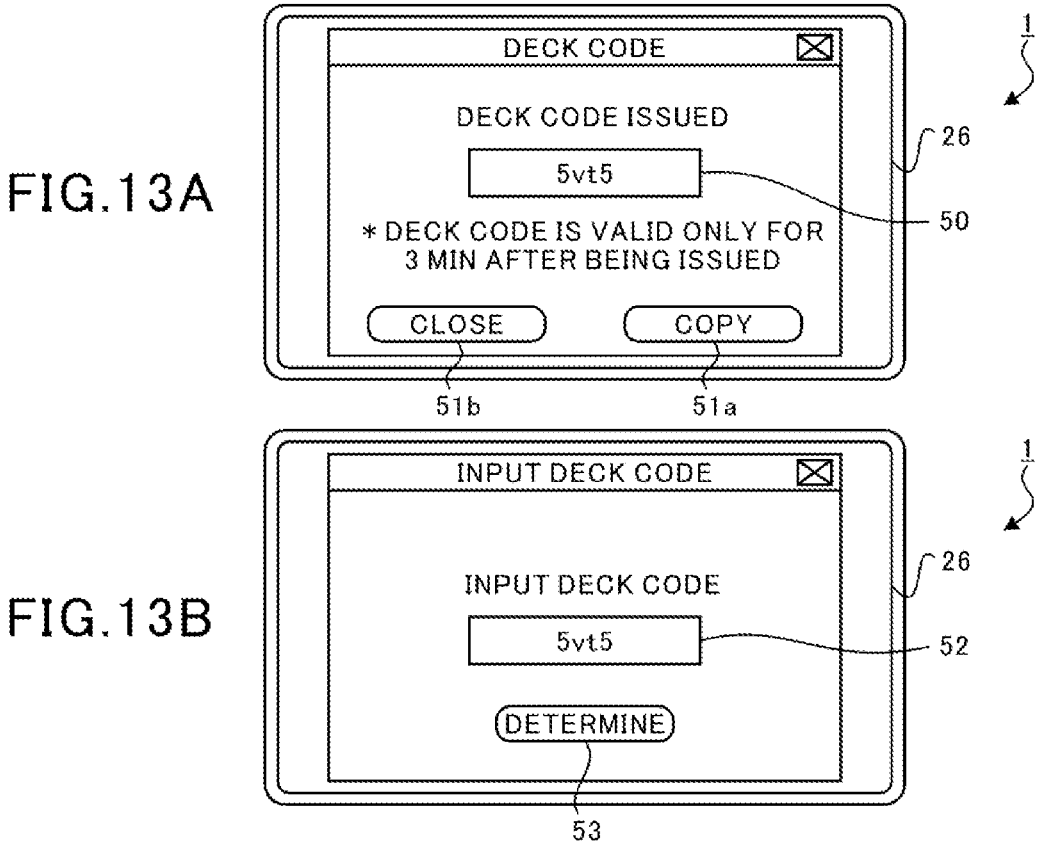
FIG. 13A is a diagram showing an example of a deck code issuing screen.
FIG. 13B is a diagram showing an example of a deck code input screen.

FIG. 13A is a diagram showing an example of a deck code issuing screen. When the deck code issuing tab 41 is tapped on the deck overview screen in FIG. 7A, a deck code corresponding to the currently selected deck is generated. Then, as shown in FIG. 13A, the deck code issuing screen is displayed, and the generated deck code is displayed in a deck code display region 50 on the deck code issuing screen.

The deck code is special identification information including a relatively short (e.g., four-digit) character string. The character string is not limited to characters, but may also include symbols or numbers. The deck code is associated with a deck and with access information concerning access, for example, between the player terminal 1 and the server 100. The deck code is valid only while the server 100 maintains that access information. For this reason, a predetermined time limit (e.g., three minutes) is set for the deck code. After the time limit has elapsed from the issuance of the deck code, the deck code is not processed validly even if the character string is correct.

A deck code copy tab 51*a* captioned "Copy" and a deck code issuing screen close tab 51*b* captioned "Close" are displayed on the deck code issuing screen in FIG. 13A. When the deck code copy tab 51*a* is tapped, the deck code displayed in the deck code display region 50 is copied to the clipboard. In addition, when the deck code issuing screen close tab 51*b* is tapped, the deck code issuing screen is closed, and the screen returns to the deck overview screen shown in FIG. 7A.

Here, at the particular site (e.g., game portal site) managed by the site server 400, decks can be organized as described below, though the card battle game itself cannot be played. In this case, the deck code issued by the player terminal 1 can be used to organize a deck corresponding to that deck code at the particular site. Also, a deck code corresponding to the deck organized at the particular site can be issued at the same particular site.

For example, the player may copy the deck code in FIG. 13A to the clipboard and then display the particular site with a browser. As described below, the player can then paste, into a deck code input region at the particular site, the deck code copied to the clipboard. This allows a deck organized in the game (i.e., player terminal 1) to be reproduced using the deck code at the particular site outside the game.

FIG. 13B is a diagram showing an example of a deck code input screen. When the deck code tab 35*d* on the organization method selection screen in FIG. 5A is tapped, the deck code input screen shown in FIG. 13B is displayed. A deck code input region 52 and a deck code input determination tab 53 captioned "Determine" are displayed on the deck code input screen.

For example, the player can input a deck code issued by the particular site into the deck code input region 52 on the deck code input screen, as shown in FIG. 13B. When the deck code input determination tab 53 is tapped after the deck code has been input, the deck organization screen is displayed as shown in FIG. 12C, such that the cards constituting the deck corresponding to the deck code are reflected. This allows a deck organized at the particular site outside the game to be reproduced in the game using the deck code. The player can play a card battle game using the reproduced deck.

Figure 14:
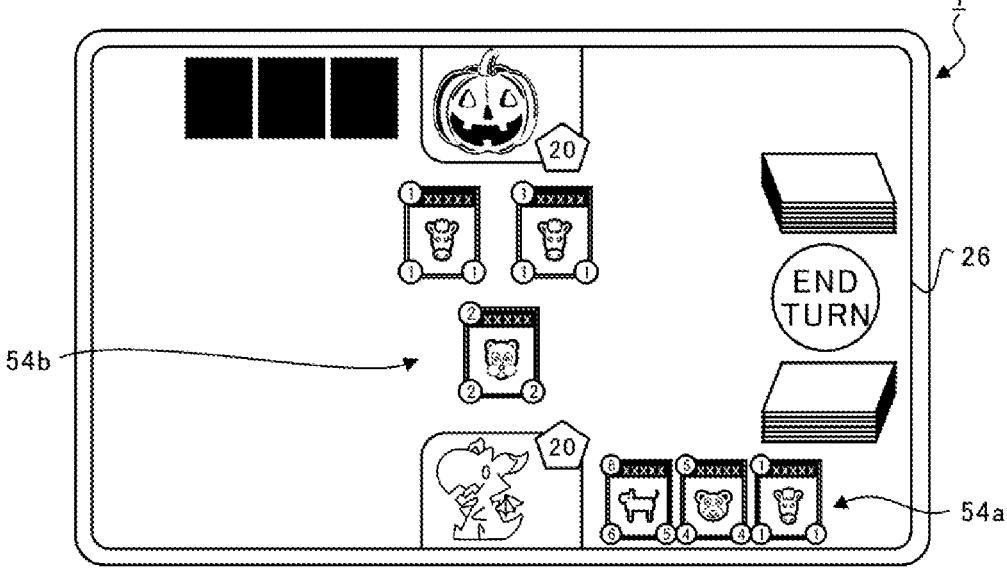
FIG. 14 is a drawing for illustrating an example of a card battle game screen.

FIG. 14 is a drawing for illustrating an example of the card battle game screen. The card battle game according to this embodiment is a two-player game in which the player combats against the computer or another player. When the solo-play selection operation section 30*b* in the menu bar 30 is tapped, the player can fight against the computer after having performed predetermined settings such as a format and a deck. When the multi-play selection operation section 30*c* is tapped, the player can fight against another player after having performed predetermined settings such as a format and a deck. On the card battle game screen, a player display region for displaying the player's cards, information, etc. is set in the lower half of the screen, and an opponent display region for displaying the opponent's cards, information, etc. is set in the upper half of the screen.

When the game is started, cards to serve as the player's hand are randomly distributed from the deck selected by the player to a hand region 54*a* of the player. Similarly, cards to serve as the opponent's hand are randomly distributed from the deck selected by the opponent to the opponent's hand region. In addition, in the card battle game, the player's turn and the opponent's turn are alternately repeated. In each turn, a card randomly selected from the deck is added to the hand. The player can play a card by moving, in his/her own turn, a hand in the player's hand region 54a onto a table 54b in accordance with a predetermined rule.

Note that valid points are set in each turn, and each of the cards has a cost (consumption value) set therein. When the player plays a card, the cost set in the card is subtracted from the valid points. The player can play a card in his/her hand within the range of the valid points.

In addition to the cost, two function values, i.e., attacking power and physical power, are further set in a basic card. The attacking power represents a damage value given to the opponent. The physical power represents a damage suffering value indicating the power remaining until the relevant card is destroyed. In the card battle game, a life value (here, 20) is imparted to each of the player and the opponent, and the player or the opponent, whoever has first caused the life value of the competitor to be 0 through attacks with cards, is the winner.

Particular Site

Figure 15A:
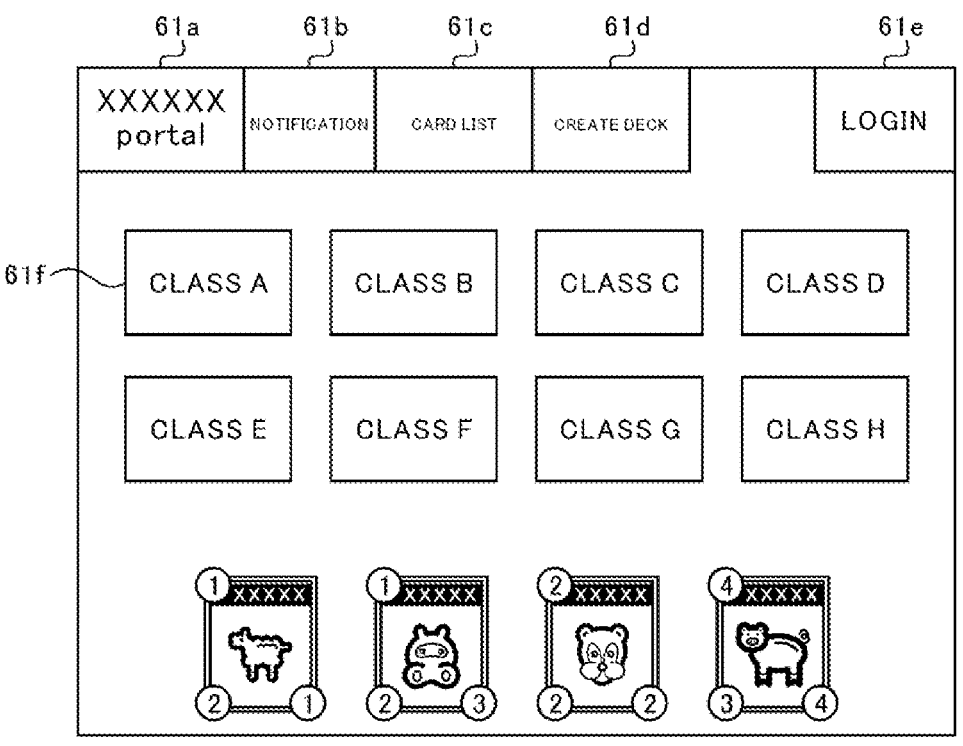
FIG. 15A is a diagram showing an example of a particular site managed by the site server.

FIG. 15A is a diagram showing an example of the particular site managed by the site server 400. The particular site is, for example, a game portal site managed by the server 100. FIG. 15A shows an example of a top page of the particular site. A client terminal 300 can communicate with the site server 400 and display the particular site on the display 326 of the client terminal 300. The client terminal 300 can be a personal computer or a smartphone. Here, explanations will be given by way of an example where the client terminal 300 is a personal computer.

A top page tab 61a captioned "XXXXXX portal", a notification tab 61b captioned "Notification", a card list tab 61c captioned "Card list", a deck creation tab 61d captioned "Create deck", and a login tab 61e captioned "Login" are displayed at the upper section of the particular site. The top page tab 61a, the notification tab 61b, the card list tab 61c, the deck creation tab 61d, and the login tab 61e may be displayed not only on the top page but also on pages other than the top page. When the top page tab 61a is clicked (or tapped), the screen transitions from a non-top page to the top page. When the notification tab 61b is clicked, the screen transitions to a page including various kinds of notifications about the game.

When the login tab 61e is clicked, a page for inputting a user ID and a password is displayed. When the user ID and password are successfully input, the user logs into the particular site with the account of the user ID. In the login state, predetermined restrictions are lifted, such as the user being allowed to save a deck organized on the particular site. If no accounts have been registered, a new user ID and a password are set.

For example, class tabs 61f, which are each an icon indicating a class of card, may be displayed on the top page of the particular site, as shown in FIG. 15A. Some cards may also be displayed on the top page of the particular site. When the card list tab 61c is clicked, the screen transitions to a card list page (not shown in the figure), listing the cards.

Figure 15B:
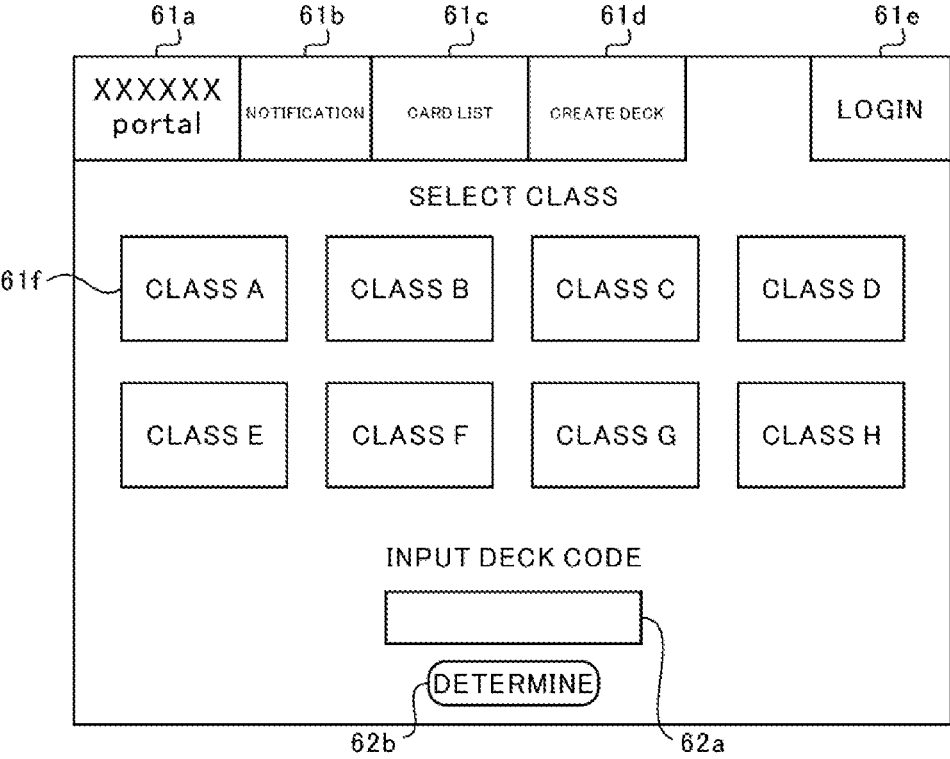
FIG. 15B is a diagram showing an example of a class selection page at the particular site.

FIG. 15B is a diagram showing an example of a class selection page at the particular site. When the deck creation tab 61d in FIG. 15A is clicked, the class selection page shown in FIG. 15B is displayed. The class tabs 61f are displayed on the class selection page, prompting the user to select a class of the deck to be created.

Figure 16A:
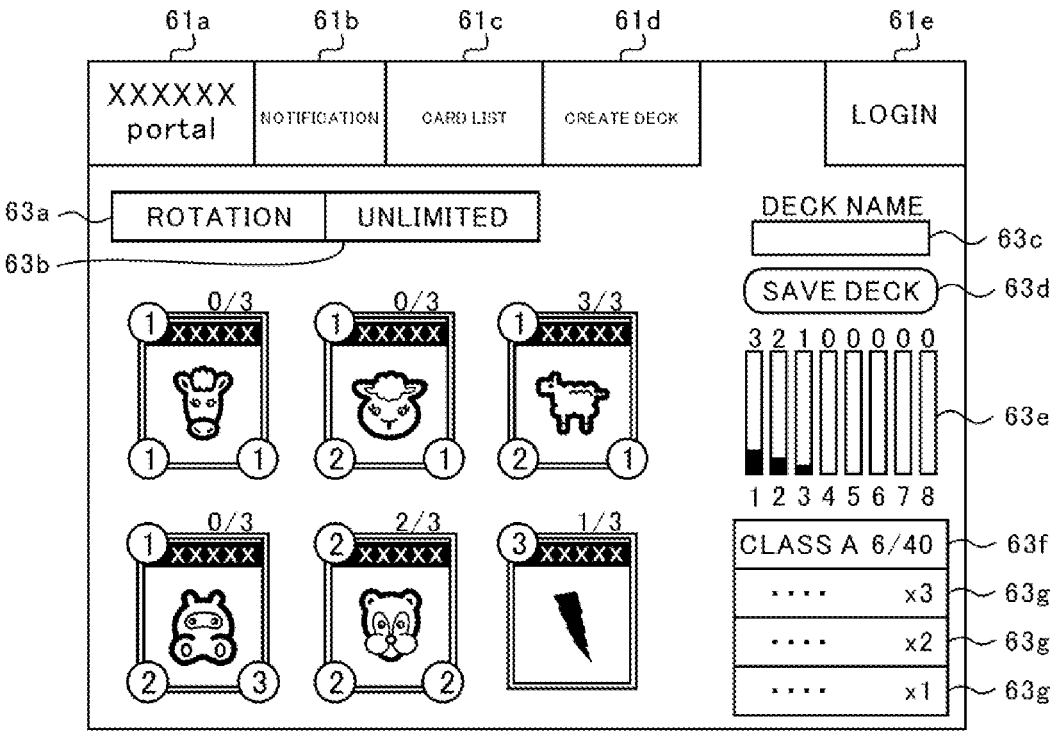
FIG. 16A is a diagram showing an example of a deck organization page at the particular site.

FIG. 16A is a diagram showing an example of a deck organization page at the particular site. When a class tab 61f on the class selection page in FIG. 15B or a class tab 61f on the top page in FIG. 15A is clicked, the screen transitions to the deck organization page shown in FIG. 16A. A rotation format selection tab 63a captioned "Rotation" and an unlimited format selection tab 63b captioned "Unlimited" are displayed on the deck organization page shown in FIG. 16A. When the rotation format selection tab 63a is clicked, the deck format is set to rotation, and a list of cards available for the rotation format is displayed on the deck organization page. On the other hand, when the unlimited format selection tab 63b is clicked, the format of the deck is set to unlimited, and a list of cards available for the unlimited format is displayed on the deck organization page.

In addition, a deck name input region 63c, a deck save tab 63d captioned "Save deck", a cost graph 63e, a total selection number display region 63f, and selected-card-type display regions 63g are displayed on the deck organization page. A deck name can be input in the deck name input region 63c. The cost graph 63e is displayed as a bar graph. Costs are displayed in the lower section of the cost graph 63e, and the numbers of cards selected for the respective costs are displayed in the upper section of the cost graph 63e. The selected class and the total number of selected cards are displayed in the total selection number display region 63f. The card types of the selected cards and the numbers of selected cards for each of the card types are displayed in the selected-card-type display regions 63g.

On the deck organization page, the user can organize a deck by clicking a card to be organized into the deck among the list of cards displayed. When a card is clicked and selected, the selected card and the number of selections of that card are displayed in a selected-card-type display region 63g. As the number of selected card types increases, the selected-card-type display region 63g is cumulatively added toward the bottom of the deck organization page. Also, each time a card is selected, the total number of selected cards is incremented, and the total number of selected cards is displayed in the total selection number display region 63f. In addition, when a card is selected, the number of cards corresponding to the cost of the selected card is incremented in the cost graph 63e, thus updating the cost graph 63e.

Note that when a selected-card-type display region 63g is clicked on the deck organization page, a card in the clicked selected-card-type display region 63g is deleted with each click. The total number of cards in the total selection number display region 63f is decremented, accordingly. Furthermore, in the cost graph 63e, the number of cards corresponding to the cost of the deleted card is decremented, thereby updating the cost graph 63e.

Figure 16B:
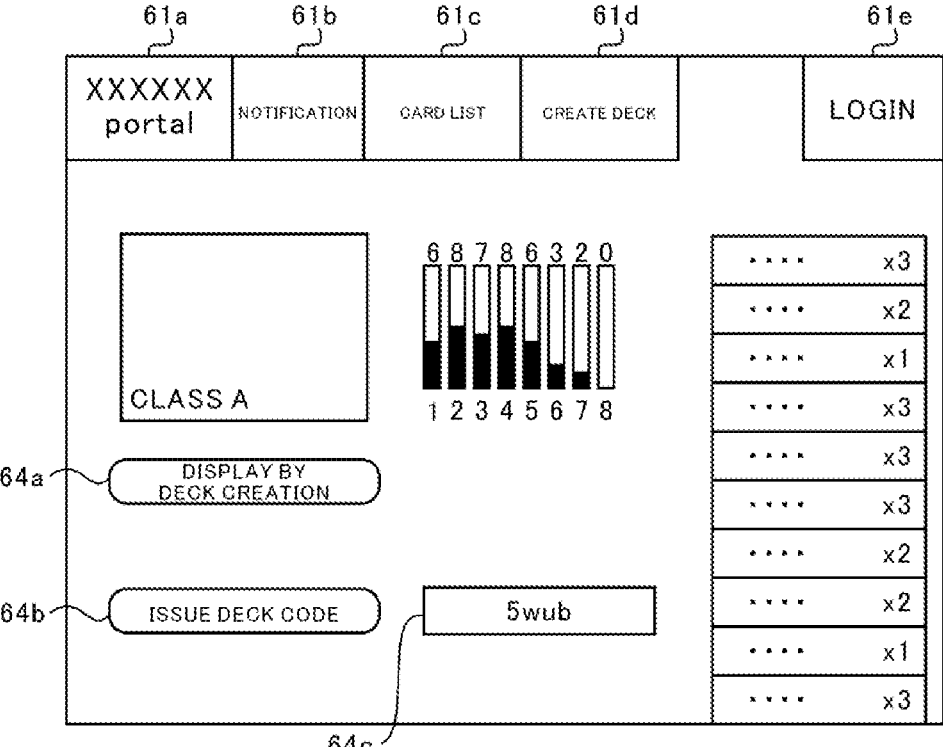
FIG. 16B is a diagram showing an example of a deck confirmation page at the particular site.

FIG. 16B is a diagram showing an example of a deck confirmation page at the particular site. When the specified number of cards (e.g., 40) are selected on the deck organization page in FIG. 16A and the deck save tab 63d is tapped, the screen transitions to the deck confirmation page shown in FIG. 16B. On the deck confirmation page, information concerning the deck composed of the specified number of cards selected on the deck organization page is displayed. For example, the class of the deck, the cost graph of the deck, the card types in the deck and the number of cards of each card type, etc. are displayed.

In addition, a deck creation tab 64a captioned "Display by deck creation" and a deck code issuing tab 64b captioned "Issue deck code" are displayed on the deck confirmation page in FIG. 16B. When the deck creation tab 64a is clicked, the screen returns to the deck organization page, allowing a deck to be organized again.

When the deck code issuing tab 64b is clicked, a deck code corresponding to the deck displayed on the deck confirmation page is generated, a deck code display region

64c is displayed, and the generated deck code is displayed in the deck code display region 64c. The deck code displayed in the deck code display region 64c is associated with the deck and is also associated with access information concerning access, for example, between the client terminal 300 and the site server 400. This deck code is valid only while the site server 400 maintains that access information. For this reason, the deck code issued at the particular site has set therefor a predetermined time limit, as the deck code issued at the player terminal 1. After the time limit has elapsed from the issuance of the deck code at the particular site, that deck code is not processed validly even if the character string is correct. The user can input the deck code displayed in the deck code display region 64c into the deck code input region 52 on the deck code input screen of the player terminal 1, as shown in FIG. 13B. This allows a deck organized at the particular site outside the game to be reproduced in the game.

In addition, a deck code input region 62a allowing a deck code to be input thereinto and a deck code input determination tab 62b captioned "Determine" are displayed on the class selection page in FIG. 15B. For example, the deck code issued at the player terminal 1 is input in the deck code input region 62a, and the deck code input determination tab 62b is tapped. In this case, as shown in FIG. 16A, the deck organization page is displayed such that the deck corresponding to the input deck code is reflected. This allows the deck organized in the game to be reproduced on the particular site outside the game.

Reading of Identifying Image Information 44a
Outside Game

As described above, when the camera tab 35e is tapped on the organization method selection screen of the player terminal 1 shown in FIG. 5A, the camera is activated as shown in FIG. 12A, and the identifying image information 44a displayed on the predetermined information sharing site 48a can be read in the game. Also, as described above, when the image tab 35f is tapped on the organization method selection screen of the player terminal 1 shown in FIG. 5A, the image selection screen is displayed, as shown in FIG. 12D, so that the identifying image information 44a can be read in the game as a result of the image file 48b being selected. In this embodiment, the identifying image information 44a can be read not only in the game but also outside the game. Explanations will be given below by way of an example where the identifying image information 44a is read at the client terminal 300, which is outside the game. Explanations will also be given below by way of an example where the client terminal 300 is a smartphone in one case and the client terminal 300 is a personal computer in another case.

Figures 17A, 17B, 17C:
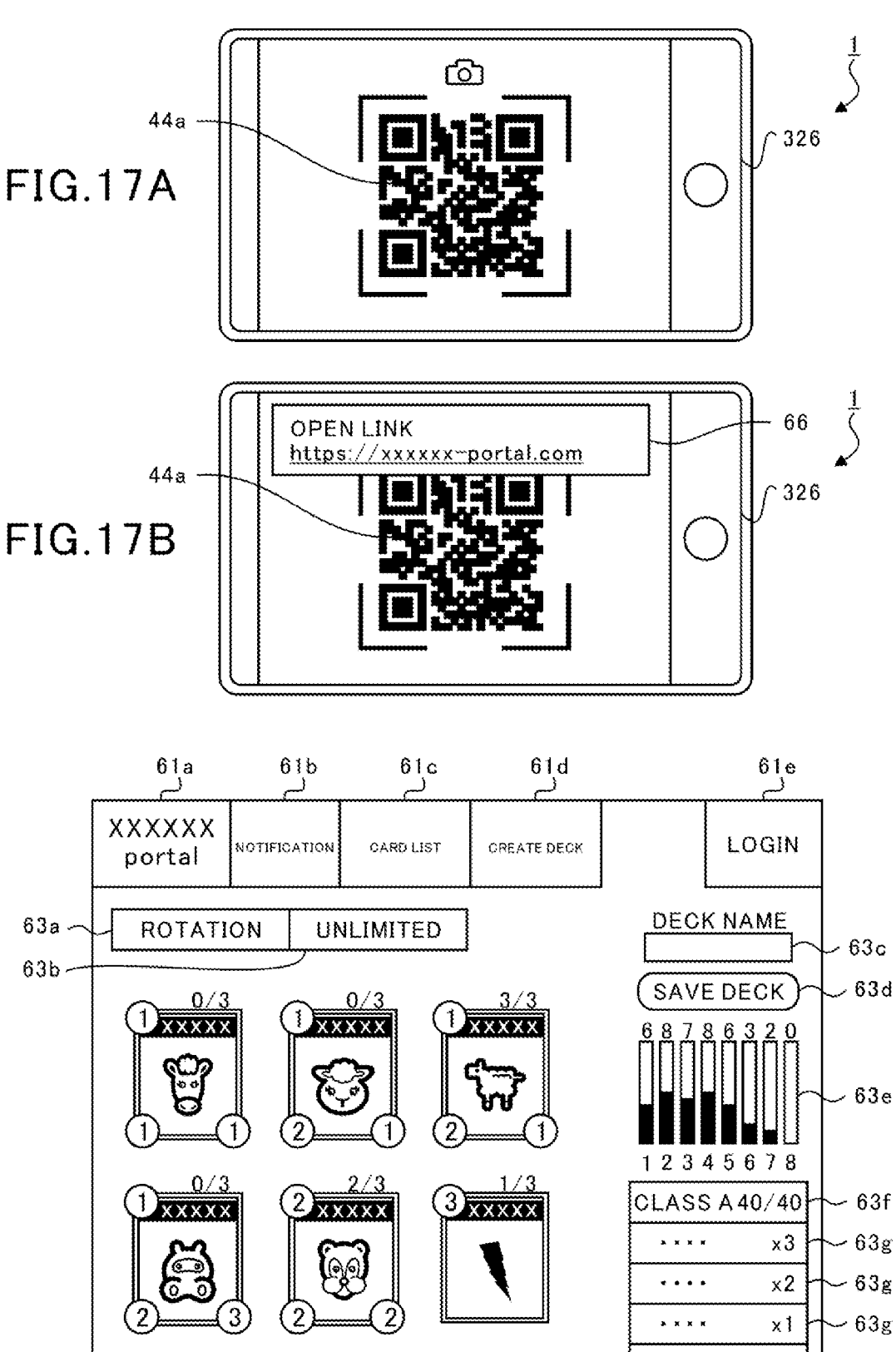
FIG. 17A is a drawing for illustrating an example for reading identifying image information by means of a camera of the client terminal.
FIG. 17B is a drawing for illustrating an example of a case in which identifying image information is successfully read.
FIG. 17C is a diagram showing an example of the deck organization page at the particular site.

FIG. 17A is a drawing for illustrating an example for reading the identifying image information 44a by means of a camera of the client terminal 300. The client terminal 300 in FIG. 17A is, for example, a smartphone. It is also assumed that the client terminal 300 in FIG. 17A is different hardware (e.g., a personal computer) from the hardware on which the information sharing site 48a shown in FIG. 11 is displayed.

When the user of the client terminal 300 starts the camera application of the client terminal 300, the client terminal 300 is ready to read the image information, as shown in FIG. 17A. Then, an object to be captured by the camera appears on the display 326 of the client terminal 300. Also, when the imaging direction of the camera is directed to the image file 48b on the information sharing site 48a, as shown in, for example, FIG. 11, the identifying image information 44a on the information sharing site 48a is displayed on the display 326 of the client terminal 300, as shown in FIG. 17A. The client terminal 300 then reads the identifying image information 44a captured by the camera.

FIG. 17B is a drawing for illustrating an example of a case in which the identifying image information 44a is successfully read. FIG. 17C is a diagram showing an example of the deck organization page at the particular site. When the identifying image information 44a is successfully read, the client terminal 300 converts the read identifying image information 44a into character string information as shown in FIG. 9. The client terminal 300 then displays the acquired character string information in a pop-up 66 on the display 326, as shown in FIG. 17B.

When the pop-up 66 in FIG. 17B is tapped, the client terminal 300 establishes a communication connection to the site server 400 on the basis of the communication connection information 46 in the character string information in FIG. 9. Because the character string information includes hash IDs 47, the site server 400 organizes a deck with the cards corresponding to the hash IDs 47 in the character string information. The site server 400 then transmits, to the client terminal 300, the information concerning the deck organization page on which the deck organized according to the hash IDs 47 is reflected. Upon receiving the information concerning the deck organization page from the site server 400, the client terminal 300 displays the deck organization page of the particular site in the browser, as shown in FIG. 17C. Thus, as shown in FIG. 17C, the deck organization page is displayed such that the deck corresponding to the identifying image information 44a is reflected. In this way, the deck organized in the game can be read outside the game and reproduced at the particular site outside the game.

In the reading of identifying image information with a camera in the game, the identifying image information 44a is read by activating the camera from within the game application while the game application is running (while the terminal device functions as a player terminal 1). On the other hand, in the reading of identifying image information with a camera outside the game, the identifying image information 44a is read by activating the camera, regardless of the game application (while the terminal device functions as a client terminal 300). Thus, for example, if a single terminal device can function as a player terminal 1 and as a client terminal 300, then activating the camera from within the game application on the single terminal device results in in-game reading with the camera, and activating the camera independently of the game application on the single terminal device results in out-of-game reading with the camera.

Figure 18A:
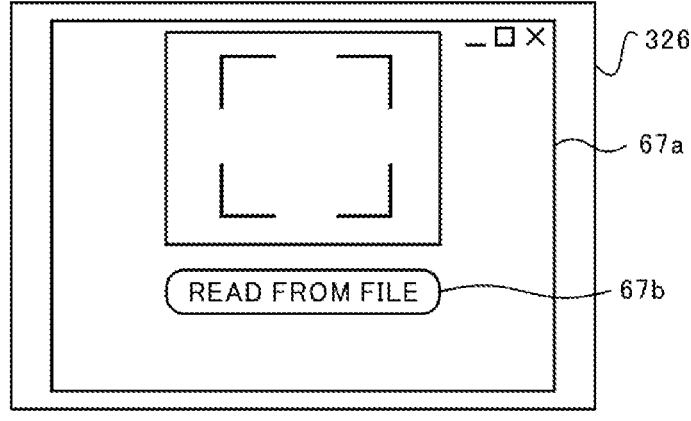
FIG. 18A is a drawing for illustrating an example for reading identifying image information from an image file at the client terminal.

FIG. 18A is a drawing for illustrating an example for reading the identifying image information 44a from the image file 48b at the client terminal 300. The client terminal 300 in FIG. 18A is, for example, a personal computer. It is also assumed that the client terminal 300 in FIG. 18A is the same hardware (e.g., personal computer) as that on which the information sharing site 48a shown in FIG. 11 is displayed. Because the hardware on which the identifying image information 44a is displayed and the hardware on which the identifying image information 44a is read are the same, it is difficult to read the identifying image information 44a with a camera, and thus, in the example in FIG. 18A, it is a good idea to read the identifying image information 44a from the image file 48b.

The user of the client terminal 300 saves, in the storage unit 318 of the client terminal 300, the image file 48b including the identifying image information 44a on the information sharing site 48*a*. Here, it is assumed that an application capable of reading a two-dimensional code from an image file (hereinafter, referred to as a code reader application) is installed in the client terminal 300. After saving the image file 48*b*, the user starts the code reader application on the client terminal 300. When the code reader application is started, an image reading window 67*a* is displayed on the display 326 of the client terminal 300, as shown in FIG. 18A. An image file reading tab 67*b* captioned "Read from file" is displayed in the image reading window 67*a*.

Figure 18B:
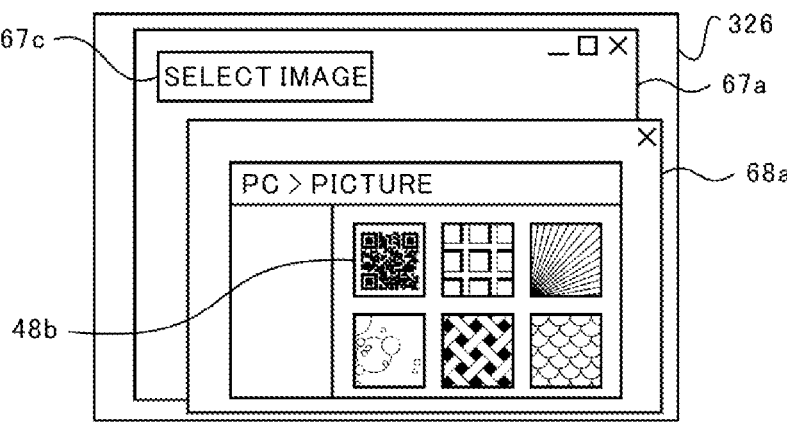
FIG. 18B is a drawing for illustrating an example for selecting an image file.

FIG. 18B is a drawing for illustrating an example for selecting the image file 48*b*. When the image file reading tab 67*b* in FIG. 18A is clicked (or tapped), an image selection tab 67*c* captioned "Select image" appears in the image reading window 67*a*, as shown in FIG. 18B. When the image selection tab 67*c* is clicked, an image selection window 68*a* of a file management application (e.g., Explorer) is displayed on the display 326, as shown in FIG. 18B. Thumbnails of the various kinds of image files stored in the storage unit 318 are displayed for each image file in the image selection window 68*a*. When the user selects the image file 48*b* that includes the identifying image information 44*a* in the image selection window 68*a*, the client terminal 300 analyzes the selected image file 48*b* and reads the identifying image information 44*a* included in that image file 48*b*. The client terminal 300 converts the read identifying image information 44*a* into character string information, as shown in FIG. 9.

The client terminal 300 establishes communication connection to the site server 400 on the basis of the communication connection information 46 in the acquired character string information. The site server 400 organizes a deck with cards corresponding to the hash IDs 47 in the character string information. The site server 400 transmits, to the client terminal 300, the information concerning the deck organization page on which the deck organized according to the hash IDs 47 is reflected. Upon receiving the information concerning the deck organization page from the site server 400, the client terminal 300 displays the deck organization page of the particular site in the browser, as shown in FIG. 17C. Thus, as shown in FIG. 17C, the deck organization page is displayed such that the deck corresponding to the identifying image information 44*a* is reflected. In this way, the deck organized in the game can be read outside the game and reproduced at the particular site outside the game.

The following describes processes of the player terminal 1 and the server 100 to realize the aforementioned card battle game, as well as the functional units that execute each of these processes. In the following, processes related to, in particular, the card battle game will be described, and descriptions of the other processes will be omitted. Furthermore, functional units of the player terminal 1 and the server 100 will be described first, followed by descriptions of functional units of the client terminal 300 and the site server 400.

Functional Units of Player Terminal 1

FIG. 19 is a functional block diagram of the player terminal 1. A program storage region 12*a* and a data storage region 12*b* are provided in the memory 12 of the player terminal 1. When the game is started, the CPU 10 stores terminal-side game control programs (modules) in the program storage region 12*a*.

The terminal-side game control programs include: a game execution control program 70; a game medium identification information acquisition program 71; a game medium group generation program 72; an identifying image information generation program 73; an identifying image information reading program 74; an in-game reproduction program 75; a special identification information management program 76; a battle game execution program 77; a display control program 78; and a communication control program 79. Note that the programs listed in FIG. 19 are examples, and many other programs are provided as the terminal-side game control programs.

The CPU 10 runs the programs stored in the program storage region 12*a* and updates data in each of the storage sections in the data storage region 12*b*. Also, the CPU 10 causes the player terminal 1 (computer) to function as a terminal control unit 1A by running the programs stored in the program storage region 12*a*. The terminal control unit 1A includes: a game execution control unit 70*a*; a game medium identification information acquisition unit 71*a*; a game medium group generation unit 72*a*; an identifying image information generation unit 73*a*; an identifying image information reading unit 74*a*; an in-game reproduction unit 75*a*; a special identification information management unit 76*a*; a battle game execution unit 77*a*; a display control unit 78*a*; and a communication control unit 79*a*.

More specifically, the CPU 10 causes the computer to function as the game execution control unit 70*a* by running the game execution control program 70. Similarly, the CPU 10 causes the computer to function as the game medium identification information acquisition unit 71*a*, the game medium group generation unit 72*a*, the identifying image information generation unit 73*a*, the identifying image information reading unit 74*a*, the in-game reproduction unit 75*a*, the special identification information management unit 76*a*, the battle game execution unit 77*a*, the display control unit 78*a*, and the communication control unit 79*a* by running the game medium identification information acquisition program 71, the game medium group generation program 72, the identifying image information generation program 73, the identifying image information reading program 74, the in-game reproduction program 75, the special identification information management program 76, the battle game execution program 77, the display control program 78, and the communication control program 79, respectively.

In the data storage region 12*b*, a game information storage section 80, a card master storage section 81, a communication connection information storage section 82, an image storage section 83, a player information storage section 84, a battle log storage section 85, and a special identification information storage section 86 are provided as storage sections for storing data. Note that each of the aforementioned storage sections is an example, and many other storage sections are provided in the data storage region 12*b*.

Various kinds of information concerning the game progress, such as game progress situations, are stored in the game information storage section 80. The card master acquired from the server 100 is stored in the card master storage section 81. The communication connection information 46 is stored in the communication connection information storage section 82, and the communication connection information 46 is used when the identifying image information 44*a* is generated. When the image file 48*b* including the identifying image information 44*a* is acquired from, for example, the information sharing site 48*a*, the image file 48*b* is stored in the image storage section 83. Various kinds of information concerning the player are stored in the player information storage section 84. A battle log in the card battle game is stored in the battle log storage section 85. When special identification information is generated, the generated special identification information is temporarily stored in the special identification information storage section 86 in association with a deck.

The game execution control unit 70a controls the progress of the entire game. The game execution control unit 70a logs into the game in response to, for example, a player operation and determines whether or not game information concerning the entire game is updated.

The game medium identification information acquisition unit 71a acquires, at a predetermined timing, the latest game medium identification information (e.g., hash IDs 47) from a device (e.g., server 100) managing the game medium identification information. The predetermined timing is, for example, when the player terminal 1 logs into the game. Note that the predetermined timing is not limited to this example, but may be any timing, for example, when the deck confirmation screen is displayed. In addition, by acquiring the card master, the game medium identification information acquisition unit 71a may also acquire the game medium identification information included in the card master. The acquired card master is stored in the card master storage section 81.

The game medium group generation unit 72a generates a game medium group (e.g., card group, i.e., deck) representing a group of game media (e.g., cards) selected from a plurality of game media. The game medium group generation unit 72a generates a game medium group by using the game media selected by the user (e.g., player), for example, when the new creation tab 35a in FIG. 5A is tapped. Note that the game medium group generation unit 72a may automatically generate a game medium group by using the game media selected by the game medium group generation unit 72a, for example, when the automatic organization tab 35b in FIG. 5A is tapped.

The identifying image information generation unit 73a generates identifying image information 44a, which indicates image information including the game medium identification information (e.g., hash IDs) of the individual game media constituting a game medium group and the communication connection information 46 for communication connection to a particular communication destination (e.g., site server 400) on the communication network 200, and displays the identifying image information 44a on the display 26. At this time, the identifying image information generation unit 73a reads the communication connection information 46 stored in the communication connection information storage section 82 and reads the card master stored in the card master storage section 81. The identifying image information generation unit 73a identifies the hash IDs 47 of individual cards constituting the deck by using the card master and generates the identifying image information 44a by combining the identified hash IDs 47 and the read communication connection information 46.

When displaying a game medium group, the identifying image information generation unit 73a generates and displays the identifying image information 44a corresponding to the game medium group to be displayed. For example, the identifying image information generation unit 73a generates the identifying image information 44a when displaying the deck confirmation screen, as shown in FIG. 8A. Note that the timing for generating the identifying image information 44a is not limited to the timing for displaying the deck confirmation screen. The identifying image information 44a may be generated at any timing, such as when an identifying image information generation tab, which can be provided in advance, is tapped.

The identifying image information reading unit 74a can activate the camera of the player terminal 1 from within the game and can read the identifying image information 44a with that camera. In addition, the identifying image information reading unit 74a can also read the image file 48b stored in the image storage section 83 and read the identifying image information 44a from the image file 48b.

In response to reading of the identifying image information 44a, the in-game reproduction unit 75a, without establishing a communication connection based on the communication connection information 46 included in the identifying image information 44a, generates a game medium group (e.g., deck) composed of game media corresponding to the respective items of game medium identification information included in the identifying image information 44a and displays the game medium group on the display 26.

The special identification information management unit 76a generates special identification information (e.g., a deck code) corresponding to a game medium group generated by the game medium group generation unit 72a. In addition, on the basis of input special identification information, the special identification information management unit 76a reproduces a game medium group corresponding to the special identification information. For example, when special identification information is input, the special identification information management unit 76a communicates with the server 100 and acquires, from the server 100, the individual card IDs constituting the deck corresponding to the special identification information. This allows the game medium group generation unit 72a of the player terminal 1 to reproduce a deck composed of cards having the acquired card IDs.

The battle game execution unit 77a is responsible for controlling the execution of a card battle game. For example, the battle game execution unit 77a controls the progress of the card battle game on the basis of operations input to the player terminal 1 and stores a battle log in the battle log storage section 85.

The display control unit 78a controls the display of images on the display 26, according to player operations and the progress of the game. The communication control unit 79a transmits and receives information to and from the server 100.

Functional Units of Server 100

Figure 20:
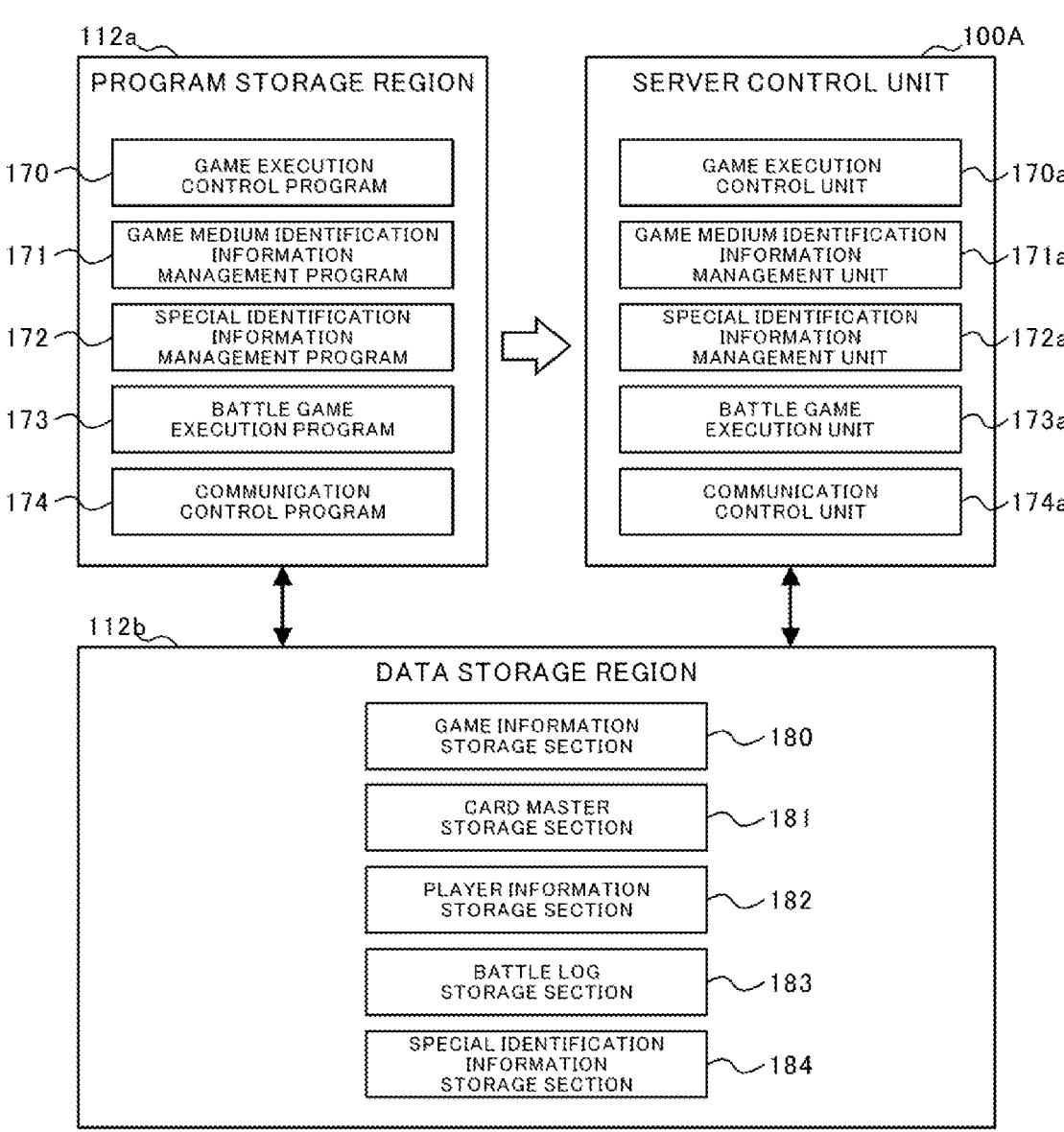
FIG. 20 is a functional block diagram of the server.

FIG. 20 is a functional block diagram of the server 100. A program storage region 112a and a data storage region 112b are provided in the memory 112 of the server 100. In the program storage region 112a, a game execution control program 170, a game medium identification information management program 171, a special identification information management program 172, a battle game execution program 173, and a communication control program 174 are stored as server-side game control programs. Note that the programs listed in FIG. 20 are examples, and many other programs are provided as the server-side game control programs.

The CPU 110 runs the programs stored in the program storage region 112a and updates data in each of the storage sections in the data storage region 112b. Also, the CPU 110 causes the server 100 (computer) to function as a server control unit 100A by running the programs stored in the program storage region 112a. The server control unit 100A includes: a game execution control unit 170a; a game medium identification information management unit 171a; a special identification information management unit 172a; a battle game execution unit 173a; and a communication control unit 174a.

More specifically, the CPU 110 causes the computer to function as the game execution control unit 170a by running the game execution control program 170. Similarly, the CPU 110 causes the computer to function as the game medium identification information management unit 171a, the special identification information management unit 172a, the battle game execution unit 173a, and the communication control unit 174a by running the game medium identification information management program 171, the special identification information management program 172, the battle game execution program 173, and the communication control program 174, respectively.

In the data storage region 112b, a game information storage section 180, a card master storage section 181, a player information storage section 182, a battle log storage section 183, and a special identification information storage section 184 are provided as storage sections for storing data. Note that each of the aforementioned storage sections is an example, and many other storage sections are provided in the data storage region 112b.

The game execution control unit 170a controls the progress of the entire game. For example, the game execution control unit 170a updates game information concerning the entire game in response to a player operation on the player terminal 1. In addition, when the game information concerning the entire game is updated, the game execution control unit 170a reads the updated game information from the game information storage section 180 and transmits the updated game information to the player terminal 1 via the communication control unit 174a.

The game medium identification information management unit 171a manages game medium identification information (e.g., hash IDs 47). For example, upon receiving login information from the player terminal 1, the game medium identification information management unit 171a transmits, to the player terminal 1 via the communication control unit 174a, the card master stored in the card master storage section 181. Because the card master includes the hash IDs 47, the transmission of the card master results in the hash IDs 47 being transmitted to the player terminal 1. In addition, the game medium identification information management unit 171a also updates the card master in the card master storage section 181 when the card types are increased, decreased, or changed as a result of, for example, the distribution period being updated. As a result of the card master being updated, the hash IDs 47 are increased, decreased, or changed.

The special identification information management unit 172a manages special identification information (e.g., deck code). The special identification information management unit 172a communicates with the player terminal 1 or the site server 400 and acquires special identification information generated in the player terminal 1 or the site server 400 in association with the deck corresponding to the special identification information. The special identification information management unit 172a retains the association between the special identification information and the deck until a predetermined time limit elapses, and discards the association between the special identification information and the deck when the predetermined time limit elapses. In addition, upon receiving special identification information from the player terminal 1 or the site server 400 while the association between the special identification information and the deck is retained, the special identification information management unit 172a returns the card IDs of the cards constituting the deck associated with the received special identification information. This allows the deck corresponding to the special identification information to be reproduced at the player terminal 1 or the site server 400.

The battle game execution unit 173a is responsible for controlling the execution of a card battle game and stores a battle log in the battle log storage section 183. The communication control unit 174a transmits and receives information to and from the player terminal 1.

Functional Units of Client Terminal 300

Figure 21:
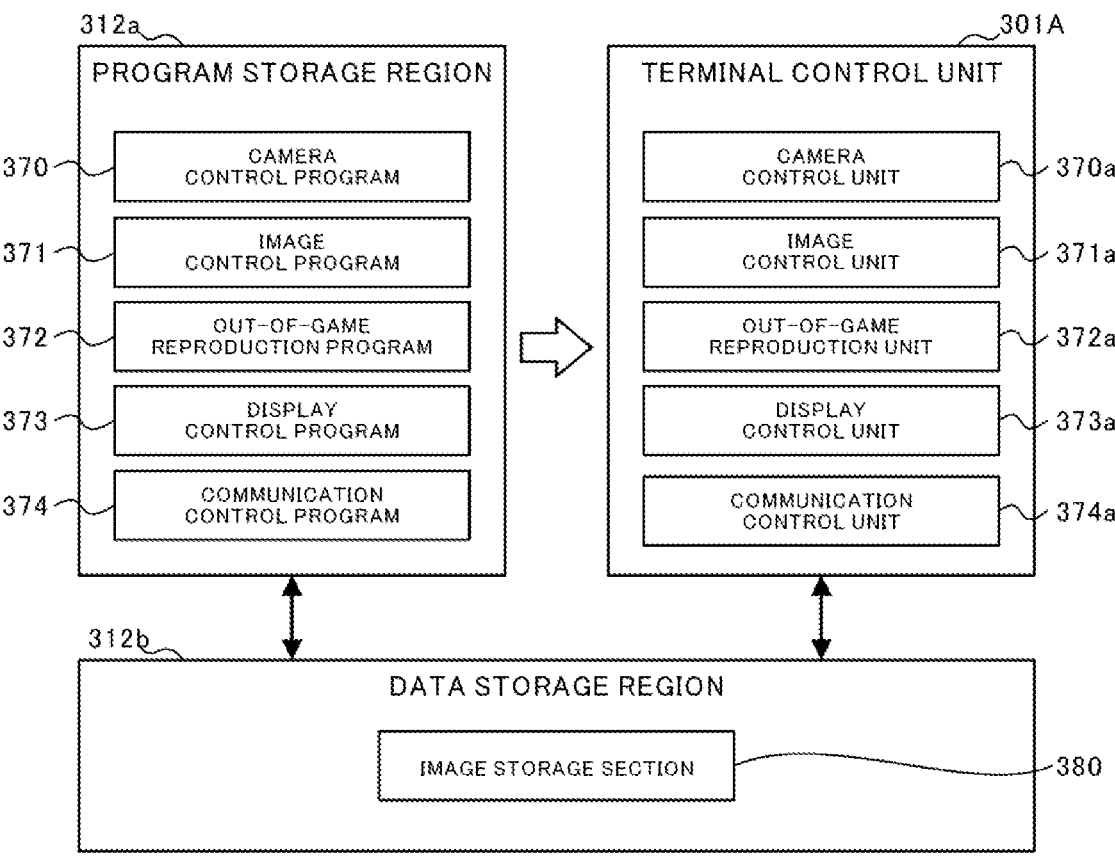
FIG. 21 is a functional block diagram of the client terminal.

FIG. 21 is a functional block diagram of the client terminal 300. A program storage region 312a and a data storage region 312b are provided in the memory 312 of the client terminal 300. The CPU 310 stores various kinds of application programs (modules) in the program storage region 312a.

The application programs include a camera control program 370, an image control program 371, an out-of-game reproduction program 372, a display control program 373, and a communication control program 374. The programs listed in FIG. 21 are examples, and many other programs are provided as the application programs.

The CPU 310 runs the programs stored in the program storage region 312a and updates data in each of the storage sections in the data storage region 312b. Also, the CPU 310 causes the client terminal 300 (computer) to function as a terminal control unit 301A by running the programs stored in the program storage region 312a. The terminal control unit 301A includes a camera control unit 370a, an image control unit 371a, an out-of-game reproduction unit 372a, a display control unit 373a, and a communication control unit 374a.

More specifically, the CPU 310 causes the computer to function as the camera control unit 370a by running the camera control program 370. Similarly, the CPU 310 causes the computer to function as the image control unit 371a, the out-of-game reproduction unit 372a, the display control unit 373a, and the communication control unit 374a by running the image control program 371, the out-of-game reproduction program 372, the display control program 373, and the communication control program 374, respectively.

In the data storage region 312b, an image storage section 380 is provided as a storage section for storing data. Note that the aforementioned storage section is an example, and many other storage sections are provided in the data storage region 312b.

For example, when an image file 48b including the identifying image information 44a is acquired from the information sharing site 48a, the image file 48b is stored in the image storage section 83.

The camera control unit 370a can activate the camera of the client terminal 300 and read the identifying image information 44a with that camera.

The image control unit 371a can read the image file 48b stored in the image storage section 380 and read the identifying image information 44a from that image file 48b.

The reading of the identifying image information 44a by means of the camera control unit 370a or the image control unit 371a is reading of the identifying image information 44a by means other than the game application. In response to the reading of the identifying image information 44a by means other than the game application, the out-of-game reproduction unit 372a establishes, on the basis of the communication connection information 46 included in the identifying image information 44*a*, a communication connection to a particular communication destination (e.g., site server 400) indicated by the communication connection information 46. In other words, the out-of-game reproduction unit 372*a* accesses the particular site (e.g., game portal site) managed by the particular communication destination.

As described below, the site server 400 generates a deck composed of cards corresponding to the respective hash IDs 47 included in the identifying image information 44*a*, reflects the generated deck on the deck organization page, and transmits the information concerning the deck organization page to the client terminal 300.

Upon receiving the information concerning the deck organization page, the out-of-game reproduction unit 372*a* of the client terminal 300 displays the deck organization page. Because the deck based on the identifying image information 44*a* is reflected on the deck organization page, the out-of-game reproduction unit 372*a* of the client terminal 300 can reproduce and display the deck based on the identifying image information 44*a* at the client terminal 300, which is outside the game.

The display control unit 373*a* controls the display of images on the display 326 in response to a user operation. The communication control unit 374*a* transmits and receives information to and from the site server 400.

Functional Units of Site Server 400

Figure 22:
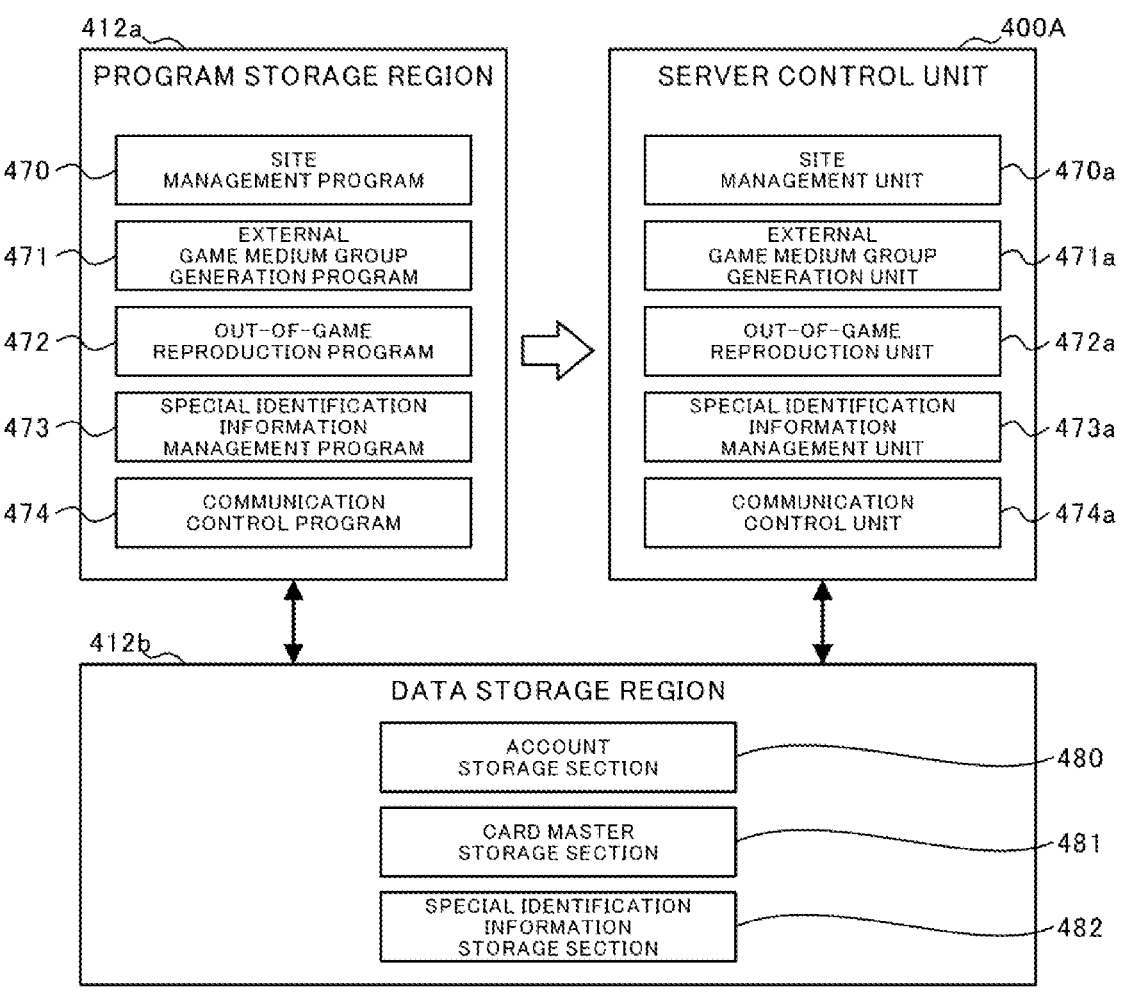
FIG. 22 is a functional block diagram of the site server.

FIG. 22 is a functional block diagram of the site server 400. A program storage region 412*a* and a data storage region 412*b* are provided in the memory 412 of the site server 400. A site management program 470, an external game medium group generation program 471, an out-of-game reproduction program 472, a special identification information management program 473, and a communication control program 474 are stored as application programs in the program storage region 412*a*. Note that the programs listed in FIG. 22 are examples, and many other programs are provided as the application programs.

The CPU 410 runs the programs stored in the program storage region 412*a* and updates data in each of the storage sections in the data storage region 412*b*. Furthermore, the CPU 410 causes the site server 400 (computer) to function as a server control unit 400A by running the individual programs stored in the program storage region 412*a*. The server control unit 400A includes a site management unit 470*a*, an external game medium group generation unit 471*a*, an out-of-game reproduction unit 472*a*, a special identification information management unit 473*a*, and a communication control unit 474*a*.

More specifically, the CPU 410 causes the computer to function as the site management unit 470*a* by running the site management program 470. Similarly, the CPU 410 causes the computer to function as the external game medium group generation unit 471*a*, the out-of-game reproduction unit 472*a*, the special identification information management unit 473*a*, and the communication control unit 474*a* by running the external game medium group generation program 471, the out-of-game reproduction program 472, the special identification information management program 473, and the communication control program 474, respectively.

In the data storage region 412*b*, an account storage section 480, a card master storage section 481, and a special identification information storage section 482 are provided as storage sections for storing data. Note that each of the aforementioned storage sections is an example, and many other storage sections are provided in the data storage region 412*b*.

Accounts with login settings registered at the particular site managed by the site server 400 are stored in the account storage section 480. The card master acquired from the server 100 is stored in the card master storage section 481. When special identification information is generated, the generated special identification information is temporarily stored in the special identification information storage section 482 in association with a deck.

The site management unit 470*a* manages the particular site. For example, in response to a request from the client terminal 300, the site management unit 470*a* transmits screen information, etc. concerning each page of the particular site to the client terminal.

The site server 400 is a particular communication destination different from the game application of the game device G. The external game medium group generation unit 471*a* generates a game medium group (e.g., deck) at the site server 400. The external game medium group generation unit 471*a* updates the content of the deck organization each time a card is clicked on the deck organization page, for example, as shown in FIG. 16A, and transmits screen information concerning the updated deck to the client terminal 300 to update the display of the deck organization page.

When, for example, the client terminal 300 is communicatively connected to the site server 400 by using the identifying image information 44*a*, the out-of-game reproduction unit 472*a* generates a game medium group (e.g., deck) composed of game media (e.g., cards) corresponding to the respective items of game medium identification information (e.g., hash IDs 47) included in the identifying image information 44*a*. Then, the out-of-game reproduction unit 472*a* reflects the generated game medium group on the deck organization page, transmits the screen information concerning the deck organization page to the communicatively connected client terminal 300, and displays the deck organization page on the client terminal 300.

The special identification information management unit 473*a* generates special identification information (e.g., deck code) corresponding to a game medium group generated by the external game medium group generation unit 471*a*. In addition, on the basis of the input special identification information, the special identification information management unit 473*a* also reproduces a game medium group corresponding to the special identification information. For example, when special identification information is input, the special identification information management unit 473*a* communicates with the server 100 and acquires, from the server 100, the individual card IDs constituting the deck corresponding to the special identification information. This allows the external game medium group generation unit 471*a* of the site server 400 to reproduce a deck composed of cards having the acquired card IDs.

The communication control unit 79*a* transmits and receives information to and from the client terminal 300 or the server 100.

Communication Process Between Player Terminal 1 and Server 100

Figure 23:
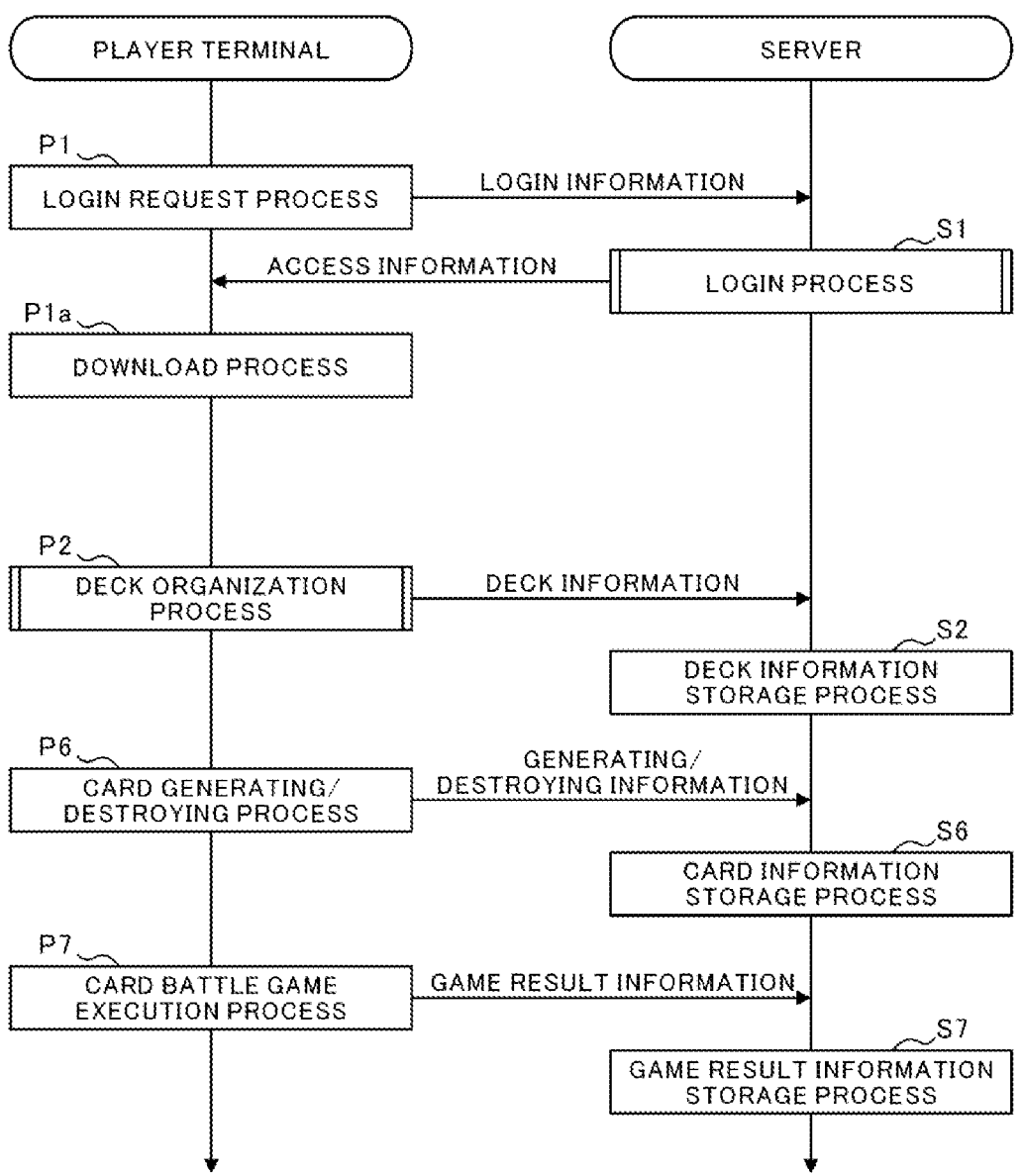
FIG. 23 is a sequence diagram for illustrating processing of the player terminal and the server.

FIG. 23 is a sequence diagram for illustrating processing of the player terminal 1 and the server 100. Note that, in the following description, processes in the player terminal 1 are denoted as Pn (n is any integer). Furthermore, processes in the server 100 are denoted as Sn (n is any integer).

When an operation for starting the game is input by the player, the game execution control unit 70*a* of the player terminal 1 executes a login request process. In this login request process, login information is transmitted to the server 100 via the communication control unit 79*a* on the basis of control performed by the game execution control unit 70*a* (P1). Upon receiving the login information via the communication control unit 174*a*, the server 100 executes a login process (S1).

Figure 24:
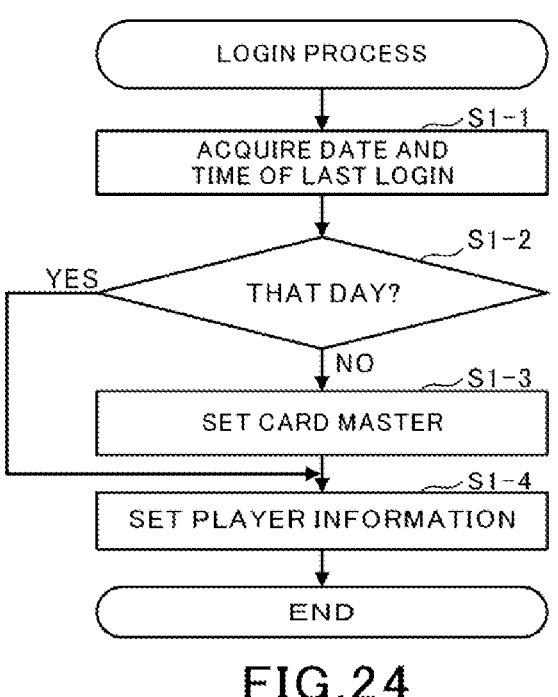
FIG. 24 is a flowchart for illustrating an example of a login process at the server.

FIG. 24 is a flowchart for illustrating an example of the login process (S1) at the server 100. Upon receiving the login information, the game medium identification information management unit 171*a* of the server 100 identifies the player terminal 1 by means of the player ID associated with the login information and acquires the date and time of the last login performed by the player terminal 1 (S1-1). The game medium identification information management unit 171*a* determines whether or not the last login date and the current date are the same (in other words, whether or not the last login date is the date of that day) (S1-2).

If the last login date is not the date of that day (NO in S1-2), the game medium identification information management unit 171*a* reads the card master from the card master storage section 181, sets the read card master as download information (S1-3), and then proceeds to processing in step S1-4. If the last login date is the date of that day (YES in S1-2), the game medium identification information management unit 171*a* proceeds to processing in step S1-4.

In step S1-4, the game medium identification information management unit 171*a* reads, from the player information storage section 182, the player information corresponding to the acquired player ID and sets the read player information as download information (S1-4). Thereafter, the game medium identification information management unit 171*a* transmits, to the player terminal 1, access information for accessing the download information.

Referring back to FIG. 23, upon receiving the access information, the game medium identification information acquisition unit 71*a* of the player terminal 1 executes a download process for accessing the access destination indicated by the access information and downloading the download information (P1*a*). This allows the game medium identification information acquisition unit 71*a* to acquire the hash IDs 47 included in the card master set as the download information.

Also, the player terminal 1 executes a deck organization process described below when the deck organization tab 32*a* shown in FIG. 4A is tapped (P2). When a deck is created or changed in the deck organization process, the player terminal 1 transmits the created or changed deck information to the server 100 via the communication control unit 79*a*.

Upon receiving the deck information via the communication control unit 174*a*, the game execution control unit 170*a* of the server 100 executes a deck information storage process for storing the received deck information in the player information storage section 182 in association with the player ID (S2).

Figure 25:
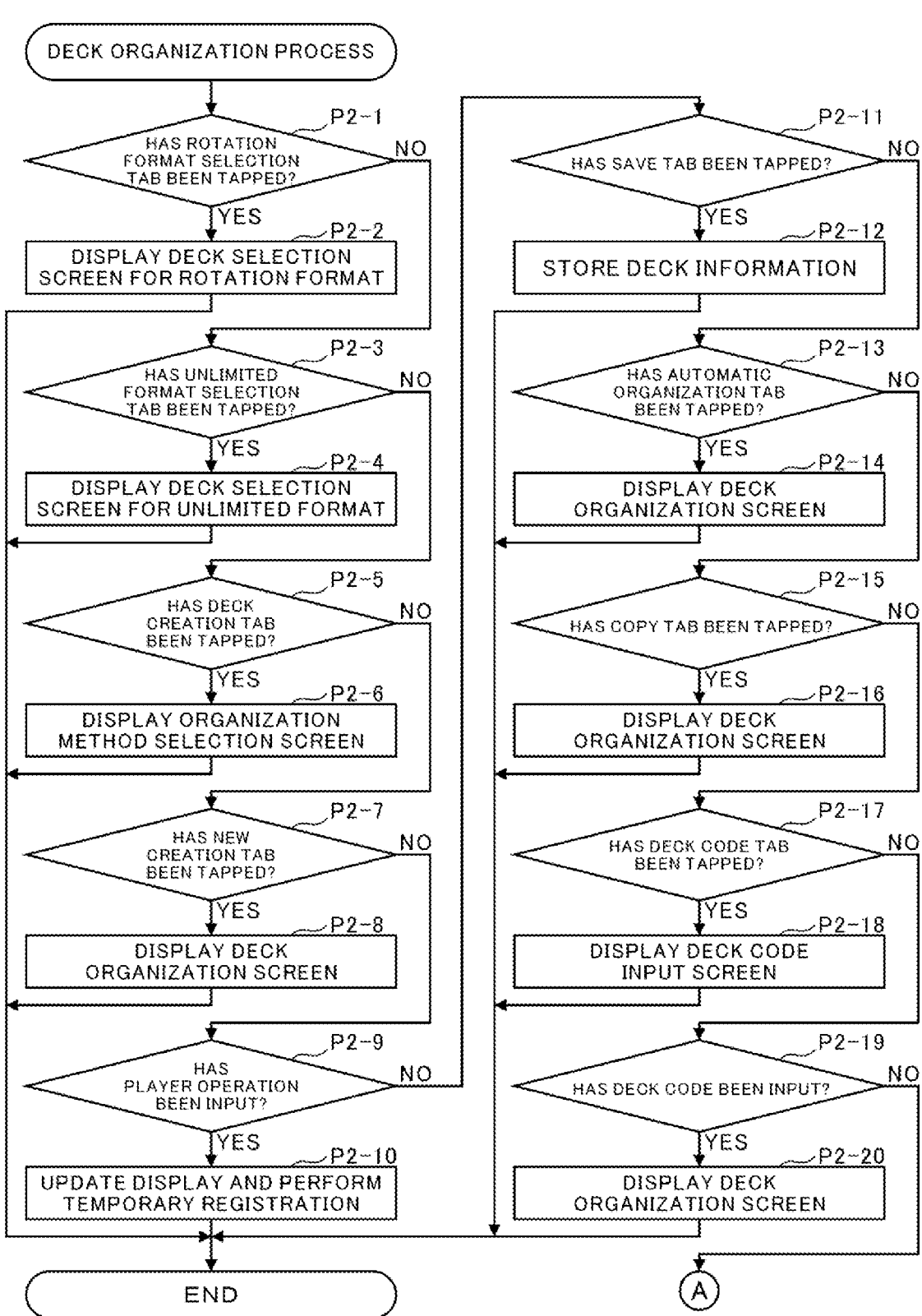
FIG. 25 is a flowchart for illustrating an example of a deck organization process at the player terminal.
Figure 26:
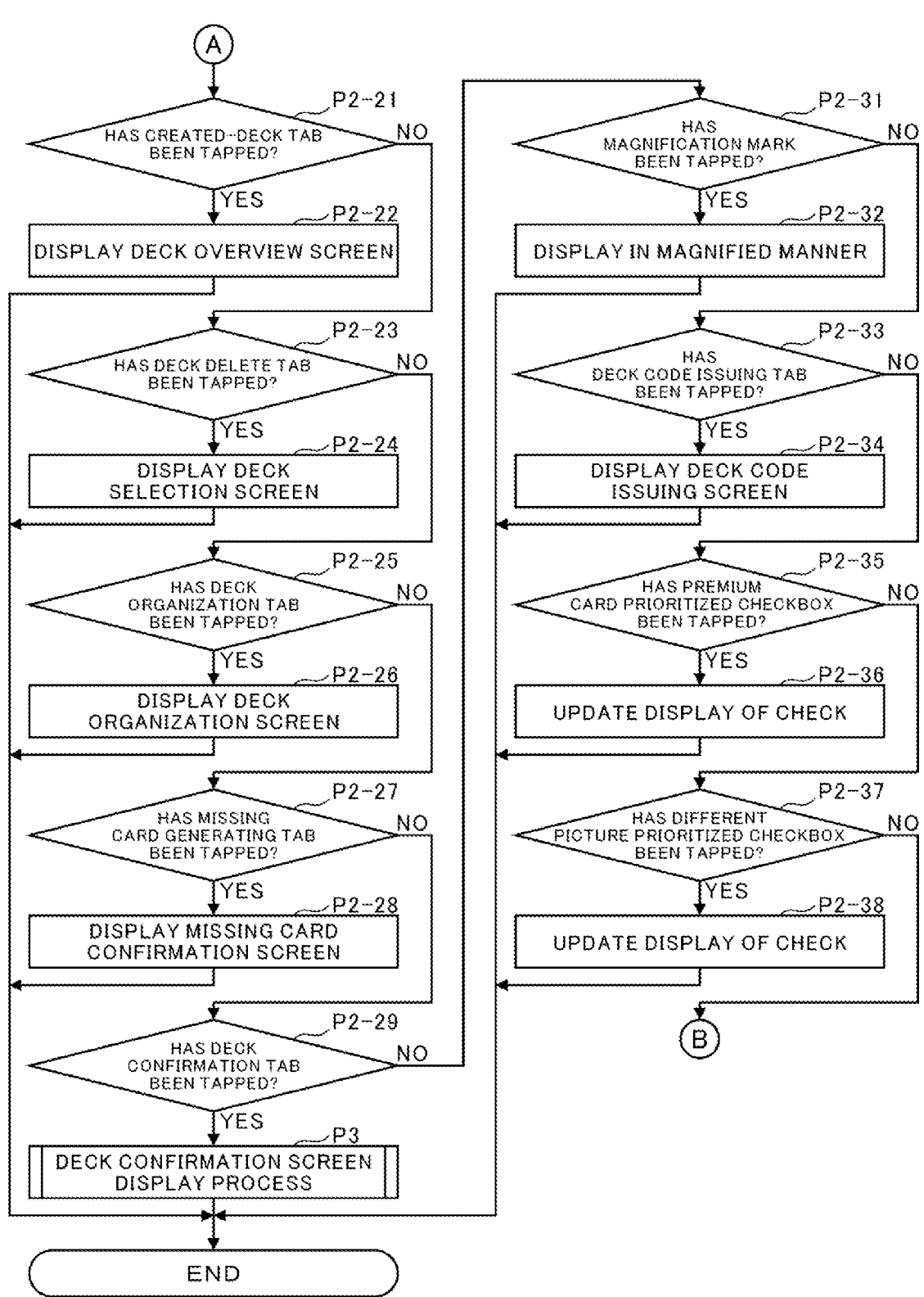
FIG. 26 is a flowchart for illustrating an example of the deck organization process at the player terminal.
Figure 27:
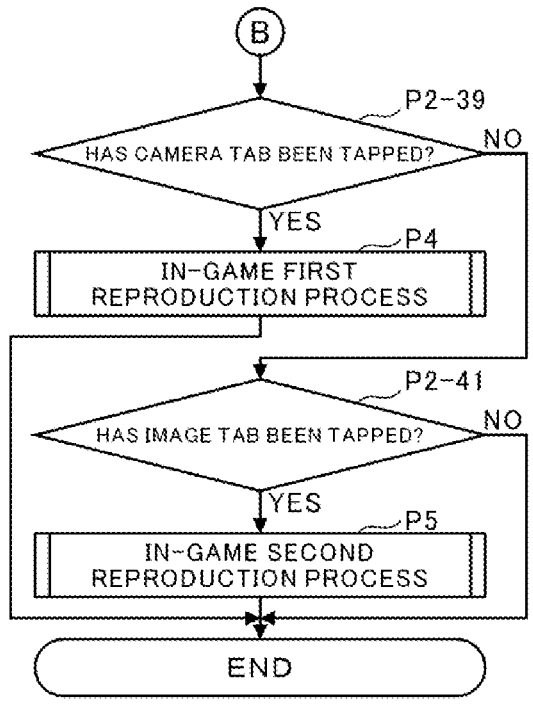
FIG. 27 is a flowchart for illustrating an example of the deck organization process at the player terminal.

FIGS. 25, 26, and 27 are each a flowchart for illustrating an example of the deck organization process (P2) at the player terminal 1. "A" in FIG. 25 continues to "A" in FIG. 26. "B" in FIG. 26 continues to "B" in FIG. 27.

As shown in FIG. 25, when the rotation format selection tab 33*a* is tapped (YES in P2-1) on the format selection screen (refer to FIG. 4B), the game medium group generation unit 72*a* loads deck IDs for the rotation format stored in the player information storage section 84 and displays the deck selection screen for the rotation format (refer to FIG. 4C) on the basis of the loaded deck IDs for the rotation format (P2-2). In addition, when the unlimited format selection tab 33*b* is tapped (YES in P2-3), the game medium group generation unit 72*a* loads deck IDs for the unlimited format stored in the player information storage section 84 and displays the deck selection screen for the unlimited format on the basis of the loaded deck IDs for the unlimited format (P2-4).

In addition, when the deck creation tab 34*a* is tapped (YES in P2-5) on the deck selection screen (refer to FIG. 4C), the game medium group generation unit 72*a* displays the organization method selection screen (refer to FIG. 5A) (P2-6).

In addition, when the new creation tab 35*a* is tapped on the organization method selection screen (refer to FIG. 5A) (YES in P2-7), the game medium group generation unit 72*a* loads, from the player information storage section 84, the possessed cards corresponding to the currently selected format and displays the deck organization screen (refer to FIG. 5B) on which the possessed cards are placed in the lower row (P2-8).

In addition, when a player operation, such as sliding a card, is input on the deck organization screen (YES in P2-9), the game medium group generation unit 72*a* updates the display, such as placing the card in the upper row of the deck organization screen, and also temporarily registers the information concerning the card placed in the upper row (P2-10).

In addition, when the save tab 36 is tapped on the deck organization screen (YES in P2-11), the game medium group generation unit 72*a* stores, in the player information storage section 84 as deck information, the card information concerning the cards placed in the upper row of the deck organization screen (P2-12).

Also, when the automatic organization tab 35*b* is tapped on the organization method selection screen (YES in P2-13), the game medium group generation unit 72*a* loads, from the player information storage section 84, the possessed cards corresponding to the currently selected format, selects cards from the possessed cards that have been loaded, and displays the deck organization screen on which the selected cards are placed in the upper row (P2-14).

Furthermore, when the copy tab 35*c* is tapped on the organization method selection screen (YES in P2-15), the game medium group generation unit 72*a* displays the copy source selection screen, loads, from the player information storage section 84, the deck information corresponding to an icon that has been tapped on the copy source selection screen, and displays the deck organization screen on which cards corresponding to the loaded deck information are placed in the upper row (P2-16).

In addition, when the deck code tab 35*d* is tapped on the organization method selection screen (YES in P2-17), the special identification information management unit 76*a* displays the deck code input screen (refer to FIG. 13B) (P2-18).

In addition, when a deck code is input and the deck code input determination tab 53 is tapped on the deck code input screen (YES in P2-19), the special identification information management unit 76*a* communicates with the server 100 and inquires of the server 100 as to whether or not the deck code is valid. If the deck code is valid, the server 100 transmits, to the player terminal 1, the deck information corresponding to the deck code. Upon acquiring the deck information, the special identification information management unit 76*a* of the player terminal 1 displays the deck organization screen on which the cards corresponding to that deck information are placed in the upper row (P2-20).

As shown in FIG. 26, when a created-deck tab 34*b* is tapped (YES in P2-21) on the deck selection screen (refer to FIG. 4C), the deck corresponding to the tapped created-deck tab 34*b* becomes the currently selected deck, so that the game medium group generation unit 72*a* loads deck information from the player information storage section 84 on the basis of the currently selected deck ID and displays the deck overview screen (refer to FIG. 7A) on which the loaded deck information is laid out (P2-22).

In addition, when the deck delete tab 40*a* is tapped on the deck overview screen (YES in P2-23), the game medium group generation unit 72*a* deletes the deck information concerning the currently selected deck from the player information storage section 84 and displays the deck selection screen (P2-24).

Furthermore, when the deck organization tab 40*b* is tapped on the deck overview screen (YES in P2-25), the game medium group generation unit 72*a* displays the deck organization screen (refer to FIG. 7B) on which the currently selected deck is placed in the upper row (P2-26).

In addition, when the missing card generating tab 42*b* is tapped (YES in P2-27) on the deck organization screen (FIG. 7B), the game execution control unit 70*a* compares the cards in the currently selected deck with the possessed cards to identify a missing card, displays the missing card confirmation screen, and displays the missing card on the missing card confirmation screen (P2-28).

Furthermore, when the deck confirmation tab 40*c* on the deck overview screen (refer to FIG. 7A) or the deck confirmation tab 42*c* on the deck organization screen (refer to FIG. 7B) is tapped (YES in P2-29), the player terminal 1 executes a deck confirmation screen display process (P3).

Figure 28:
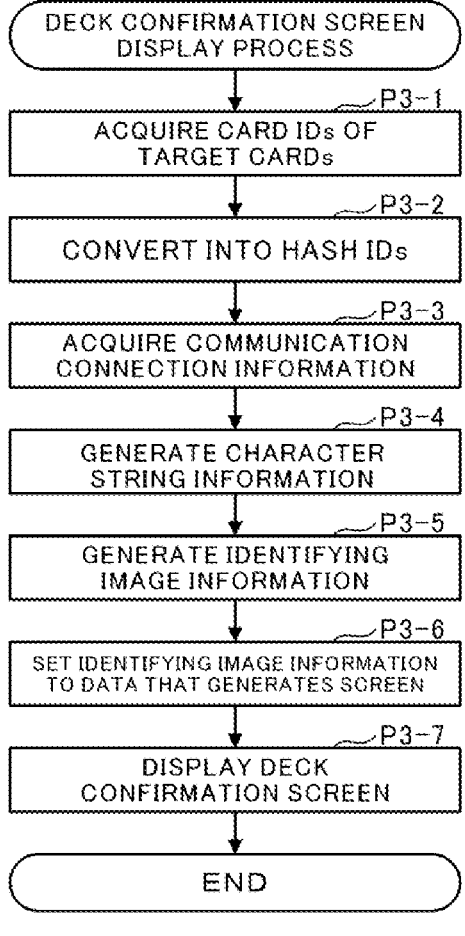
FIG. 28 is flowchart for illustrating an example of a deck confirmation screen display process.

FIG. 28 is a flowchart for illustrating an example of the deck confirmation screen display process (P3). When the deck confirmation screen display process (P3) is started, the cards constituting the currently selected deck are set as target cards, and the identifying image information generation unit 73*a* acquires the card IDs of the target cards from the deck information concerning the currently selected deck (P3-1). The identifying image information generation unit 73*a* refers to the card master stored in the card master storage section 81 and converts the acquired card IDs into hash IDs 47 (P3-2).

Next, the identifying image information generation unit 73*a* acquires the communication connection information 46 stored in the communication connection information storage section 82 (P3-3). The identifying image information generation unit 73*a* combines the acquired hash IDs 47 and communication connection information 46 to generate character string information from which the identifying image information 44*a* is derived (P3-4). The identifying image information generation unit 73*a* converts the generated string information into the identifying image information 44*a* (P3-5).

The identifying image information generation unit 73*a* sets the generated identifying image information 44*a* to screen data that generates the deck confirmation screen (P3-6). The identifying image information generation unit 73*a* displays the deck confirmation screen on the basis of the screen data to which the identifying image information 44*a* has been set (P3-7). This causes the deck confirmation screen to be displayed, as shown in FIG. 8A, and the identifying image information 44*a* is displayed on the deck confirmation screen.

Referring back to FIG. 26, when the magnification mark 44*b* is tapped on the deck confirmation screen (YES in P2-31), the identifying image information generation unit 73*a* displays the identifying image information magnification screen (refer to FIG. 8B) to display the identifying image information 44*a* generated in the deck confirmation screen display process (P3) in a magnified manner (P2-32).

In addition, when the deck code issuing tab 41 is tapped on the deck overview screen (YES in P2-33), the special identification information management unit 76*a* generates a deck code corresponding to the currently selected deck, displays the deck code issuing screen (refer to FIG. 13A), and displays the generated deck code in the deck code display region 50 on the deck code issuing screen (P2-34).

Furthermore, when the premium card prioritized checkbox 35*g* is tapped on the organization method selection screen (refer to FIG. 5A) (YES in P2-35), the game medium group generation unit 72*a* updates the display of the check in the premium card prioritized checkbox 35*g* (P2-36). In this case, when the premium card prioritized checkbox 35*g* is tapped while the premium card prioritized checkbox 35*g* is unchecked, the premium card prioritized checkbox 35*g* is checked. On the other hand, when the premium card prioritized checkbox 35*g* is tapped while the premium card prioritized checkbox 35*g* is checked, the premium card prioritized checkbox 35*g* is unchecked.

Also, when the different picture prioritized checkbox 35*h* is tapped on the organization method selection screen (YES in P2-37), the game medium group generation unit 72*a* updates the display of the check in the different picture prioritized checkbox 35*h* (P2-38). In this case, when the different picture prioritized checkbox 35*h* is tapped while the different picture prioritized checkbox 35*h* is unchecked, the different picture prioritized checkbox 35*h* is checked. On the other hand, when the different picture prioritized checkbox 35*h* is tapped while the different picture prioritized checkbox 35*h* is checked, the different picture prioritized checkbox 35*h* is unchecked.

As shown in FIG. 27, when the camera tab 35*e* is tapped on the organization method selection screen (YES in P2-39), the identifying image information reading unit 74*a* and the in-game reproduction unit 75*a* execute an in-game first reproduction process (P4).

Figure 29:
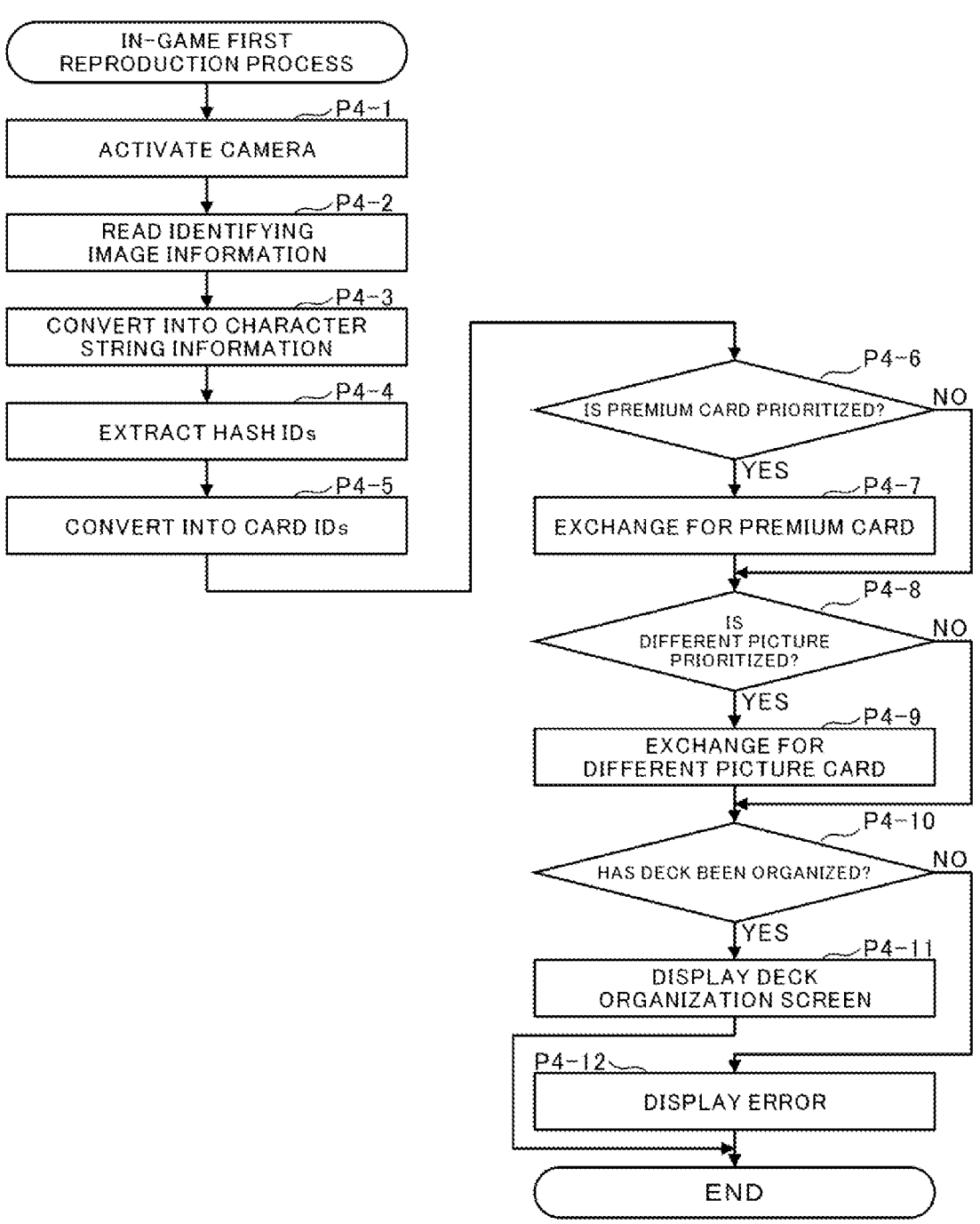
FIG. 29 is a flowchart for illustrating an example of an in-game first reproduction process.

FIG. 29 is a flowchart for illustrating an example of the in-game first reproduction process (P4). When the in-game first reproduction process (P4) is started, the identifying image information reading unit 74*a* activates the camera of the player terminal 1 from within the game (P4-1). When the identifying image information 44*a* fits within the image-capturing area of the camera so that the identifying image information 44*a* appears on the display 26, the identifying image information reading unit 74*a* reads the identifying image information 44*a* captured by the camera (P4-2). When reading of the identifying image information 44*a* is completed, the identifying image information reading unit 74*a* converts (decodes) the read identifying image information 44*a* into character string information (P4-3).

Next, the in-game reproduction unit 75*a* analyzes the acquired character string information and extracts the hash IDs 47 from the character string information (P4-4). The in-game reproduction unit 75*a* refers to the card master stored in the card master storage section 81 and converts the acquired hash IDs 47 into card IDs (P4-5).

Next, if the premium card prioritized checkbox 35*g* is checked (YES in P4-6), the in-game reproduction unit 75*a* refers to the card master and, if the acquired card IDs include a card ID that can be exchanged for a premium card, exchanges the card ID for the card ID of the premium card (P4-7). Also, if the different picture prioritized checkbox 35h is checked (YES in P4-8), the in-game reproduction unit 75a refers to the card master and, if the acquired card IDs include a card ID that can be exchanged for a different picture card, exchanges the card ID for the card ID of the different picture card (P4-9).

After a group of card IDs have been acquired from the hash IDs 47 and a determination as to premium card priority or different picture priority has been made, the in-game reproduction unit 75a determines whether or not the group of card IDs normally constitute a deck (P4-10). If a deck can be normally configured (YES in P4-10), the in-game reproduction unit 75a generates deck information on the basis of the group of card IDs, displays the successful reading screen (refer to FIG. 12B), and then displays the deck organization screen (refer to FIG. 12C) on which the cards based on the generated deck information are placed in the upper row (refer to P4-11). On the other hand, if a deck cannot be configured normally (NO in P4-10), the in-game reproduc-tion unit 75a displays an error message indicating that a deck cannot be configured normally (P4-12).

Referring back to FIG. 27, when the image tab 35f is tapped on the organization method selection screen (YES in P2-41), the identifying image information reading unit 74a and the in-game reproduction unit 75a execute an in-game second reproduction process (P5).

Figure 30:
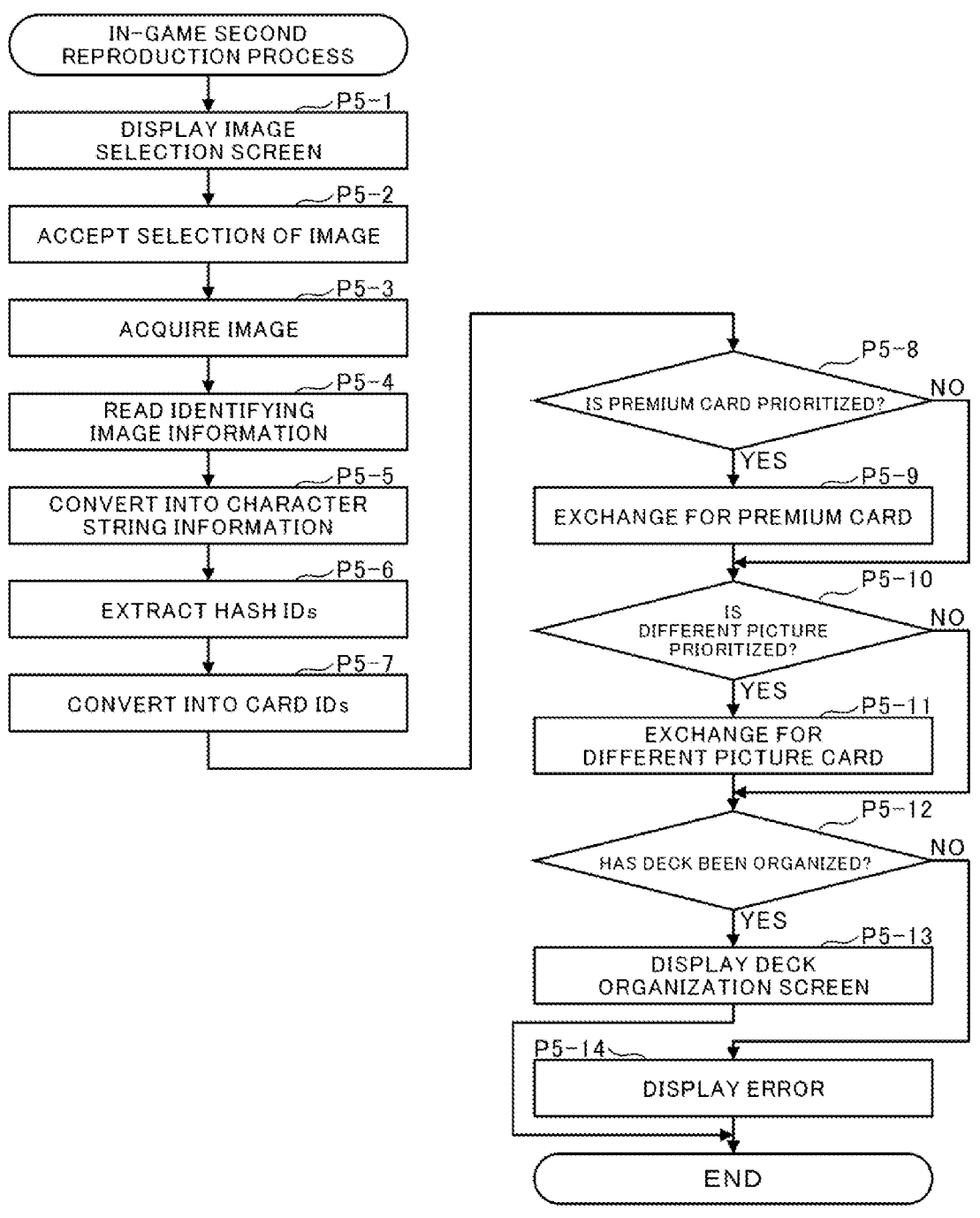
FIG. 30 is a flowchart for illustrating an example of an in-game second reproduction process.

FIG. 30 is a flowchart for illustrating an example of the in-game second reproduction process (P5). When the in-game second reproduction process (P5) is started, the iden-tifying image information reading unit 74a loads the image files stored in the image storage section 83 and displays the image selection screen (refer to FIG. 12D) on which thumb-nails of the loaded image files are placed (P5-1). When the player selects the image file 48b on the image selection screen, the identifying image information reading unit 74a accepts the selection of that image file 48b (P5-2). The identifying image information reading unit 74a acquires the selected image file 48b from the image storage section 83 (P5-3). The identifying image information reading unit 74a analyzes the acquired image file 48b and reads the identi-fying image information 44a included in the image file 48b (P5-4). The identifying image information reading unit 74a converts (decodes) the read identifying image information 44a into character string information (P5-5).

Next, in the same manner as in the in-game first repro-duction process (P4), the in-game reproduction unit 75a analyzes the acquired character string information and extracts the hash IDs 47 from the character string informa-tion (P5-6). The in-game reproduction unit 75a refers to the card master stored in the card master storage section 81 and converts the acquired hash IDs 47 into card IDs (P5-7).

Next, if the premium card prioritized checkbox 35g is checked (YES in P5-8), the in-game reproduction unit 75a refers to the card master and, if the acquired card IDs include a card ID that can be exchanged for a premium card, exchanges the card ID for the card ID of the premium card (P5-9). Also, if the different picture prioritized checkbox 35h is checked (YES in P5-10), the in-game reproduction unit 75a refers to the card master and, if the acquired card IDs include a card ID that can be exchanged for a different picture card, exchanges the card ID for the card ID of the different picture card (P5-11).

After a group of card IDs have been acquired from the hash IDs 47 and a determination as to premium card priority or different picture priority has been made, the in-game reproduction unit 75a determines whether or not the group of card IDs normally constitute a deck (P5-12). If a deck can be normally configured (YES in P5-12), the in-game repro-duction unit 75a generates deck information on the basis of the group of card IDs, displays the successful reading screen (refer to FIG. 12B), and then displays the deck organization screen (refer to FIG. 12C) on which the cards based on the generated deck information are placed in the upper row (refer to P5-13). On the other hand, if a deck cannot be configured normally (NO in P5-12), the in-game reproduc-tion unit 75a displays an error message indicating that a deck cannot be configured normally (P5-14).

Referring back to FIG. 23, when the card list/generation tab 32b shown in FIG. 4A is tapped, the game execution control unit 70a of the player terminal 1 executes a card generating/destroying process regarding the generation or destroying of a card (P6). When a card is generated or destroyed in the card generating/destroying process, the game execution control unit 70a of the player terminal 1 transmits generating/destroying information including infor-mation concerning the generated or destroyed card to the server 100 via the communication control unit 79a.

Upon receiving the generating/destroying information via the communication control unit 174a, the game execution control unit 170a of the server 100 executes a card infor-mation storage process for updating the player information in the player information storage section 182 on the basis of the received generating/destroying information (S6).

Also, when the solo-play selection operation section 30b or the multi-play selection operation section 30c shown in FIG. 4A is tapped and various kinds of settings are made, the battle game execution unit 77a of the player terminal 1 transmits start information from the player terminal 1 to the server 100 via the communication control unit 79a to execute a card battle execution process (P7). When the card battle execution process is completed, the battle game execution unit 77a of the player terminal 1 transmits game result information to the server 100 via the communication control unit 79a.

Upon receiving the game result information, the battle game execution unit 173a of the server 100 executes a game result information storage process for storing the received game result information in the battle log storage section 183 in association with the player ID (S7).

Communication Process Between Client Terminal
300 and Site Server 400

Figure 31:
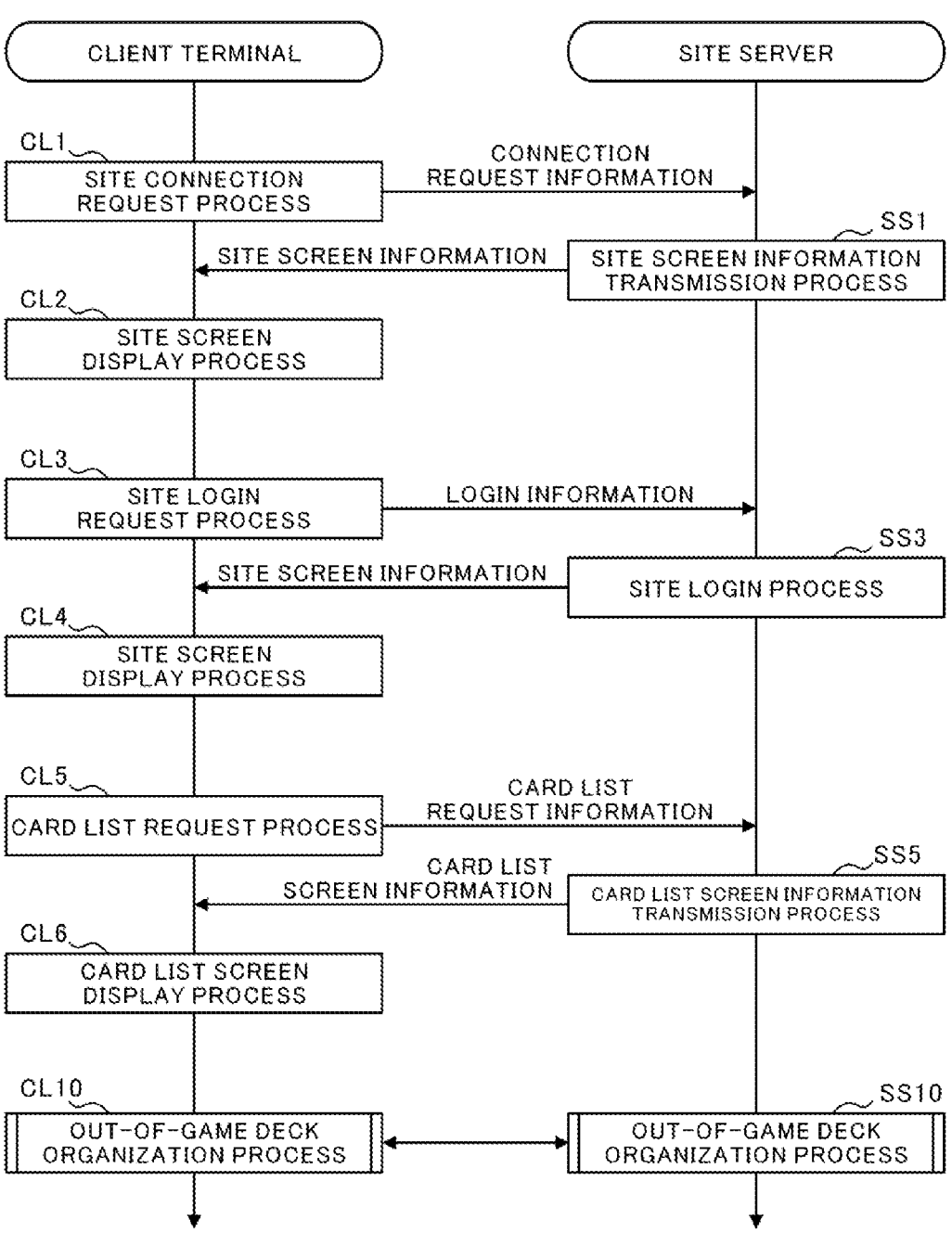
FIG. 31 is a sequence diagram for illustrating processing at the client terminal and the site server.

FIG. 31 is a sequence diagram for illustrating processing of the client terminal 300 and the site server 400. Note that, in the following description, processes in the client terminal 300 are denoted as CLn (n is any integer). Furthermore, processes in the site server 400 are denoted as SSn (n is any integer).

When the user of the client terminal 300 specifies a particular site in a browser, the communication control unit 374a of the client terminal 300 executes a site connection request process for requesting a connection to the particular site (CL1). When the site connection request process is executed, the communication control unit 374a of the client terminal 300 transmits, to the site server 400 managing the particular site, connection request information for requesting communication connection.

Upon receiving the connection request information, the site management unit 470a of the site server 400 permits the client terminal 300 to access the particular site and executes a site screen information transmission process for transmit-ting screen information concerning the particular site to the client terminal 300 (SS1). When the site screen information transmission process is executed, the site management unit 470a transmits, to the client terminal 300 via the communication control unit 474a, site screen information concerning a predetermined page (e.g., top page) of the particular site.

Upon receiving the site screen information via the communication control unit 374a, the display control unit 373a of the client terminal 300 executes a site screen display process for updating the browser display on the basis of the received site screen information (CL2).

In addition, when the user of the client terminal 300 clicks the login tab 61e on the particular site, the communication control unit 374a of the client terminal 300 executes a site login request process for requesting login to the particular site (CL3). When the login request process is executed, the communication control unit 374a of the client terminal 300 transmits login information including the user ID and password to the site server 400.

Upon receiving the login information, the site management unit 470a of the site server 400 executes a site login process on the basis of the login information (SS3). In this login process, whether or not login is permitted is determined on the basis of whether or not the user ID and password included in the login information match the user ID and password stored in the account storage section 480. When login is permitted, the site management unit 470a transmits, to the client terminal 300 via the communication control unit 474a, site screen information relieved of predetermined restrictions.

Upon receiving the site screen information via the communication control unit 374a, the display control unit 373a of the client terminal 300 executes a site screen display process for updating the browser display on the basis of the received site screen information (CL4).

In addition, when the user of the client terminal 300 clicks the card list tab 61c of the particular site, the communication control unit 374a of the client terminal 300 executes a card list request process for requesting that the card list page be displayed (CL5). When the card list request process is executed, the communication control unit 374a of the client terminal 300 transmits card list request information to the site server 400.

Upon receiving the card list request, the site management unit 470a of the site server 400 executes a card list screen information transmission process for transmitting site screen information concerning the card list page (SS5). When the card list screen information transmission process is executed, the site management unit 470a transmits, to the client terminal 300 via the communication control unit 474a, card list screen information, which is site screen information indicating the card list page.

Upon receiving the card list screen information via the communication control unit 374a, the display control unit 373a of the client terminal 300 executes a card list screen display process for updating the browser display on the basis of the received card list screen information (CL6).

In addition, when the user of the client terminal 300 clicks the deck creation tab 61d, the client terminal 300 communicates with the site server 400 and executes an out-of-game deck organization process for enabling the organization of a deck at the particular site (CL10). The site server 400 executes an out-of-game deck organization process in response to the out-of-game deck organization process at the client terminal 300 (SS10).

Figure 32:
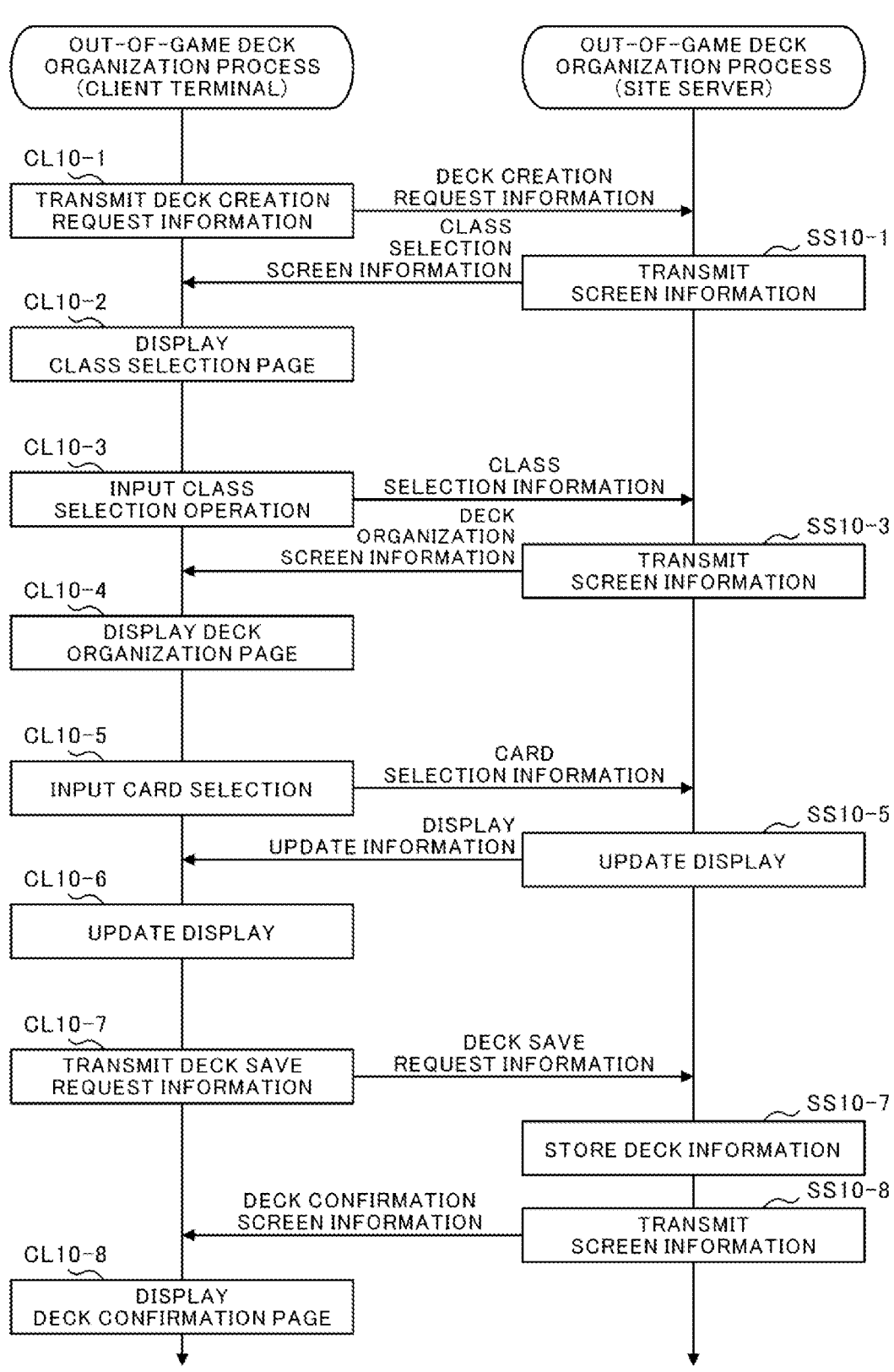
FIG. 32 is a sequence diagram for illustrating an out-of-game deck organization process at the client terminal and an out-of-game deck organization process at the site server.
Figure 33:
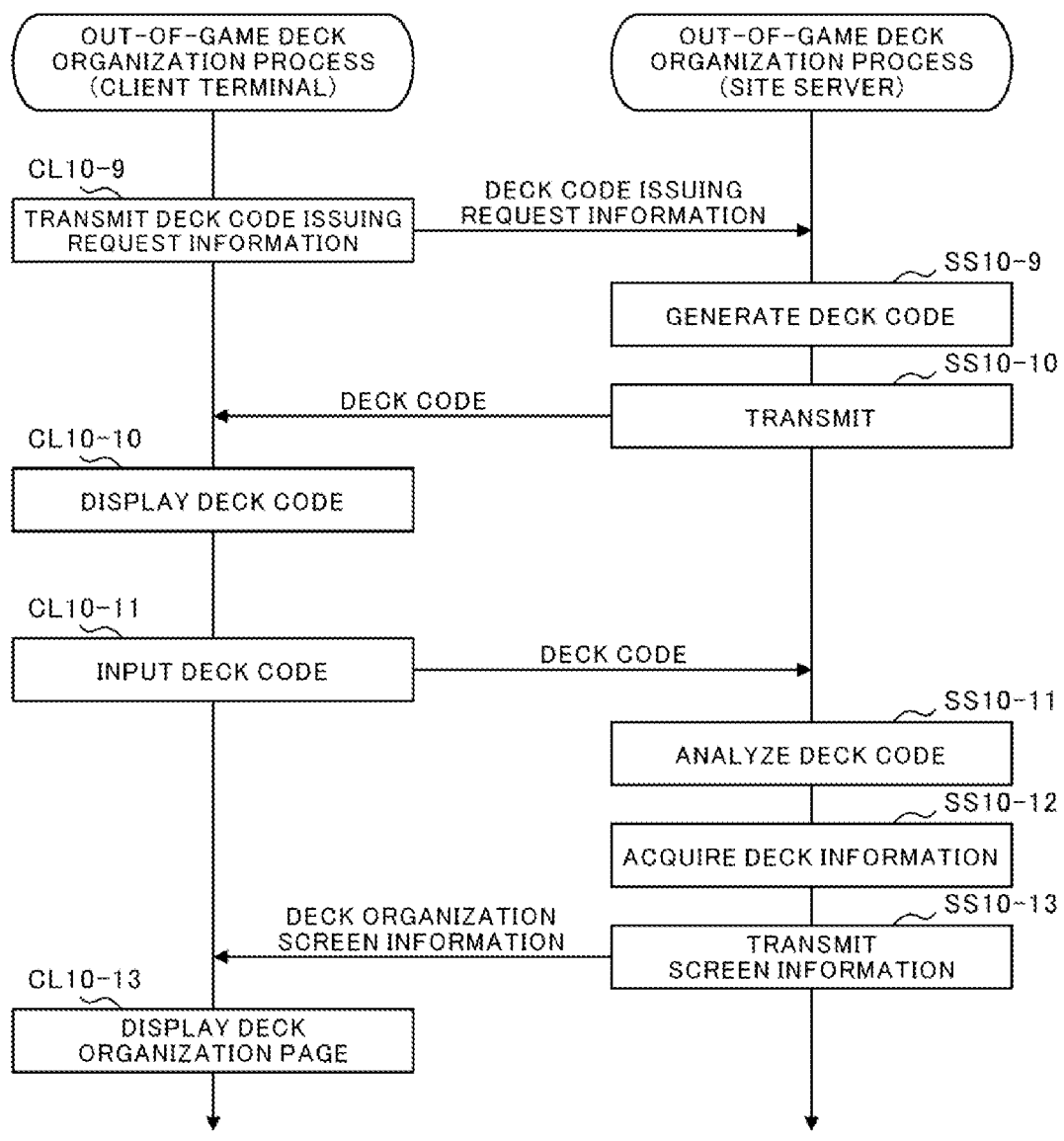
FIG. 33 is a sequence diagram for illustrating the out-of-game deck organization process at the client terminal and the out-of-game deck organization process at the site server.

FIGS. 32 and 33 are each a sequence diagram for illustrating the out-of-game deck organization process (CL10) at the client terminal 300 and the out-of-game deck organization process (SS10) at the site server 400.

As shown in FIG. 32, when the deck creation tab 61d is clicked, the communication control unit 374a of the client terminal 300 transmits deck creation request information to the site server 400 (CL10-1).

Upon receiving the deck creation request information, the external game medium group generation unit 471a of the site server 400 transmits, to the client terminal 300 via the communication control unit 474a, class selection screen information, which is screen information concerning the class selection page (SS10-1).

Upon receiving the class selection screen information, the display control unit 373a of the client terminal 300 displays the class selection page (refer to FIG. 15B) on the basis of the received class selection screen information (CL10-2).

In addition, when a class selection operation, such as clicking an individual class tab 61f, is input on the class selection page, the communication control unit 374a of the client terminal 300 transmits, to the site server 400, class selection information including information concerning the clicked class (CL10-3).

Upon receiving the class selection information, the external game medium group generation unit 471a of the site server 400 acquires card information concerning a plurality of cards belonging to the class indicated by the received class selection information by referring to the card master stored in the card master storage section 481 and transmits, to the client terminal 300 via the communication control unit 474a, deck organization screen information indicating screen information concerning a deck organization page on which cards indicated by the acquired card information are placed (SS10-3).

Upon receiving the deck organization screen information, the display control unit 373a of the client terminal 300 displays the deck organization page (FIG. 16A) on the basis of the received deck organization screen information (CL10-4).

In addition, when a card selection operation, such as clicking a card icon, is input on the deck organization page, the communication control unit 374a of the client terminal 300 transmits, to the site server 400, card selection information corresponding to the card selection operation (CL10-5).

Upon receiving the card selection information, the external game medium group generation unit 471a of the site server updates display of the selected-card-type display regions 63g, display of the total selection number display region 63f, and display of the cost graph 63e on the deck organization page and transmits, to the client terminal 300 via the communication control unit 474a, display update information indicating the updated display (SS10-5).

Upon receiving the display update information, the display control unit 373a of the client terminal 300 updates the display of the deck organization page on the basis of the received display update information (CL10-6).

Also, when the deck save tab 63d is clicked on the deck organization page, the communication control unit 374a of the client terminal 300 transmits, to the site server 400, deck save request information requesting that the deck organized on the deck organization page be saved.

Upon receiving the deck save request information, the external game medium group generation unit 471a of the site server 400 stores the deck information corresponding to the deck on the current deck organization page in the account storage section 480 in association with the user ID (SS10-7). The site management unit 470a then transmits, to the client terminal 300 via the communication control unit 474*a*, the deck confirmation screen information indicating the screen information concerning the deck confirmation page on which the saved deck is laid out (SS10-8).

Upon receiving the deck confirmation screen information, the display control unit 373*a* of the client terminal 300 displays the deck confirmation page (refer to FIG. 16B) on the basis of the received deck confirmation screen information (CL10-8).

As shown in FIG. 33, when the deck code issuing tab 64*b* is clicked on the deck confirmation page, the communication control unit 374*a* of the client terminal 300 transmits, to the site server 400, deck code issuing request information requesting that a deck code be issued (CL10-9).

Upon receiving the deck code issuing request information, the special identification information management unit 473*a* of the site server 400 generates a deck code corresponding to the deck laid out on the deck confirmation page (SS10-9). The special identification information management unit 473*a* of the site server 400 then transmits the generated deck code to the client terminal 300 (SS10-10).

Upon receiving the deck code, the display control unit 373*a* of the client terminal 300 displays the received deck code in the deck code display region 64*c* of the deck confirmation page (CL10-10).

In addition, when a deck code is input on the class selection page, the communication control unit 374*a* of the client terminal 300 transmits the input deck code to the site server 400 (CL10-11).

Upon receiving the deck code, the special identification information management unit 473*a* of the site server communicates with the server 100 and analyzes the deck code by inquiring of the server 100 about the validity of the received deck code (SS10-11). The server 100 analyzes the deck code about which the site server 400 has inquired and, if the deck code is valid, transmits the deck information corresponding to the deck code to the site server 400. If the deck code is valid, the special identification information management unit 473*a* of the site server 400 acquires deck information corresponding to the deck code (SS10-12). The special identification information management unit 473*a* then transmits, to the client terminal 300 via the communication control unit 474*a*, deck organization screen information indicating screen information concerning a deck organization page on which the deck indicated by that deck information is placed.

Upon receiving the deck organization screen information reflecting the deck based on the deck code, the display control unit 373*a* of the client terminal 300 displays a deck organization page indicated by the received deck organization screen information (CL10-13).

Figure 34:
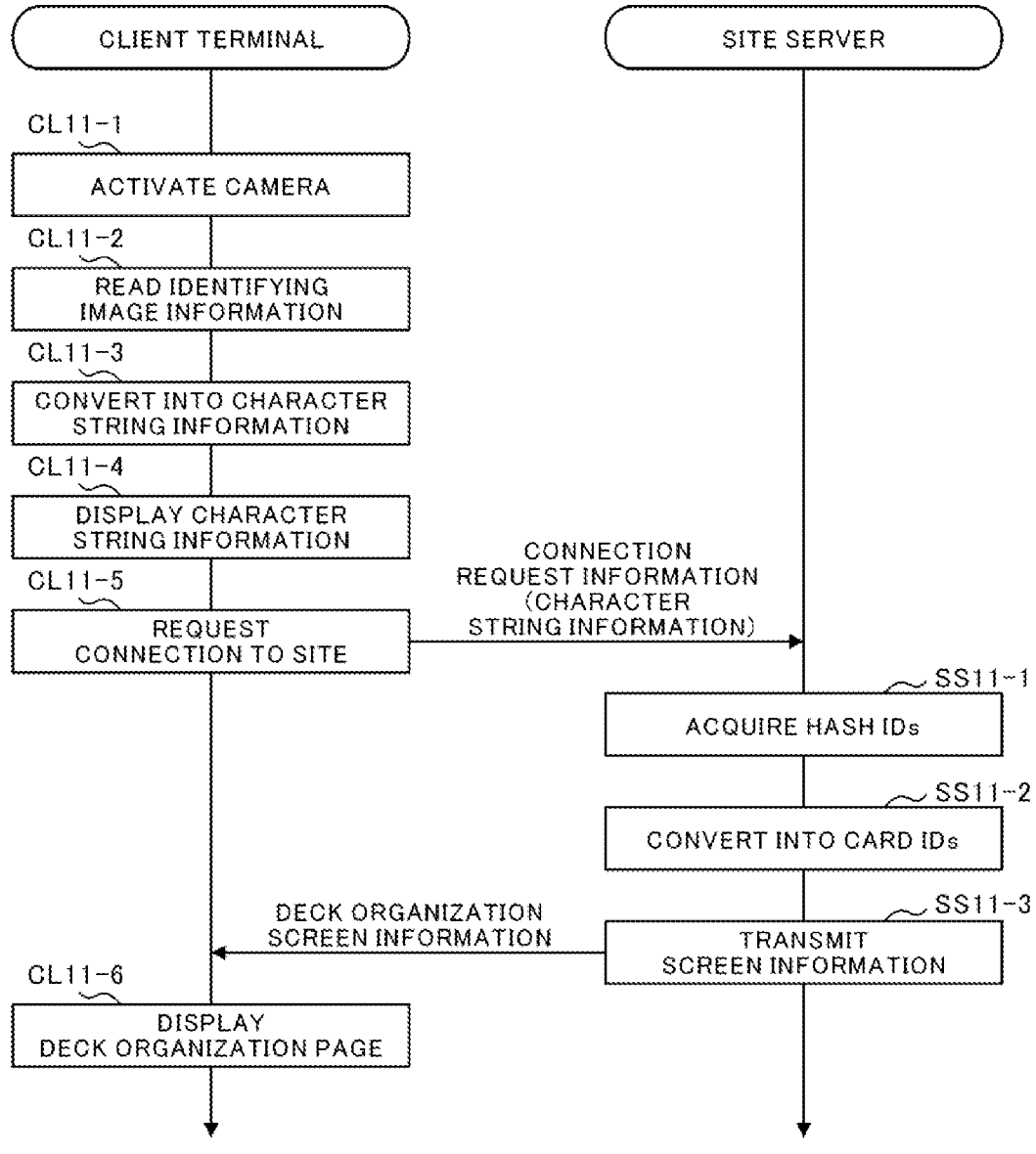
FIG. 34 is a sequence diagram for illustrating processing at the client terminal and the site server pertaining to reading of identifying image information by means of a camera.

FIG. 34 is a sequence diagram for illustrating processing of the client terminal 300 and the site server 400 pertaining to reading of the identifying image information 44*a* by means of a camera.

When the user of the client terminal 300 inputs a camera activation operation by, for example, tapping the camera application icon on the home screen of the client terminal 300, the camera control unit 370*a* of the client terminal 300 activates the camera (CL11-1).

When the identifying image information 44*a* fits within the image-capturing area of the camera so that the identifying image information 44*a* appears on the display 326, the camera control unit 370*a* reads the identifying image information 44*a* captured by the camera (CL11-2). When the reading of the identifying image information 44*a* is completed, the camera control unit 370*a* converts the read identifying image information 44*a* into character string information (CL11-3) and displays the character string information in the pop-up 66 on the display 326 (CL11-4).

When the displayed pop-up 66 indicating the character string information is tapped, the out-of-game reproduction unit 372*a* of the client terminal 300 accesses the location on the communication network 200 indicated by the character string information. In other words, the out-of-game reproduction unit 372*a* makes a request for connection to the particular site on the basis of the communication connection information 46 included in the character string information. At this time, the client terminal 300 transmits, to the site server 400, the character string information together with the connection request information requesting the connection (CL11-5).

Upon receiving the connection request information and the character string information, the out-of-game reproduction unit 472*a* of the site server 400 permits access made by the client terminal 300 and acquires the hash IDs 47 included in the character string information (SS11-1). The out-of-game reproduction unit 472*a* converts the acquired hash IDs 47 into card IDs by referring to the card master stored in the card master storage section 481 (SS11-2). The out-of-game reproduction unit 472*a* transmits, to the client terminal 300, deck organization screen information indicating screen information concerning the deck organization page on which the cards having the acquired card IDs are placed (SS11-3).

The out-of-game reproduction unit 372*a* of the client terminal 300 displays the deck organization page on the basis of the received deck organization screen information (CL11-6). This reproduces the deck based on the identifying image information 44*a* on the deck organization page.

Figure 35:
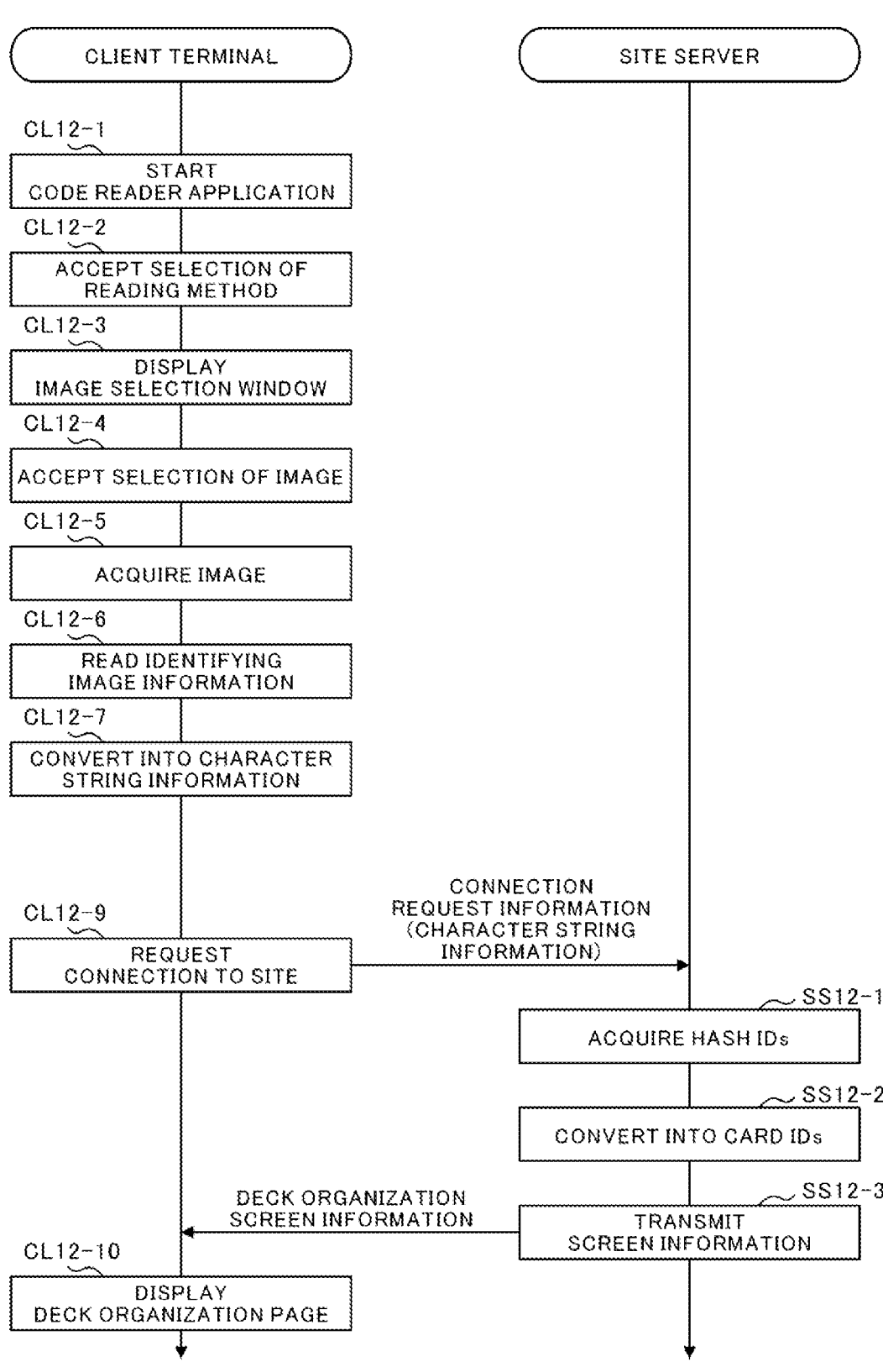
FIG. 35 is a sequence diagram for illustrating processing of the client terminal and the site server pertaining to reading of identifying image information from an image file.

FIG. 35 is a sequence diagram for illustrating processing of the client terminal 300 and the site server 400 pertaining to reading of the identifying image information 44*a* from the image file 48*b*.

When the user of the client terminal 300 inputs an operation to start the code reader application, for example, by clicking the code reader application icon, the image control unit 371*a* of the client terminal 300 starts the code reader application (CL12-1).

When the user performs an operation for selecting the method of reading from the image file 48*b*, such as clicking the image file reading tab 67*b* in the image reading window 67*a* (refer to FIG. 18A) of the code reader application, the image control unit 371*a* accepts the selection operation (CL12-2). Then, the image control unit 371*a* displays the image selection window 68*a* (refer to FIG. 18B), in which thumbnails of various kinds of image files stored in the image storage section 380 are placed (CL12-3).

When the user performs an operation for selecting the image file 48*b*, such as clicking the thumbnail of the image file 48*b*, in the image selection window 68*a*, the image control unit 371*a* accepts the selection operation (CL12-4). The image control unit 371*a* then acquires the selected image file 48*b* from the image storage section 380 (CL12-5). The image control unit 371*a* analyzes the acquired image file 48*b* and reads the identifying image information 44*a* in the image file 48*b* (CL12-6). The image control unit 371*a* converts the read identifying image information 44*a* into character string information.

Next, the out-of-game reproduction unit 372*a* of the client terminal 300 accesses the location on the communication network 200 indicated by the acquired character string information. In other words, the out-of-game reproduction unit 372*a* makes a request for connection to the particular site on the basis of the communication connection information included in the character string information. At this time, the client terminal 300 transmits, to the site server, the character string information together with the connection request information requesting the connection (CL12-9).

Upon receiving the connection request information and the character string information, the out-of-game reproduction unit 472a of the site server 400 permits access made by the client terminal 300 and acquires the hash IDs 47 included in the character string information (SS12-1). The out-of-game reproduction unit 472a converts the acquired hash IDs 47 into card IDs by referring to the card master stored in the card master storage section 481 (SS12-2). The out-of-game reproduction unit 472a transmits, to the client terminal 300, deck organization screen information indicating screen information concerning the deck organization page on which the cards having the acquired card IDs are placed (SS12-3).

The out-of-game reproduction unit 372a of the client terminal 300 displays the deck organization page on the basis of the received deck organization screen information (CL12-10). This reproduces the deck based on the identifying image information 44a on the deck organization page.

As described above, the information processing system S according to this embodiment has the identifying image information generation unit 73a, which generates and displays the identifying image information 44a including game medium identification information (e.g., hash IDs 47) of individual game media constituting a game medium group and the communication connection information 46. Therefore, according to the information processing system S of this embodiment, it is possible to easily reproduce the game medium group indicated by the identifying image information 44a by reading the identifying image information 44a.

In addition, because the communication connection information 46 is included in the identifying image information 44a in the information processing system S according to this embodiment, it is possible to communicatively connect to the particular communication destination indicated by the communication connection information 46 by reading the identifying image information 44a, thereby easily reproducing the game medium group indicated by the identifying image information 44a at the particular communication destination.

Also, when displaying a game medium group, the identifying image information generation unit 73a in this embodiment generates and displays the identifying image information 44a corresponding to the game medium group to be displayed. Therefore, the information processing system S according to this embodiment does not require, for example, a player operation for displaying the identifying image information 44a separately from a player operation for displaying the game medium group, thereby improving the operability of the player.

In addition, the information processing system S according to this embodiment has the game medium identification information acquisition unit 71a, which acquires, from a device that manages game medium identification information, the latest game medium identification information at a predetermined timing. Because the game medium identification information is updated as appropriate in the information processing system S according to this embodiment, it is possible to generate appropriate identifying image information 44a and reproduce a game medium group appropriately.

In addition, the information processing system S according to this embodiment has the in-game reproduction unit 75a, which, in response to reading of the identifying image information 44a, generates and displays a game medium group composed of game media corresponding to the respective items of game medium identification information included in the identifying image information 44a, without establishing a communication connection based on the communication connection information 46 included in the identifying image information 44a. For this reason, in the information processing system S according to this embodiment, it is possible to appropriately reproduce a game medium group in the game, even if the communication connection information 46 is included in the identifying image information 44a.

In addition, the information processing system S according to this embodiment has the out-of-game reproduction units 372a and 472a, which, in response to reading of the identifying image information 44a by means other than the game application, communicatively connect to the particular communication destination on the basis of the communication connection information 46 included in the identifying image information 44a and then generate and display, at the particular communication destination, a game medium group composed of game media corresponding to the respective items of game medium identification information included in the identifying image information 44a. For this reason, in the information processing system S according to this embodiment, it is also possible to reproduce a game medium group based on the identifying image information 44a at the particular communication destination, which is outside the game.

In addition, the information processing system S according to this embodiment has: a first game medium group generation unit (game medium group generation unit 72a) for generating a game medium group indicating a group of game media selected from among a plurality of game media in the game application; a second game medium group generation unit (external game medium group generation unit 471a) for generating a game medium group at a particular communication destination different from the game application; and a special identification information management unit 473a for generating special identification information for reproducing, by means of the first game medium group generation unit, a game medium group generated by the second game medium group generation unit. For this reason, in the information processing system S according to this embodiment, it is also possible to easily reproduce a game medium group by using the special identification information.

In addition, in the information processing system S according to this embodiment, it is possible to reproduce a game medium group by using the identifying image information 44a and to reproduce a game medium by using the special identification information, as described above. A predetermined time limit is set to the special identification information, as described above. Thus, for example, in the case where special identification information is posted on the predetermined information sharing site 48a, the time limit set to the posted special identification information may elapse because it is unknown when any other player views the posted special identification information. In contrast, because no time limits are set to the identifying image information 44a unlike the special identification information, any other player can successfully read identifying image information 44a even if the identifying image information 44a is posted on the information sharing site 48a. Thus, compared to the method of using special identification information, the method of using the identifying image information 44a allows any other player to reproduce a game medium group more appropriately, regardless of time.

Although an aspect of an embodiment has been described with reference to the accompanying drawings, it goes without saying that the present invention is not limited to the aforementioned embodiment. It would be obvious that a person skilled in the art could conceive of various kinds of modifications and amendments within the scope recited in the claims, and it will be understood that those modifications and amendments obviously belong to the technical scope.

The aforementioned embodiment has been described by way of an example where the player terminal 1 is a smartphone. However, the player terminal 1 is not limited to a smartphone, and may be realized by any type of computer, such as a personal computer. In the case where the player terminal 1 is a personal computer, it is acceptable not to provide the camera tab 35e on the organization method selection screen in FIG. 5A, thereby omitting the method of reading the identifying image information by activating the camera from within the game.

In addition, the aforementioned embodiment has been described by way of an example where the identifying image information 44a includes game medium identification information of individual game media constituting a game medium group, as well as the communication connection information 46. However, information included in the identifying image information 44a is not limited to the game medium identification information and the communication connection information 46. For example, the identifying image information 44a may include any information concerning the game, such as the name of the game medium group (e.g., deck name), information about the player who organized the game medium group (e.g., player ID), etc. When the identifying image information 44a is read, the player terminal 1 or the client terminal 300 may also identifiably display any of these items of game-related information included in the identifying image information 44a.

In addition, the aforementioned embodiment has been described by way of an example where a deck can be reproduced by using a deck code. However, the function for reproducing a deck by using a deck code may be omitted.

In addition, the aforementioned embodiment has been described by way of example of a digital card game where the game medium is a card. However, the game medium is not limited to a card, and the game in the information processing system S is not limited to a digital card game. For example, the game medium may be any game medium provided in the game, such as a character, a spinning top, a medal, etc. In addition, the game may also be any type of game, such as a simulation game, where the game is advanced by organizing groups of game media selected from a plurality of game media.

Note that, in the aforementioned embodiment, the information processing system S, which is a client-server system, executes each of the aforementioned information processes. However, the functions of the server 100 in the aforementioned embodiment may be provided in the player terminal 1. In addition, the functions of the player terminal 1 in the aforementioned embodiment may be provided in the server 100.

In addition, the programs in the aforementioned embodiment may be stored in a computer-readable storage medium, and may be provided in the form of a storage medium. Furthermore, those programs may be provided in the form of a game terminal device or an information processing system including this storage medium. Furthermore, the aforementioned embodiment may be an information processing method for realizing the functions and the steps shown in the flowcharts.

What is claimed is:

1. A non-transitory computer readable medium storing a program causing a computer to perform a method comprising:

generating a game medium group indicating a group of game media selected from among a plurality of game media;

generating and displaying identifying image information indicating image information that includes game medium identification information associated with each of the game media, the game medium identification information concerning an individual game media constituting the game medium group, and communication connection information for communicatively connecting to a particular communication destination in a communication network;

reading the identifying image information; and generating and displaying, in response to reading of the identifying image information, the game medium group composed of the game media corresponding to respective items of the game medium identification information included in the identifying image information, without performing communicative connection based on the communication connection information included in the identifying image information.

2. The non-transitory computer readable medium according to claim 1, wherein generating and displaying the identifying image information comprises:

generating and displaying, when displaying the game medium group, the identifying image information corresponding to the game medium group to be displayed.

3. The non-transitory computer readable medium according to claim 1, wherein the method further comprises:

acquiring, from a device for managing the game medium identification information, the latest game medium identification information at a predetermined timing.

4. The non-transitory computer readable medium according to claim 2, wherein the method further comprises:

acquiring, from a device for managing the game medium identification information, the latest game medium identification information at a predetermined timing.

5. An information processing method executed by at least one computer, the information processing method comprising:

generating a game medium group indicating a group of game media selected from among a plurality of game media;

generating and displaying identifying image information indicating image information that includes game medium identification information associated with each of the game media, the game medium identification information concerning an individual game media constituting the game medium group, and communication connection information for communicatively connecting to a particular communication destination in a communication network;

reading the identifying image information; and generating and displaying, in response to reading of the identifying image information, the game medium group composed of the game media corresponding to respective items of the game medium identification information included in the identifying image information, without performing communicative connection based on the communication connection information included in the identifying image information.

6. An information processing system comprising:

at least one computer, the at least one computer being configured to execute a method comprising:

generating a game medium group indicating a group of game media selected from among a plurality of game media;

generating and displaying identifying image information indicating image information that includes game medium identification information associated with each of the game media, the game medium identification information concerning an individual game media constituting the game medium group, and communication connection information for communicatively connecting to a particular communication destination in a communication network;

reading the identifying image information; and generating and displaying, in response to reading of the identifying image information, the game medium group composed of the game media corresponding to respective items of the game medium identification information included in the identifying image information, without performing communicative connection based on the communication connection information included in the identifying image information.

7. An information processing system comprising a first computer, a second computer and a third computer, the first computer being configured to execute a first method comprising:

generating a game medium group indicating a group of game media selected from among a plurality of game media; and generating and displaying identifying image information indicating image information that includes game medium identification information associated with each of the game media, the game medium identification information concerning an individual game media constituting the game medium group, and communication connection information for communicatively connecting to the third computer;

the second computer being configured to execute a second method comprising:

communicatively connecting to, in response to reading of the identifying image information by means other than a game application, the third computer based on the communication connection information included in the identifying image information, the third computer being configured to execute a third method comprising:

generating and displaying the game medium group composed of the game media corresponding to respective items of the game medium identification information included in the identifying image information.

8. An information processing system comprising a first computer and a second computer, the first computer being configured to execute a first method comprising:

generating a first game medium group indicating a group of game media selected from among a plurality of game media in a game application; and generating and displaying identifying image information indicating image information that includes game medium identification information associated with each of the game media, the game medium identification information concerning an individual game media constituting the first game medium group, and communication connection information for communicatively connecting to the second computer;

the second computer being configured to execute a second method comprising:

generating a second game medium group indicating a group of game media selected from among the plurality of game media; and generating special identification information for reproducing the second game medium group at the first computer.

* * * * *